(12) United States Patent
Fujita et al.

(10) Patent No.: US 7,388,038 B2
(45) Date of Patent: *Jun. 17, 2008

(54) CURABLE COMPOSITIONS

(75) Inventors: Masayuki Fujita, Kobe (JP); Nobuhiro Hasegawa, Settsu (JP); Yoshiki Nakagawa, Kobe (JP)

(73) Assignee: Kaneka Corporation, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/377,268

(22) Filed: Mar. 17, 2006

(65) Prior Publication Data

US 2006/0160918 A1 Jul. 20, 2006

Related U.S. Application Data

(60) Division of application No. 10/635,666, filed on Aug. 7, 2003, now Pat. No. 7,081,494, which is a continuation of application No. 09/807,038, filed as application No. PCT/JP99/05557 on Oct. 8, 1999, now abandoned.

(30) Foreign Application Priority Data

| Oct. 8, 1998 | (JP) | ................................. | 10/285797 |
| Oct. 8, 1998 | (JP) | ................................. | 10/285798 |
| Oct. 8, 1998 | (JP) | ................................. | 10/285799 |
| Oct. 20, 1998 | (JP) | ................................. | 10/298295 |
| Oct. 21, 1998 | (JP) | ................................. | 10/299472 |

(51) Int. Cl.
*C08F 2/46* (2006.01)
*C08J 7/04* (2006.01)

(52) U.S. Cl. .......................... 522/99; 522/100; 522/111; 522/112; 522/113; 522/143; 522/148; 522/172; 528/33; 525/100; 525/101; 525/104; 525/106; 525/342; 524/555; 524/543; 524/556; 524/560; 524/569; 524/571; 524/570; 524/590; 526/273

(58) Field of Classification Search .................. 522/99, 522/111, 148, 172, 104, 106, 107, 108, 113, 522/114, 120, 121, 150, 157, 178, 181, 182, 522/184, 100, 112, 143, 174; 526/273, 126; 528/33, 25, 26, 29, 18, 21; 524/188, 555, 524/543, 556, 560, 569, 571, 570, 590; 525/100, 525/479, 105, 106, 446, 101, 104, 342

See application file for complete search history.

(56) References Cited

U.S. PATENT DOCUMENTS

| 4,788,254 | A | 11/1988 | Kawakubo et al. |
| 5,051,463 | A | 9/1991 | Yukimoto et al. |
| 6,407,146 | B1 | 6/2002 | Fujita et al. |
| 6,423,787 | B1 | 7/2002 | Kitano et al. |
| 6,552,118 | B2 | 4/2003 | Fujita et al. |
| 2002/0086942 | A1 | 7/2002 | Fujita et al. |

FOREIGN PATENT DOCUMENTS

| EP | 0 156 170 | 10/1985 |
| EP | 0-362 869 A2 | 4/1990 |
| EP | 0419669 A1 | 4/1991 |
| EP | 0427293 A1 | 5/1991 |
| EP | 0532049 A | 3/1993 |
| EP | 0 545 116 A2 | 6/1993 |
| EP | 0714953 A2 | 6/1996 |
| EP | 0 789 036 A2 | 8/1997 |
| EP | 0860473 A1 | 8/1998 |
| JP | 55-36241 A | 3/1980 |
| JP | 59-122541 | 7/1984 |
| JP | 60-215007 | 10/1985 |
| JP | 64-9268 A | 1/1989 |
| JP | 01-110507 A | 4/1989 |
| JP | 1-247403 A | 10/1989 |
| JP | 2-102237 | 4/1990 |
| JP | 3-277646 A | 12/1991 |
| JP | 3-290456 A | 12/1991 |
| JP | 4-173805 | 6/1992 |
| JP | 5-65400 A | 3/1993 |
| JP | 05-97921 | 4/1993 |
| JP | 5-140248 A | 6/1993 |
| JP | 5-255415 A | 10/1993 |
| JP | 5-262808 A | 10/1993 |
| JP | 05-0287189 | 11/1993 |
| JP | 6-57208 A | 3/1994 |
| JP | 6-192636 A | 7/1994 |
| JP | 6-192642 A | 7/1994 |
| JP | 6-211922 A | 8/1994 |

(Continued)

OTHER PUBLICATIONS

Catalog ARONIX [II], pp. 1-3.

*Primary Examiner*—Sanza L McClendon
(74) *Attorney, Agent, or Firm*—Connolly Bove Lodge & Hutz, LLP

(57) ABSTRACT

The present invention has for its object to provide a curable composition which, despite its low viscosity, gives a cured product with a high gel fraction, low residual tack, low modulus, high elongation, and good flexibility.

The present invention relates to a curable composition comprising the following two components:
(A) a vinyl polymer having at least one crosslinking silyl group on the average per molecule: and
(B) a photocurable substance, (C) an air oxidation-curable substance, (D) a high molecular plasticizer, (E) a reactive plasticizer or (F) a compound having one silanol group in its molecule and/or a compound capable of reacting with moisture to give a compound having one silanol group in the molecule.

9 Claims, No Drawings

FOREIGN PATENT DOCUMENTS

| | | |
|---|---|---|
| JP | 7-166078 A | 6/1995 |
| JP | 08-041138 | 2/1996 |
| JP | 08-041353 | 2/1996 |
| JP | 08-041356 | 2/1996 |
| JP | 08-041357 | 2/1996 |
| JP | 8-269315 A | 10/1996 |
| JP | 9-272714 A | 10/1997 |
| JP | 9-272715 A | 10/1997 |
| JP | 10-130314 | 5/1998 |
| JP | 10-195111 A | 7/1998 |
| JP | 11-5815 A | 1/1999 |
| JP | 11-80249 A | 3/1999 |
| JP | 11-80250 A | 3/1999 |
| JP | 11-80570 A | 3/1999 |
| JP | 11-80571 A | 3/1999 |
| JP | 11-100433 A | 4/1999 |
| JP | 11-116606 A | 4/1999 |
| JP | 11-116617 A | 4/1999 |
| JP | 11-116763 A | 4/1999 |
| JP | 11-130931 A | 5/1999 |
| WO | WO 96/30421 | 10/1996 |
| WO | WO-9905216 A1 | 2/1999 |

CURABLE COMPOSITIONS

CROSS-REFERENCE TO RELATED APPLICATION

This application is a Divisional of U.S. patent application Ser. No. 10/635,666 filed Aug. 7, 2003 now U.S. Pat. No. 7,081,494 which is a Continuation of U.S. patent application Ser. No. 09/807,038, filed Jul. 23, 2001 now abandoned, which in turn was the U.S. National Stage of PCT/JP99/05557, filed Oct. 8, 1999 which in turn claims priority from Japanese Applications 10/285,797, filed Oct. 8, 1998; 10/285,798 filed Oct. 8, 1998; 10/285,799 filed Oct. 8, 1998; 10/298,295 filed Oct. 20, 1998 and 10/299,472 filed Oct. 21, 1998, respectively.

TECHNICAL FIELD

The present invention relates to a curable composition. More particularly, the invention relates to a curable composition comprising a vinyl polymer having a crosslinking functional group such as a crosslinking silyl group.

BACKGROUND ART

Referring to vinyl polymers produced by radical polymerization, in contrast to those polymers which are produced by ionic polymerization or polycondensation, few polymers having functional groups, particularly vinyl polymers at molecular chain terminus such functional groups, are available as of today. Among such vinyl polymers, (meth)acrylic polymers have certain characteristics not shared by polyether polymers, hydrocarbon polymers or polyester polymers, such as high weathering resistance and transparency, and said (meth)acrylic polymers having an alkenyl or crosslinking silyl group in the side chain have been utilized in weather-resistant coatings, among other applications. Meanwhile, the control of polymerization reaction of acrylic polymers is handicapped by side reactions and the introduction of a functional group into the molecular chain terminus, for instance, is extremely difficult.

Should it be possible to produce an alkenyl group-terminated vinyl polymer by an expedient method, cured products having superior physical properties as compared with those obtainable from ones having crosslinking side-chain groups could be obtained. From this point of view, attempts to establish such a technology have been made by many, workers to this day but actually it has proved difficult to produce such polymers on a commercial scale. By way of illustration, Japanese Kokai Publication Hei-1-247403 and Japanese Kokai Publication Hei-5-255415 disclose processes for synthesizing alkenyl-terminated (meth)acrylic polymers using an alkenyl group-containing disulfide as the chain transfer agent.

Japanese Kokai Publication Hei-5-262808 discloses a process for producing an alkenyl-terminated (meth)acrylic polymer which comprises synthesizing a vinyl polymer having a hydroxyl group at both termini by using a hydroxyl-containing disulfide and, then, converting the terminal hydroxyl group to an alkenyl group by utilizing the reactivity of the hydroxyl functional group.

Japanese Kokai Publication Hei-5-211922 discloses a process for producing a silyl-terminated (meth)acrylic polymer which comprises synthesizing a vinyl polymer having a hydroxyl group at both termini by using a hydroxyl-containing polysulfide and converting the terminal hydroxyl groups to silyl groups by utilizing the reactivity of the hydroxyl functional group.

By these processes, however, it is difficult to certainly introduce functional groups into both termini of the molecular chain, hence to give cured products having satisfactory characteristics. In order that a functional group may be introduced into both termini with certainty, the chain transfer agent must be used in a large amount, which is disadvantageous process-wise. Furthermore, since the reaction involves a standard radical polymerization reaction in these processes, the molecular weight and molecular weight distribution (the ratio of weight average molecular weight to number average molecular weight) of the product polymer cannot be easily controlled.

In view of the above conventional technology, the inventors already did several inventions relating to vinyl polymers having various crosslinking silyl groups at its terminus, processes for producing the polymers, curable compositions and uses [e.g. Japanese Kokai Publication Hei-11-080249, Japanese Kokai Publication Hei-11-080250, Japanese Kokai Publication Hei-11-005815, Japanese Kokai Publication Hei-11-116617, Japanese Kokai Publication Hei-11-116606, Japanese Kokai Publication Hei-11-080571, Japanese Kokai Publication Hei-11-080570, Japanese Kokai Publication Hei-11-130931, Japanese Kokai Publication Hei-11-100433, Japanese Kokai Publication Hei-11-116763, Japanese Kokai Publication Hei-9-272714, Japanese Kokai Publication Hei-9-272715, etc.].

For example, a vinyl polymer having a crosslinking silicon-containing group (hereinafter referred to sometimes as "crosslinking silyl group") comprising a hydroxyl or hydrolyzable group bound to a silicon atom and capable of siloxane bonding or a cured product obtainable from this has excellent heat resistance and weather resistance, therefore these can be used in various fields such as architectural elastic sealants and composite-glass sealants, coatings, sealing materials or members and so on.

However, cured products available from such a vinyl polymer having a crosslinking silyl group tend to have the drawback of a conflict between hardness and surface tackiness (also referred as to tacky or residual tack); that is to say, products which is required to be low hardness, i.e. elastic, express a greater residual tack on its surface and tend to be easily soiled. For example., in use as an architectural sealant, the residual tack attracts soil and dust to the surface to adversely affect the appearance of buildings. The first aspect of the present invention, therefore, has for its object to reduce the surface tackiness (residual tack) of cured products obtainable from vinyl polymer having a crosslinking silyl group.

Meanwhile, cured products obtainable by using a vinyl polymer having a crosslinking functional group such as a crosslinking silyl group as the curable component have satisfactory heat resistance and weather resistance and exhibit good coatability when a coating is applied thereon. However, when a well-known plasticizer of comparatively low molecular weight, such as a phthalic acid ester, is used for the purpose of lowering the viscosity of the formulation, the gradual elution of the plasticizer by heat or rain water from the cured product makes it difficult to maintain the initial physical properties of the product for a long time. The additional disadvantage is that when a coating known as "alkyd coating" is applied, the coating is hard to be dried and cure easily.

Therefore, the second aspect of the present invention has for its object to reduce the surface tackiness (residual tack) of the cured product obtainable by using a vinyl polymer having a crosslinking silyl group as the curable component to thereby minimize the settlement of dust thereon while upholding the satisfactory mechanical properties of the cured product and, at the same time, improve the coatability of the product, to an alkyd coating. The third aspect of the present invention has for its object to maintain the heat resistance and weather resistance of the cured product available from the crosslinking functional group-containing vinyl polymer over a protracted time period and, at the same time, improve the coatablilty of the cured product to an alkyd coating.

Meanwhile, in order to impart flexibility to such cured products through reduction in the modulus thereof, it is generally necessary to increase the molecular weight of the polymer but this entails an increased viscosity of the polymer, thus detracting from workability. An alternative approach comprises lowering the rate of introduction of a crosslinking silyl group instead of increasing the molecular mass of the polymer but, in this case, the uncrosslinked fraction is increased to cause a reduced cure speed and a reduced gel fraction of the cured product, thus exerting adverse effects on physical properties other than flexibility. Therefore, in order to reduce viscosity while sustaining flexibility, it is common practice to add one of various plasticizers.

As such plasticizers, there can be mentioned aromatic carboxylic acid esters, aliphatic carboxylic acid esters, phosphoric acid esters, glycols, epoxy plasticizers and chlorinated paraffin, among others. However, these plasticizers have migrating properties so that when used for sealants or adhesives, they tend to cause such troubles as fouling at and around sealed joints, adverse influences on adhesion, and a decrease in flexibility due to extraction of the plasticizer on prolonged curing. The fourth aspect of the present invention, therefore, has for its object to improve workability in a compounding stage or a curable composition application stage, to impart flexibility to cured products, and inhibit adverse influences of plasticizer migration.

As means for reducing the crosslinking silyl group content of a vinyl polymer without reducing the amount of introduction of the crosslinking silyl group to thereby impart flexibility to cured products through a reduction in modules, Japanese Kokai Publication Sho-61-34067 and Japanese Kokai Publication Sho-64-9268, among others, disclose the technology involving addition of a compound having one silanol group per molecule and/or a compound capable of reacting with moisture to give a compound containing one silanol group per molecule (hereinafter sometimes these are collectively referred to as "silanol-containing compound").

However, the organic vinyl polymer containing at least one reactive silicon functional group per molecule as described in Japanese Kokai Publication Sho-61-34067 is produced by the standard free radical polymerization reaction using a chain transfer agent and, therefore, has a high viscosity as well as the disadvantage that in order to attain flexibility while retaining a high gel fraction, it is necessary to use an unsaturated organosilicon monomer in a large amount and a silanol-containing compound also in an increased amount. The fifth aspect of the present invention, therefore, has for its object to provide a curable composition which, despite its low viscosity, gives a cured product with a high gel fraction, low residual tack, low modulus, high elongation, and good flexibility.

SUMMARY OF THE INVENTION

The first aspect of the present invention is directed to a curable composition comprising the following two components: (A1) a vinyl polymer having at least one crosslinking silyl group of the general formula (1) on the average per molecule:

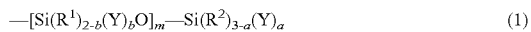

$$—[Si(R^1)_{2-b}(Y)_b O]_m—Si(R^2)_{3-a}(Y)_a \qquad (1)$$

wherein $R^1$ and $R^2$ maybe the same or different and each represents an alkyl group containing 1 to 20 carbon atoms, an aryl group containing 6 to 20 carbon atoms, an aralkyl group containing 7 to 20 carbon atoms, or a triorganosiloxy group of the formula $(R')_3SiO—$, where $R'$ represents a univalent hydrocarbon group containing 1 to 20 carbon atoms and the plurality of $R'$ groups may be the same or different, and when two or more $R^1$ or $R^2$ groups are present, they may be the same or different; Y represents a hydroxyl group or a hydrolyzable group and, when two or more Y groups are respectively present, they may be the same or different; a represents an integer of 0, 1, 2 or 3; b represents an integer of 0, 1 or 2; m is an integer of 0 to 19; with the condition that the relation of $a+mb \geq 1$ is satisfied and (B) a photocurable substance.

The second aspect of the present invention is directed to a curable composition comprising
(A2) a vinyl polymer having at least one crosslinking silyl group of the above general formula (1) on the average per molecule and
(C) an air oxidation-curable substance.

The third aspect of the present invention is directed to a curable composition comprising
(A3) a vinyl polymer having at least one crosslinking functional group on the average and
(D) a high molecular plasticizer.

The fourth aspect of the present invention is directed to a curable composition comprising
(A4) a vinyl polymer having not less than 1.1 of crosslinking silyl groups of the above general formula (1) on the average per molecule and
(E) a reactive plasticizer comprising a vinyl polymer having not more than one of crosslinking silyl group of the above general formula (1) on the average per molecule.

Lastly, the fifth aspect of the present invention is directed to a curable composition comprising
(A5) a vinyl polymer having at least one crosslinking silyl group of the above general formula (1) on the average (provided, however, that $R^1$ and $R^2$ may be the same or different and each represents an alkyl group containing 1 to 20 carbon atoms, an aryl group containing 6 to 20 carbon atoms or an aralkyl group containing 7 to 20 carbon atoms), the main chain of which vinyl polymer has been obtained by a living polymerization reaction and
(F) a compound having one silanol group per its molecule and/or a compound capable of reacting with moisture to give a compound having one silanol group per the molecule.

The present invention is now described in detail.

DETAILED DISCLOSURE OF THE INVENTION

<<First Aspect of the Invention>>
The curable composition according to the first aspect of the invention is now described in detail.

The curable composition according to the first aspect of the invention comprises (A1) a vinyl polymer having a crosslinking silyl group and (B) a photocurable substance.

[(A1) vinyl polymer]
The vinyl polymer having at least one crosslinking silyl group of the above general formula (1) on the average, for use as (A1) component, crosslinks by siloxane bonding.

<Main Chain>
The vinyl monomer constituting the main chain of the vinyl polymer (A1) is not particularly restricted but may be any of various monomers. As examples, there may be mentioned (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, and styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid and monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and. methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so forth. These may be used singly or a plurality of them may be copolymerized. Preferred among them from the viewpoint of physical properties of products, among others, are styrenic monomers and (meth)acrylic monomers, more preferably acrylic ester monomers and (meth)acrylic ester monomers, still more preferably acrylic ester monomers, and butyl acrylate is particularly preferred. In the practice of the invention, these preferred monomers may be copolymerized with other monomers, even in the manner of block polymerization, and, on that occasion, the proportion of these preferred monomers is preferably 40% by weight. In the nomenclature used above, (meth)acrylic acid, for instance, means acrylic acid and/or methacrylic acid.

The molecular weight distribution of the vinyl polymer (A1) is not particularly restricted but the ratio of weight average molecular weight to number average molecular weight as determined by gel permeation chromatography is generally less than 1.8, preferably not more than 1.7, more preferably not more than 1.6, still more preferably not more than 1.5, especially preferably not more than 1.4, most preferably not more than 1.3. In GPC measurements in the practice of the invention, the measurements are generally carried out using polystyrene gel columns with chloroform as the mobile phase. The number average molecular weight and so on can be determined on a polystyrene equivalent basis.

The number average molecular weight of the vinyl polymer (A1) is not particularly restricted but preferably is within the range of 500 to 1,000,000, more preferably 1,000 to 100,000.

<Methods for Synthesis of the Main Chain>

The method of synthesizing the vinyl polymer (A1) is not restricted but is preferably a controlled radical polymerization technique, more preferably a living radical polymerization technique, particularly an atom transfer radical polymerization technique. These polymerization techniques are described below.

Controlled Radical Polymerization

The radical polymerization method can be divided into the "general radical polymerization method" in which a monomer having a given functional group is simply copolymerized with a vinyl monomer using an azo or peroxide compound as the polymerization initiator and the "controlled radical polymerization method" which is capable of introducing a given functional group into a defined position such as the molecular chain terminus.

The "general radical polymerization method" is an expedient method. However, by this method, a monomer having a given functional group is introduced into the product polymer only in probabilities, and in order to synthesize a polymer of high functionality, this monomer must be used in a fairly large amount. When conversely the amount of the monomer is small, the ratio of polymer molecules not provided with the given functional group is increased. Another disadvantage is that since the reaction is a free radical polymerization reaction, the molecular weight distribution is so broadened that only a polymer having a high viscosity can be obtained.

The "controlled radical polymerization method" can be divided into the "chain transfer agent technique" in which a vinyl polymer having a functional group at the molecular chain terminus is produced by carrying out the polymerization reaction using a chain transfer agent having a given functional group, and the "living radical polymerization technique" in which the polymerization proceeds with the growing chain terminus constantly growing without being interrupted by a termination reaction to give a polymer approximating the designed molecular weight.

The "chain transfer agent technique" is capable of giving a polymer of high functionality but a chain transfer agent having a given functional group must be used in a fairly large amount relative to the initiator, with the consequent disadvantage in economics inclusive of the cost of treatment involved. A further disadvantage of the technique is that because it is also a free radical polymerization method as is said "general radical polymerization method", there can be obtained only a polymer having a broad molecular weight distribution and a high viscosity.

Unlike the above polymerization technology, the "living radical polymerization technique" is advantageous in that despite its also being a method for radical polymerization reaction which is generally considered to be hardly controllable because of the high velocity polymerization and high tendency of termination by radical-radical coupling or the like, a termination reaction does not easily take place, thus giving a polymer with a narrow molecular weight distribution (Mw/Mn=about 1.1 to 1.5), and further in that the molecular weight can be freely controlled by adjusting the monomer-initiator charge ratio.

Since "living radical polymerization" is thus capable of giving a polymer having a narrow molecular weight distribution and a low viscosity and enables introduction of a monomer having a given functional group in an almost designated position, it is a further preferred method for producing a vinyl polymer having said given functional group.

In a narrow sense of the term, "living polymerization" means a polymerization in which the molecule grows with its growth termini being constantly activated. Generally, however, the term is used to broadly cover as well a pseudo-living polymerization reaction in which the polymer grows while molecules with an activated terminus and molecules with an inactivated terminus are in equilibrium, and the term as used in this specification also has the latter broad meaning.

Recently, "living radical polymerization" has been studied in earnest by many research groups. By way of illustration, this technology includes the method employing a cobalt porphyrin complex as described in J. Am. Chem. Soc., 116, 7943 (1994); the method using a radical rapping agent such as a nitroxide compound as described in Macromolecules, 27, 7228 (1994), and the atom transfer radical polymerization (ATRP) method using an organohalogen compound as the initiator and a transition metal complex as the catalyst.

Among such variations of the "living radical polymerization method", the "atom transfer radical polymerization" method in which a vinyl monomer is polymerized using an organohalogen compound or a sulfonyl halide compound as the initiator and a transition metal complex as the catalyst is still more preferred for the production of said vinyl polymer having a given functional group because, in addition to the above-mentioned advantages of "living radical polymerization", it is capable of giving a polymer having a halogen atom or the like at its terminus, which is comparatively favorable for a functional group exchange reaction, and offers a broad freedom in the initiator and catalyst design. Regarding this atom transfer radical polymerization method, reference can be made to Matyjaszewski et al.: J. Am. Chem. Soc., 117, 5614 (1995), Macromolecules, 28, 7901 (1995), Science, 272, 866 (1996), WO 96/30421, WO 97/18247, WO 98/01480, WO 98/40415, Sawamoto et al.: Macromolecules, 28, 1721 (1995), Japanese Kokai Publication Hei-9-208616 and Japanese Kokai Publication Hei-8-41117, among others.

The technique to be selected from among those living radical polymerization techniques in the practice of the present invention is not particularly restricted but atom transfer radical polymerization is preferred.

Living radical polymerization will be described in detail hereinafter. In the first place, however, the polymerization reaction using a chain transfer agent, which is a variant of controlled radical polymerization, for the production of vinyl polymer (A1) to be described hereinafter, is now explained. While the radical polymerization technique utilizing a chain transfer agent (telomer) is not particularly restricted but for the production of a vinyl polymer having a terminal structure suited to the present invention, the following two alternative techniques, among others, can be mentioned.

These include the process for producing a halogen-terminated polymer using a halogenated hydrocarbon as a chain transfer agent as described in Japanese Kokai Publication Hei-4-132706 and the process for producing a hydroxyl-terminated polymer using an OH-containing mercaptan, an OH-containing polysulfide or the like as the chain transfer agent as described in Japanese Kokai Publication Sho-61-271306, Japanese Patent 2594402, and Japanese Kokai Publication Sho-54-47782.

The living radical polymerization technique is now explained.

First, the technique which uses a radical capping agent such as a nitroxide compound is described. In this polymerization, a nitroxy free radical (=N—O·), which is generally stable, is used as the radical capping agent. While such a compound is not restricted, nitroxy free radicals from cyclic hydroxylamines, such as the 2,2,6,6-substituted-1-piperidinyloxy radical and 2,2,5,5-substituted-1-pyrrolidinyloxy radical, are preferred. Appropriate as the substituents are alkyl groups containing not more than 4 carbon atoms, such as methyl and ethyl groups. Specific nitroxy free radical compounds include, but are not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-tert-butylaminoxy radical, among others. Such a stable free radical as the galvinoxyl free radical may be used in lieu of the nitroxy free radical.

The above radical capping agent is used in combination with a radical generator. It is presumable that the reaction product from a radical capping agent and a radical generator serves as a polymerization initiator and the polymerization of an addition-polymerizable monomer(s) proceeds. The mixing ratio of the two agents is not particularly restricted but, appropriately, the radical initiator is used in an amount of 0.1 to 10 moles per mole of the radical capping agent.

Although various compounds can be used as the radical generator, a peroxide capable of generating a radical under polymerization temperature conditions is preferred. Such peroxide includes but is not limited to diacyl peroxides such as benzoyl peroxide and lauroyl peroxide, dialkyl peroxides such as dicumyl peroxide and di-tert-butyl peroxide, peroxydicarbonates such as diisopropyl peroxydicarbonate and bis(4-tert-butylcyclohexyl)peroxydicarbonate, alkyl peresters such as tert-butyl peroxyoctoate and tert-butyl peroxybenzoate, and the like. In particular, benzoyl peroxide is preferred. Further, another radical generator, for example a radical-generating azo compound such as azobisisobutyronitrile, may be used in lieu of the peroxide.

As reported in Macromolecules, 1995, 28, 2993, such alkoxyamine compounds as shown below may be used as the initiator instead of the combined use of a radical capping agent and a radical generator.

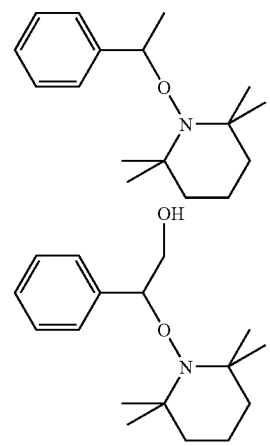

When an alkoxyamine compound is used as the initiator and the compound has a hydroxyl or like functional group, as indicated by either formula shown above, a functional group-terminated polymer is obtained. When this is applied to the method of the invention, a functional group-terminated vinyl polymer is obtained.

The monomer (s) to be used in the polymerization using a radical capping agent such as a nitroxide compound as mentioned above and the polymerization conditions such as solvent and polymerization temperature are not restricted but may be the same as those used in atom transfer radical polymerization to be described below.

Atom Transfer Radical Polymerization

Then, the technique of atom transfer radical polymerization, which is more preferred as the technique of living radical polymerization, is described.

In this atom transfer radical polymerization, an organohalogen compound, in particular an organohalogen compound having a highly reactive carbon-halogen bond (e.g. a carbonyl compound having a halogen atom at the α position, or a compound having a halogen at the benzyl position), or a sulfonyl halide compound or the like is used as the initiator. Specific examples are:

$C_6H_5—CH_2X$, $C_6H_5—C(H)(X)CH_3$, $C_6H_5—C(X)(CH_3)_2$ (in the above formulas, $C_6H_5$ stands for a phenyl group; X is a chlorine, bromine or iodine atom), $R^3—C(H)(X)—CO_2R^4$, $R^3—C(CH_3)(X)—CO_2R^4$, $R^3—C(H)(X)—C(O)R^4$, $R^3—C(CH_3)(X)—C(O)R^4$ (in the above formula, $R^3$ and $R^4$ each represents a hydrogen atom or an alkyl, aryl or aralkyl group containing up to 20 carbon atoms; X is a chlorine, bromine or iodine atom), $R^3—C_6H_4—SO_2X$ (in the above formula, $R^3$ is a hydrogen atom or an alkyl, aryl or aralkyl group containing up to 20 carbon atoms and X is a chlorine, bromine or iodine atom), and so on.

An organohalogen or sulfonyl halide compound having a functional group other than a functional group serving as an initiator of the polymerization may also be used as the initiator in atom transfer radical polymerization. In such cases, there is formed a vinyl polymer having said functional group at one terminus of the main chain with the other terminus having the growing terminal structure for atom transfer radical polymerization. As such functional group, there may be mentioned an alkenyl group, a crosslinking silyl group, a hydroxyl group, an epoxy group, an amino group, an amido group and the like.

The alkenyl-containing organohalogen compound includes but is not limited to compounds having a structure represented by the general formula (2):

$$R^6R^7C(X)—R^8—R^9—C(R^5)=CH_2 \quad (2)$$

wherein $R^5$ is a hydrogen atom or a methyl group; $R^6$ and $R^7$ each represents a hydrogen atom or a univalent alkyl, aryl or aralkyl group containing up to 20 carbon atoms or these are linked to each other at the respective free termini; $R^8$ is —C(O)O— (ester group), —C(O)— (keto group) or an o-, m- or p-phenylene group; $R^9$ is a direct bond or a bivalent organic group containing 1 to 20 carbon atoms, which may optionally contain one or more ether linkages; X is a chlorine, bromine or iodine atom.

As specific examples of the substituents $R^6$ and $R^7$, there may be mentioned hydrogen, methyl, ethyl, n-propyl, isopropyl, butyl, pentyl, hexyl and the like. $R^6$ and $R^7$ may be linked to each other at the respective free termini to form a cyclic structure.

Specific examples of the alkenyl-containing organohalogen compound represented by the general formula (2) are as follows:

$XCH_2C(O)O(CH_2)_nCH=CH_2$, $H_3C(CH_2)_mCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

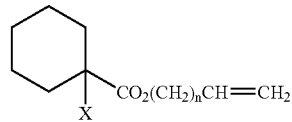

(in the above formulas, X is a chlorine, bromine or iodine atom and n is an integer of 0 to 20);

$XCH_2C(O)O(CH_2)_nO(CH_2)_mCH=CH_2$, $H_3CC(H)(X)C(O)O(CH_2)_nO(CH_2)_mCH=CH_2$,
$(H_3C)_2C(X)C(O)O(CH_2)_nO(CH_2)_mCH=CH_2$,
$CH_3CH_2C(H)(X)C(O)O(CH_2)_nO(CH_2)_mCH=CH_2$,

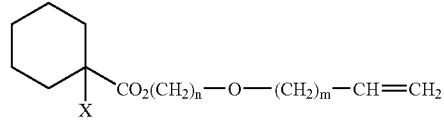

(in the above formulas, X is a chlorine, bromine or iodine atom;

n is an integer of 1 to 20; m is an integer of 0 to 20);

o, m, p-$XCH_2—C_6H_4—(CH_2)_n—CH=CH_2$, o, m, p-$CH_3C(H)(X)—C_6H_4—(CH_2)_n—CH=CH_2$, o, m, p-$CH_3CH_2C(H)(X)—C_6H_4—(CH_2)_n—CH=CH_2$, (in the above formulas, X is a chlorine, bromine or iodine atom;

n is an integer of 0 to 20);

o, m, p-$XCH_2—C_6H_4—(CH_2)_2—O—(CH_2)_m—CH=CH_2$, o, m, p-$CH_3C(H)(X)—C_6H_4—(CH_2)_n—O—(CH_2)_m—CH=CH_2$, o, m, p-$CH_3CH_2C(H)(X)—C_6H_4—(CH_2)_n—O—(CH_2)_m—CH=CH_2$, (in the above formulas, X is a chlorine, bromine or iodine atom;

n is an integer of 1 to 20; m is an integer of 0 to 20);

o, m, p-$XCH_2—C_6H_4—O—(CH_2)_n—O—(CH_2)_m—CH=CH_2$, o, m, p-$CH_3C(H)(X)—C_6H_4—O—(CH_2)_n—O—(CH_2)_m—CH=CH_2$, o, m, p-$CH_3CH_2C(H)(X)—C_6H_4—O—(CH_2)_n—O—(CH_2)_m—CH=CH_2$, (in the above formulas, X is a chlorine, bromine or iodine atom;

n is an integer of 0 to 20);

o, m, p-$XCH_2—C_6H_4—O—(CH_2)_n—O—(CH_2)_m—CH=CH_2$, o, m, p-$CH_3C(H)(X)—C_6H_4—O—(CH_2)_n—O—(CH_2)_m—CH=CH_2$, o, m, p-$CH_3CH_2C(H)(X)—C_6H_4—O—(CH_2)_m—O—(CH_2)_m—CH=CH_2$, (in the above formulas, X is a chlorine, bromine or iodine atom;

n is an integer of 1 to 20; m is an integer of 0 to 20).

As the alkenyl-containing organohalogen compound, there may further be mentioned compounds represented by the general formula (3):

$$H_2C=C(R^5)—R^9—C(R^6)(X)—R^{10}—R^7 \quad (3)$$

wherein $R^5$, $R^6$, $R^7$, $R^9$ and X are as defined above and $R^{10}$ represents a direct bond, —C(O)O— (ester group), —C(O)— (keto group) or an o-, m- or p-phenylene group.

$R^8$ is a direct bond or a bivalent organic group containing 1 to 20 carbon atoms (which may optionally contain one or more ether linkages) and, when it is a direct bond, the vinyl group is attached to the carbon atom to which the halogen atom is attached, hence the compound is an allyl halide. In this case, the carbon-halogen bond is activated by the neighboring vinyl group and therefore it is not always necessary for $R^{10}$ to be a C(O)O or phenylene group; thus, $R^{10}$ may be a direct bond. When $R^9$ is not a direct bond, it is desirable that $R^{10}$ is a C(O)O, C(O) or phenylene group so as to activate the carbon-halogen bond.

Specific examples of the compound of formula (3) are as follows:
$CH_2=CHCH_2X$, $CH_2=C(CH_3)CH_2X$, $CH_2=CHC(H)(X)CH_3$,
$CH_2=C(CH_3)C(H)(X)CH_3$, $CH_2=CHC(X)(CH_3)_2$, $CH_2=CHC(H)(X)C_2H_5$,
$CH_2=CHC(H)(X)CH(CH_3)_2$, $CH_2=CHC(H)(X)C_6H_5$, $CH_2=CHC(H)(X)CH_2C_6H_5$,
$CH_2=CHCH_2C(H)(X)—CO_2R$, $CH_2=CH(CH_2)_2C(H)(X)—CO_2R$,
$CH_2=CH(CH_2)_3C(H)(X)—CO_2R$, $CH_2=CH(CH_2)_8C(H)(X)—CO_2R$,
$CH_2=CHCH_2C(H)(X)—C_6H_5$, $CH_2=CH(CH_2)_2C(H)(X)—C_6H_5$ and
$CH_2=CH(CH_2)_3C(H)(X)—C_6H_5$
(in the above formulas, X represents a chlorine, bromine or iodine atom; R is an alkyl, aryl or aralkyl group containing up to 20 carbon atoms), and the like.

Specific examples of the alkenyl-containing sulfonyl halide compound are as follows:
o-, m-, p-$CH_2=CH—(CH_2)_n—C_6H_4—SO_2X$ and
o-, m-, p-$CH_2=CH—(CH_2)_n—O—C_6H_4—SO_2X$
(in the above formulas, X represents a chlorine, bromine or iodine atom; n is an integer of 0 to 20).

The above crosslinking silyl-containing organohalogen compound includes but is not limited to compounds having a structure represented by the general formula (4):

$$R^6R^7C(X)—R^8—R^9—C(H)(R^5)CH_2—[Si(R^{11})_{2-b}(Y)_bO]_m—Si(R^{12})_{3-a}(Y)_a \quad (4)$$

wherein $R^5$, $R^6$, $R^7$, $R^8$, $R^9$ and X are as defined above; $R^{11}$ and $R^{12}$ each represents an alkyl, aryl or aralkyl group containing up to 20 carbon atoms or a triorganosiloxy group of the formula $(R')_3SiO—$ (where R' is a univalent hydrocarbon group containing 1~20 carbon atoms and the three R' groups may be the same or different) and, when two or more $R^{11}$ and/or $R^2$ groups are present, they may be the same or different; Y represents a hydroxyl group or a hydrolyzable group and, when two or more Y groups are present, they may be the same or different; a represents an integer of 0, 1, 2 or 3, b represents an integer of 0, 1 or 2 and m is an integer of 0 to 19, with the condition that the relation a+mb≧1 should be satisfied.

Specific examples of the compound of the general formula (4) are:
$XCH_2C(O)O(CH_2)_nSi(OCH_3)_3$, $CH_3C(H)(X)C(O)O(CH_2)_nSi(OCH_3)_3$,
$(CH_3)_2C(X)C(O)O(CH_2)_nSi(OCH_3)_3$, $XCH_2C(O)O(CH_2)_nSi(CH_3)(OCH_3)_2$,
$CH_3C(H)(X)C(O)O(CH_2)_nSi(CH_3)(OCH_3)_2$,
$(CH_3)_2C(X)C(O)O(CH_2)_nSi(CH_3)(OCH_3)_2$,
(in the above formulas, X represents a chlorine, bromine or iodine atom; n represents an integer of 0 to 20);
$XCH_2C(O)O(CH_2)_nO(CH_2)_mSi(OCH_3)_3$,
$H_3CC(H)(X)C(O)O(CH_2)_nO(CH_2)_mSi(OCH_3)_3$, $(H_3C)_2C(X)C(O)O(CH_2)_nO(CH_2)_mSi(OCH_3)_3$,
$CH_3CH_2C(H)(X)C(O)O(CH_2)_nO(CH_2)_mSi(OCH_3)_3$,
$XCH_2C(O)O(CH_2)_nO(CH_2)_mSi(CH_3)(OCH_3)_2$,
$H_3CC(H)(X)C(O)O(CH_2)_nO(CH_2)_m—Si(CH_3)(OCH_3)_2$,
$(H_3C)_2C(X)C(O)O(CH_2)_nO(CH_2)_m—Si(CH_3)(OCH_3)_2$,
$CH_3CH_2C(H)(X)C(O)O(CH_2)_nO(CH_2)_m—Si(CH_3)(OCH_3)_2$,
(in the above formulas, X represents a chlorine, bromine or iodine atom; n represents an integer of 1 to 20; m represents an integer of 0 to 20);
o, m, p-$XCH_2—C_6H_4—(CH_2)_2Si(OCH_3)_3$, o, m, p-$CH_3C(H)(X)—C_6H_4—(CH_2)_2Si(OCH_3)_3$, o, m, p-$CH_3CH_2C(H)(X)—C_6H_4—(CH_2)_2Si(OCH_3)_3$, o, m, p-$XCH_2—C_6H_4—(CH_2)_3Si(OCH_3)_3$, o, m, p-$CH_3C(H)(X)—C_6H_4—(CH_2)_3Si(OCH_3)_3$, o, m, p-$CH_3CH_2C(H)(X)—C_6H_4—(CH_2)_3Si(OCH_3)_3$, o, m, p-$XCH_2—C_6H_4—(CH_2)_2—O—(CH_2)_3Si(OCH_3)_3$, o, m, p-$CH_3C(H)(X)—C_6H_4—(CH_2)_2—O—(CH_2)_3Si(OCH_3)_3$, o, m, p-$CH_3CH_2C(H)(X)—C_6H_4—(CH_2)_2—O—(CH_2)_3Si(OCH_3)_3$, o, m, p-$XCH_2—C_6H_4—O—(CH_2)_3Si(OCH_3)_3$, o, m, p-$CH_3C(H)(X)—C_6H_4—O—(CH_2)_3Si(OCH_3)_3$, o, m, p-$CH_3CH_2C(H)(X)—C_6H_4—O—(CH_2)_3Si(OCH_3)_3$, o, m, p-$XCH_2—C_6H_4—O—(CH_2)_2—O—(CH_2)_3—Si(OCH_3)_3$, o, m, p-$CH_3C(H)(X)—C_6H_4—O—(CH_2)_2—O—(CH_2)_3—Si(OCH_3)_3$, o, m, p-$CH_3CH_2C(H)(X)—C_6H_4—O—(CH_2)_2—O—(CH_2)_3 Si(OCH_3)_3$,
(in the above formulas, X represents a chlorine, bromine or iodine atom) and the like.

As further examples of the crosslinking silyl group-containing organohalogen compound, there may be mentioned compounds having a structure represented by the general formula (5):

$$(R^{12})_{3-a}(Y)_aSi—[OSi(R^{11})_{2-b}(Y)_b]_m—CH_2—C(H)(R^5)—R_9—C(R^6)(X)—R^{10}—R^7 \quad (5)$$

wherein $R^5$, $R^6$, $R^7$, $R^9$, $R^{10}$, $R^{11}$, $R^{12}$, a, b, m, X and Y are as defined above.

Specific examples of such compound are as follows:
$(CH_3O)_3SiCH_2CH_2C(H)(X)C_6H_5$, $(CH_3O)_2(CH_3)SiCH_2CH_2C(H)(X)C_6H_5$,
$(CH_3O)_3Si(CH_2)_2C(H)(X)—CO_2R$, $(CH_3O)_2(CH_3)Si(CH_2)_2C(H)(X)—CO_2R$,
$(CH_3O)_3Si(CH_2)_3C(H)(X)—CO_2R$, $(CH_3O)_2(CH_3)Si(CH_2)_3C(H)(X)—CO_2R$,
$(CH_3O)_3Si(CH_2)_4C(H)(X)—CO_2R$, $(CH_3O)_2(CH_3)Si(CH_2)_4C(H)(X)—CO_2R$,
$(CH_3O)_3Si(CH_2)_9C(H)(X)—CO_2R$, $(CH_3O)_2(CH_3)Si(CH_2)_9C(H)(X)—CO_2R$,
$(CH_3O)_3Si(CH_2)_3C(H)(X)—C_6H_5$, $(CH_3O)_2(CH_3)Si(CH_2)_3C(H)(X)—C_6H_5$, $(CH_3O)_3Si(CH_2)_4C(H)(X)—C_6H_5$, $(CH_3O)_2(CH_3)Si(CH_2)_4C(H)(X)—C_6H_5$,
(in the above formulas, X represents a chlorine, bromine or iodine atom; R represents an alkyl, aryl or aralkyl group containing up to 20 carbon atoms) and the like.

The hydroxyl-containing organohalogen or sulfonyl halide compound is not particularly restricted but may be a compound of the formula:

$$HO—(CH_2)_n—OC(O)C(H)(R)(X)$$

wherein X represents a chlorine, bromine or iodine atom; R represents a hydrogen atom or an alkyl, aryl or aralkyl group containing up to 20 carbon atoms; n represents an integer of 1 to 20.

The amino-containing organohalogen or sulfonyl halide compound is not particularly restricted but may be a compound of the formula:

$$H_2N—(CH_2)_n—OC(O)C(H)(R)(X)$$

wherein X represents a chlorine, bromine or iodine atom; R represents a hydrogen atom or an alkyl, aryl or aralkyl group containing up to 20 carbon atoms; n represents an integer of 1 to 20.

The epoxy-containing organohalogen or sulfonyl halide compound is not particularly restricted but may be a compound of the formula:

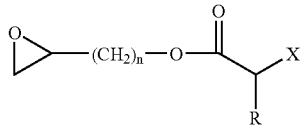

wherein X is a chlorine, bromine or iodine atom; R represents a hydrogen atom or an alkyl, aryl or aralkyl group containing up to 20 carbon atoms; $n$ represents an integer of 1 to 20.

It is preferable to use an organohalogen or sulfonyl halide compound having 2 or more initiation points as the initiator to produce a polymer having 2 or more terminal structures of the invention per molecule. Specific examples are:

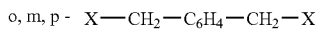
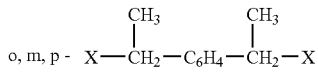
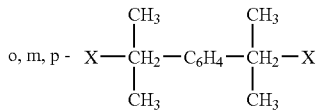

(in the above formulas, $C_6H_4$ stands for a phenylene group; X represents a chlorine, bromine or iodine atom)

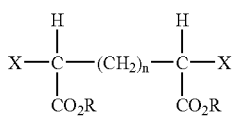
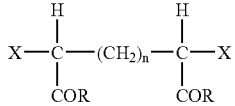

(in the above formulas, R represents an alkyl, aryl or aralkyl group containing up to 20 carbon atoms; $n$ represents an integer of 0 to 20; X represents a chlorine, bromine or iodine atom)

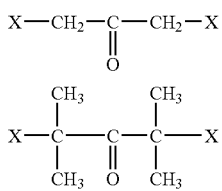

(in the above formulas, X represents a chlorine, bromine or iodine atom; $n$ represents an integer of 0 to 20)

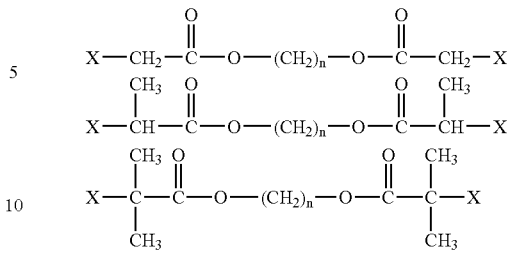

(in the above formulas, $n$ represents an integer of 0 to 20; X represents a chlorine, bromine or iodine atom)

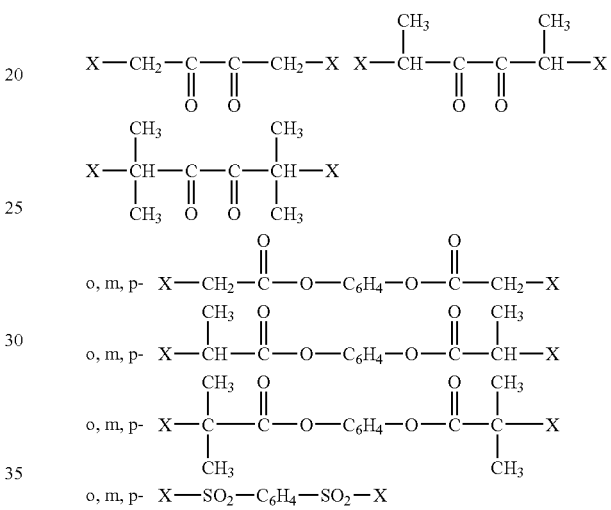

(in the above formulas, X represents a chlorine, bromine or iodine atom).

The vinyl monomer for this polymerization reaction is not particularly restricted but any of the monomers mentioned hereinabove can be employed with advantage.

The transition metal complex to be used as the polymerization catalyst is not particularly restricted but includes, as preferred examples, transition metal complexes whose center metals belong to Group 7, 8, 9, 10 or 11 of the periodic table of the elements and, as more preferred species, complexes of zero-valence copper, univalent copper, bivalent ruthenium, bivalent iron or bivalent nickel. Copper complexes are particularly preferred. As specific examples of the univalent copper compound, there may be mentioned cuprous chloride, cuprous bromide, cuprous iodide, cuprous cyanide, cuprous oxide and cuprous perchlorate. When a copper compound is used, a ligand, for example 2,2-bipyridyl or a derivative thereof, 1,10-phenanthroline or a derivative thereof, or a polyamine such as tetramethylethylenediamine, pentamethyldiethylenetriamine or hexamethyltris(2-aminoethyl) amine, is added for improving catalytic activity. The tristriphenylphosphine complex of bivalent ruthenium chloride ($RuCl_2(PPh_3)_3$) is also suited for use as a catalyst. When a ruthenium compound is used as the catalyst, an aluminum alkoxide is added as an activator. Further, the bistriphenylphosphine complex of bivalent iron ($FeCl_2(PPh_3)_2$), the bistriphenylphosphine complex of bivalent nickel ($NiCl_2(PPh_3)_2$) and the bistributylphosphine complex of bivalent nickel ($NiBr_2(PBu_3)_2$) are also suited as catalysts.

The polymerization can be carried out in the absence of a solvent or in any of various solvents. As the solvents, there may be mentioned hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropyl alcohol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; and so on. These may be used singly or two or more of them may be used in admixture. The polymerization can be carried out within the temperature range of 0° C. to 200° C., preferably 50 to 150° C., although such range is not critical.

<Crosslinking Silyl Group>

Crosslinking Silyl Group

The crosslinking silyl group of the vinyl polymer (A1) includes those represented by the general formula (1):

$$-[Si(R^1)_{2-b}(Y)_bO]_m-Si(R^2)_{3-a}(Y)_a \qquad (1)$$

wherein $R^1$ and $R^2$ each represents a $C_{1-20}$ alkyl, $C_{6-20}$ aryl or $C_{7-20}$ aralkyl group or a triorganosiloxy group represented by $(R')_3SiO$— (where each R' represents a $C_{1-20}$ univalent hydrocarbon group and the three R' groups may be the same or different) and, when there are a plurality of $R^1$ or $R^2$ groups, they may be the same or different; Y represents a hydroxyl group or a hydrolyzable group and, when two or more Y groups are present, they may be the same or different; $\underline{a}$ represents an integer of 0, 1, 2 or 3, $\underline{b}$ represents an integer of 0, 1 or 2 and $\underline{m}$ represents an integer of 0 to 19 on condition that the relation $a+mb \geq 1$ should be satisfied.

The hydrolyzable group may be any of those known in the art and it includes hydrogen, alkoxy, acyloxy, ketoximato, amino, amido, aminoxy, mercapto and alkenyloxy. Among these, alkoxy, amido and aminoxy are preferred. For assuring hydrolyzability under mild conditions and ease of handling, alkoxy groups are particularly preferred.

Each silicon atom may have 1 to 3 such hydrolyzable and/or hydroxyl groups, and $(a+\Sigma b)$ is preferably within the range of 1 to 5. When two or more hydrolyzable groups and/or hydroxyl groups are contained in the crosslinking silyl group, they may the same or different. The crosslinking silyl group is comprised of one or more silicon atoms and, in the case of silicon atoms connected by siloxane bonding, the number of silicon atoms is preferably up to 20 at the maximum. From availability points of view, crosslinking silyl groups represented by the general formula (6) are preferred:

$$-Si(R^{12})_{3-a}(Y)_a \qquad (6)$$

wherein $R^{12}$, Y and a are as defined above.

Number of Crosslinking Silyl Groups

The crosslinking silyl group of the general formula (1) occurs in the number of at least one on the average per molecule of the polymer (A1). If the average number of crosslinking silyl groups is less than one per molecule, a sufficiently cured product will not be obtained. In order to provide a fully cured product, the crosslinking silyl group of the general formula (1) should be available in the average number of 1.1. to 5, preferably 1.2 to 4, more preferably 1.3 to 3, per molecule of the polymer.

Position of the Crosslinking Silyl Group

When the curable composition of the invention is required to give a cured product having rubber-like properties in particular, it is preferable that said at least one crosslinking silyl group is present at the molecular chain terminus, for the molecular mass between crosslinking points, which has considerable bearings on rubber elasticity, can then be large. More preferably, all crosslinking silyl groups are located at molecular chain termini.

The technology of producing a vinyl polymer having at least one crosslinking silyl group at the molecular chain terminus, particularly such a (meth)acrylic polymer, is described in Japanese Kokoku Publication Hei-3-14068, Japanese Kokoku Publication Hei-4-55444 and Japanese Kokai Publication Hei-6-211922. However, since these are invariably free radical polymerization processes utilizing said "chain transfer agent technique", the resulting polymer contains crosslinking silyl groups at its termini at a fairly high rate but has the drawback that the molecular weight distribution value, represented by Mw/Mn, is as large as 2 or more and, hence, the viscosity of the polymer is high. Therefore, in order to provide a vinyl polymer having a small molecular weight distribution value, hence a low viscosity value, and, yet, crosslinking silyl groups at its termini at a fairly high rate, the "living radical polymerization technique" mentioned hereinbefore is preferably employed.

<Method of Introducing a Crosslinking Silyl Group>

The technology of introducing a functional group into the vinyl polymer includes but is not limited to the following methods.

[A] The method which comprises adding a hydrosilane compound having a crosslinking silyl group to a vinyl polymer having at least one alkenyl group in the presence of a hydrosilylation catalyst.

[B] The method which comprises reacting a vinyl polymer having at least one hydroxyl group with a compound having both a crosslinking silyl group and a functional group capable of reacting with the hydroxyl group, for example an isocyanato group.

[C] The method which comprises subjecting to reaction of a compound having both a polymerizable alkenyl group and a crosslinking silyl group, together with a predetermined vinyl monomer, in synthesizing a vinyl polymer by radical polymerization.

[D] The method which comprises subjecting a vinyl monomer to radical polymerization using a crosslinking silyl group-containing chain transfer agent.

[E] The method which comprises reacting a vinyl polymer having at least one highly reactive carbon-halogen bond with a stable, crosslinking silyl group-containing carbanion.

The method of producing the vinyl polymer having at least one alkenyl group which is to be used in the above production method [A] includes but is not limited to the following methods [A-a] to [A-j].

[A-a] The method which comprises subjecting a compound having a polymerizable alkenyl group and a sparingly polymerizable alkenyl group, e.g. a compound of the general formula (7), together with a predetermined vinyl monomer, to reaction in synthesizing a vinyl polymer by radical polymerization.

$$H_2C=C(R^3)-R^4-R^5-C(R^6)=CH_2 \qquad (7)$$

wherein $R^3$ represents a hydrogen atom or methyl group; $R^4$ represents —C(O)O— or an o-, m- or p-phenylene group; $R^5$ represents a direct bond or a $C_{1-20}$ bivalent organic group which may optionally contain one or more ether linkages; $R^6$ represents a hydrogen atom, a $C_{1-10}$ alkyl group, $C_{6-10}$ aryl group or $C_{7-10}$ aralkyl group.

The timing of reacting said compound having both a polymerizable alkenyl group and a sparingly polymerizable alkenyl group is not particularly restricted but, when rubber-like properties are expected of the obtained crosslinked product, this compound is preferably reacted, as a second monomer, at a terminal stage of polymerization or after completion of the reaction of the vinyl monomer.

[A-b] The method in which, in synthesizing a vinyl polymer by living radical polymerization, a compound having at least 2 sparingly polymerizable alkenyl groups, such as 1,5-hexadiene, 1,7-octadiene or 1,9-decadiene, is reacted at a terminal stage of polymerization or after completion of the reaction of the vinyl monomer.

The following methods [A-c]~[A-f] can be used for producing a vinyl polymer having at least one alkenyl group from a vinyl polymer having at least one highly reactive carbon-halogen bond. The above polymer having at least one highly reactive carbon-halogen bond can be prepared by the processes [E-a] and [E-b] to be described hereinafter.

[A-c] The method which comprises reacting a vinyl polymer having at least one highly reactive carbon-halogen bond with an organometal compound having an alkenyl group, typically represented by organotin compounds such as allyltributyltin, allyltrioctyltin, etc., to substitute an alkenyl-containing substituent for the halogen.

[A-d] The method which comprises reacting a vinyl polymer having at least one highly reactive carbon-halogen bond with a stabilized carbanion having an alkenyl group, which may for example be represented by the general formula (8), to substitute an alkenyl group for the halogen.

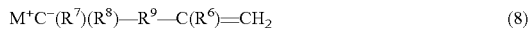
$$M^+C^-(R^7)(R^8)-R^9-C(R^6)=CH_2 \tag{8}$$

(wherein $R^6$ is as defined above; $R^7$ and $R^8$ each represents an electron-withdrawing group which stabilizes the carbanion $C^-$ or one of these represents said electron-withdrawing group with the other being hydrogen, an alkyl group containing 1 to 10 carbon atoms or a phenyl group; $R^9$ represents a direct bond or a $C_{1-10}$ bivalent organic group which may contain one or more ether linkages; $M^+$ represents an alkali metal ion or a quaternary ammonium ion). As the electron-withdrawing group for $R^7$ and $R^8$, a group represented by the formula $-CO_2R$, $-C(O)R$ or $-CN$ is particularly preferred. In the above formula, R represents hydrogen or an alkyl containing 1 to 10 carbon atoms, an aryl containing 6 to 10 carbon atoms or an aralkyl group containing 7 to 10 carbon atoms.

[A-e] The method which comprises permitting an elemental metal, e.g. zinc, or an organometal compound to act upon a vinyl polymer having at least one highly reactive carbon-halogen bond to prepare an enolate anion and, then, reacting it with an electrophilic compound having an alkenyl group, such as an alkenyl-containing compound having a leaving group, e.g. halogen or acetyl, a carbonyl compound having an alkenyl group, an isocyanate compound having an alkenyl group or an acid halide having an alkenyl group.

[A-f] The method which comprises reacting a vinyl polymer having at least one highly reactive carbon-halogen bond with an alkenyl-containing oxyanion, such as the one represented by the general formula (9), or an alkenyl-containing carboxylate anion, such as the one represented by the general formula (10), to substitute an alkenyl-containing substituent for the halogen.

$$H_2C=C(R^6)-R^{10}-O-O^-M^+ \tag{9}$$

(wherein $R^6$ and $M^+$ are as defined above; $R^{10}$ represents a $C_{1-20}$ bivalent organic group which may contain one or more ether linkages)

$$H_2C=C(R^6)-R^{11}-C(O)O^-M^+ \tag{10}$$

(wherein $R^6$ and $M^+$ are as defined above; $R^{11}$ represents a direct bond or a $C_{1-20}$ bivalent organic group which may contain one or more ether linkages)

The vinyl polymer having at least one alkenyl group can also be produced from a vinyl polymer having at least one hydroxyl group. The specific method is not particularly restricted but includes the following methods [A-g] to [A-j], among others. The starting vinyl polymer having at least one hydroxyl group can be prepared by the methods [B-a] to [B-i] to be described hereinafter.

[A-g] The method which comprises permitting a base, such as sodium hydroxide, sodium methoxide, etc., to act on a vinyl polymer having at least one hydroxyl group and then reacting the same with an alkenyl-containing halide such as allyl chloride;

[A-h] The method which comprises reacting an alkenyl-containing isocyanate compound, such as allyl isocyanate or the like, with a vinyl polymer having at least one hydroxyl group;

[A-i] The method which comprises reacting an alkenyl-containing acid halide, such as (meth)acryloyl chloride, with a vinyl polymer having at least one hydroxyl group in the presence of a base such as pyridine; and

[A-j] The method which comprises reacting an alkenyl-containing carboxylic acid, such as acrylic acid, with a vinyl polymer having at least one hydroxyl group in the presence of an acid catalyst.

Referring to the synthesis of said vinyl polymer having at least one alkenyl group, when a halogen is not directly involved in the introduction of the alkenyl group as in the methods [A-a] and [A-b], it is preferable to use the living radical polymerization technique. Between the above methods, the method [A-b] is preferred in view of the relative ease of control. Among variations of living radical polymerization, atom transfer radical polymerization is preferred.

When an alkenyl group is to be introduced by converting the halogen group of a vinyl polymer having at least one highly reactive carbon-halogen bond as in the methods [A-c] to [A-f], it is preferable to use a vinyl polymer having at least one highly reactive terminal carbon-halogen bond as obtained by a radical polymerization (atom transfer radical polymerization) using an organohalogen compound or a sulfonyl halide as the initiator and a transition metal complex as the catalyst. More preferred is the method [A-f] in consideration of the ease of control.

The hydrosilane compound having a crosslinking silyl group for use in the above synthetic method [A] is not particularly restricted but includes compounds represented by the following general formula (11), among others.

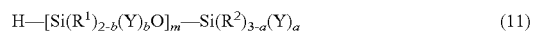
$$H-[Si(R^1)_{2-b}(Y)_b O]_m-Si(R^2)_{3-a}(Y)_a \tag{11}$$

wherein $R^1$, $R^2$, $\underline{a}$, $\underline{b}$, $\underline{m}$ and Y are as defined hereinbefore.

Among these compounds, compounds of the following general formula (12) are preferred from availability points of view.

$$H-Si(R^2)_{3-a}(Y)_a \tag{12}$$

wherein $R^2$, Y and a are as defined above.

In adding said hydrosilane compound having a crosslinking silyl group to the alkenyl group of said polymer in said synthetic method [A], a transition metal complex catalyst is generally used as the hydrosilylation catalyst.

The transition metal catalyst mentioned above is not particularly restricted but includes, among others, platinum metal and a dispersion of solid platinum in a matrix such as alumina, silica, carbon black or the like; chloroplatinic acid; a complex of chloroplatinic acid with an alcohol, aldehyde or ketone; platinum-olefin complexes and platinum(0)-divinyltetramethyldisiloxane complex; and compounds other than platinum compounds, such as $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$, among others. These catalysts can be used independently or two or more of them may be used in a combination of two or more thereof.

The method of synthesizing said vinyl polymer having at least one hydroxyl group for use in the above synthetic method [B] and further in the above methods [A-g] to [A-j] is not particularly restricted but includes the following methods [B-a] to [B-i].

[B-a] The method in which, in synthesizing a vinyl polymer by radical polymerization, a compound having both a polymerizable alkenyl group and a hydroxyl group, such as the compound represented by the following general formula (13), is reacted along with the predetermined vinyl monomer.

$$H_2C=C(R^3)-R^4-R^5-OH \quad (13)$$

(wherein $R^3$, $R^4$ and $R^5$ are as defined above)

The timing of reacting said compound having both a polymerizable alkenyl group and a hydroxyl group is not particularly restricted but, when rubber-like properties are expected of the crosslinked product obtainable by living radical polymerization, this compound is preferably reacted, as a second monomer, at a terminal stage of polymerization or after completion of the reaction of said predetermined vinyl monomer.

[B-b] The method in which, in synthesizing a vinyl polymer by living radical polymerization, an alkenyl alcohol such as 10-undecenol, 5-hexenol or allyl alcohol is reacted at a terminal stage of polymerization or after completion of the reaction of the predetermined monomer.

[B-c] The method for radical polymerization of a vinyl monomer, as described in Japanese Kokai Publication Hei-5-262808, which comprises using a hydroxyl-containing chain transfer agent, such as a hydroxyl-containing polysulfide, in a large quantity.

[B-d] The method for radical polymerization of a vinyl monomer which comprises using hydrogen peroxide or a hydroxyl-containing initiator as described in Japanese Kokai Publication Hei-6-239912 and Japanese Kokai Publication Hei-8-283310, for instance.

[B-e] The method for radical polymerization of a vinyl monomer which comprises using an alcohol in excess as described in Japanese Kokai Publication Hei-6-116312.

[B-f] The method which comprises hydrolyzing the halogen of a vinyl polymer containing at least one highly reactive carbon-halogen bond or reacting it with a hydroxyl-containing compound to introduce a hydroxyl group into the polymer terminus as described in Japanese Kokai Publication Hei-4-132706.

[B-g] The method which comprises reacting a vinyl polymer having at least one highly reactive carbon-halogen bond with a hydroxyl-containing stabilized carbanion, such as the one represented by the following general formula (14), to substitute a hydroxyl-containing substituent for the halogen.

$$M^+C^-(R^7)(R^8)-R^9-OH \quad (14)$$

(wherein $R^7$, $R^8$ and $R^9$ are as defined above). As the electron-withdrawing groups for $R^7$ and $R^8$, $-CO_2R$, $-C(O)R$ and $-CN$ are preferred. In the above formulas, R is as defined above.

[B-h] The method which comprises permitting an elemental metal, e.g. zinc, or an organometal compound to act on a vinyl polymer having at least one highly reactive carbon-halogen bond to prepare an enolate anion and then reacting it with an aldehyde or a ketone.

[B-i] The method which comprises reacting a vinyl polymer having at least one highly reactive carbon-halogen bond with a hydroxyl-containing oxyanion, such as the one represented by the general formula (15), or a hydroxyl-containing carboxylate anion, such as the one represented by the general formula (16) to substitute a hydroxyl-containing substituent for the halogen.

$$HO-R^{10}-O^-M^+ \quad (15)$$

(wherein $R^{10}$ and $M^+$ are both as defined above).

$$HO-R^{11}-C(O)O^-M^+ \quad (16)$$

(wherein $R^{11}$ and $M^+$ are both as defined above)

Referring to the synthesis of said vinyl polymer having at least one hydroxyl group, when a halogen is not directly involved in the introduction of a hydroxyl group as in the above methods [B-a] to [B-e], the living radical polymerization technique is preferred. In consideration of the ease of control, the method [B-b] is preferred. Among variations of living radical polymerization, atom transfer radical polymerization is preferred.

When the halogen of a vinyl polymer having at least one highly reactive carbon-halogen bond is to be converted for the introduction of a hydroxy group as in the above methods [B-f] to [B-i], it is preferable to use a vinyl polymer having at least one highly reactive carbon-halogen bond at the terminus which has been obtained by the radical polymerization (atom transfer radical polymerization) using an organohalogen or sulfonyl halide compound as the initiator and a transition metal complex as the catalyst. In consideration of the ease of control, the method [B-i] is still more preferred.

The compound having both a crosslinking silyl group and an isocyanato or other functional group capable of reacting with a hydroxyl group which is to be used in the above production method [B] is not particularly restricted but includes, among others, γ-isocyanatopropyltrimethoxysilane, γ-isocyanatopropylmethyldimethoxysilane and γ-isocyanatopropyltriethoxysilane. These may be used singly or two or more of them may be used combinedly.

In carrying out the reaction according to the above production method [B] a urethane formation reaction catalyst known in the art may be used.

The compound having both a polymerizable alkenyl group and a crosslinking silyl group to be used in the above production method [C] is not particularly restricted but includes, among others, compounds represented by the general formula (17) shown below, for example trimethoxysilylpropyl (meth)acrylate and methyldimethoxysilylpropyl(meth)acrylate:

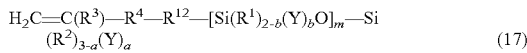
$$H_2C=C(R^3)-R^4-R^{12}-[Si(R^1)_{2-b}(Y)_bO]_m-Si(R^2)_{3-a}(Y)_a \quad (17)$$

wherein $R^1$, $R^2$, $R^3$, $R^4$, Y, a, b and m are as defined above; $R^{12}$ represents a direct bond or a $C_{1-20}$ bivalent organic group optionally containing one or more ether linkages. These may be used singly or two or more of them may be used in combination.

In the above synthetic method [C], the timing of reacting said compound having both a polymerizable alkenyl group and a crosslinking silyl group is not particularly restricted but, when rubber-like properties are expected of the crosslinked product obtained by living radical polymerization, this compound is preferably reacted, as a second monomer, at a terminal stage of polymerization or after completion of the reaction of the predetermined vinyl monomer.

The chain transfer agent having a crosslinking silyl group for use in the above synthetic method [D] is not particularly restricted but includes crosslinking silyl group-containing mercaptan compounds and hydrosilane compounds having a crosslinking silyl group as disclosed in Japanese Kokoku Publication Hei-3-14068 and Japanese Kokoku Publication Hei-4-55444, among others.

In the radical polymerization of a vinyl monomer, by reacting a compound having both a polymerizable alkenyl group and a crosslinking silyl group as represented by the above general formula (17) along with a crosslinking silyl group-containing chain transfer agent and the predetermined vinyl monomer, the amount of the crosslinking silyl group introduced can be controlled as desired. Furthermore, in order to enhance the rate of introduction of the crosslinking silyl group, a radical initiator having the crosslinking silyl group can also be used in combination.

The method of synthesizing the vinyl polymer having at least one highly reactive carbon-halogen bond for use in the above synthetic method [E] and further in the above methods [A-c] to [A-f] and [B-f] to [B-i] is not particularly restricted but includes the following processes [E-a] and [E-b].

[E-a] A radical polymerization process which, as described in, inter alia, Japanese Kokai Publication Hei-4-132706, comprises using a halogen compound, such as carbon tetrachloride, ethylene chloride, carbon tetrabromide, methylene bromide or the like, as the chain transfer agent (chain transfer agent technique).

[E-b] An atom transfer radical polymerization process which comprises using an organohalogen compound or a sulfonyl halide compound as the initiator and a transition metal complex as the catalyst.

The crosslinking silyl group-containing stabilized carbanion for use in the above synthetic method [E] is not particularly restricted but includes compounds represented by the following general formula (18), among others.

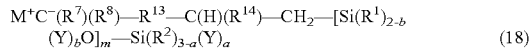
(18)

wherein $R^1$, $R^2$, $R^7$, $R^8$, Y, a, b and m are respectively as defined hereinbefore; $R^{13}$ represents a direct bond or a bivalent organic group of 1 to 20 carbon atoms which may optionally contain one or more ether linkages; $R^{14}$ represents a hydrogen atom, an alkyl group containing 1 to 10 carbon atoms, an aryl group containing 6 to 10 carbon atoms or an aralkyl group containing 7 to 10 carbon atoms; $R^7$ and $R^8$ each represents an electron-withdrawing group which is preferably —$CO_2R$, —$C(O)R$ or —CN, where R has the same meaning as defined hereinbefore.

When the curable composition according to the first aspect of the invention is required to give a cured product having rubber-like properties in particular, it is preferable that at least one crosslinking silyl group is present at the molecular chain terminus, for the molecular mass between crosslinking points, which has considerable bearings on rubber elasticity, can then be large. More preferably, all crosslinking silyl groups are located at molecular chain termini.

The technology of producing a vinyl polymer having at least one crosslinking silyl group at the molecular chain terminus, particularly such a (meth)acrylic polymer, is described in, Japanese Kokoku Publication Hei-3-14068, Japanese Kokoku Publication Hei-4-55444 and Japanese Kokai Publication Hei-6-211922. However, since these are invariably free radical polymerization processes utilizing said "chain transfer agent technique", the resulting polymer contains crosslinking silyl groups at molecular chain termini at a fairly high rate but has the drawback that the molecular weight distribution value, represented by Mw/Mn, is as large as 2 or more and, hence, the viscosity of the polymer is high. Therefore, in order to provide a vinyl polymer having a small molecular weight distribution value, hence a low viscosity value, and, yet, a high proportion of crosslinking silyl groups at molecular chain termini, the "living radical polymerization technique" mentioned hereinbefore is preferably employed.

Therefore, the vinyl polymer having at least one hydroxyl, halogen or alkenyl group for use in synthesizing said vinyl polymer having at least one crosslinking silyl group preferably has such a functional group at a molecular chain terminus.

To produce a vinyl polymer having at least one said crosslinking silyl group at the molecular chain terminus by the "atom transfer radical polymerization technique" which is the preferred variation of the "living radical polymerization" method, the initiator to be used is preferably an organohalogen or sulfonyl halide compound having two or more initiation points. The resulting vinyl polymer having at least one highly reactive carbon-halogen bond at the molecular chain terminus can be easily converted to the corresponding vinyl polymer having at least one said crosslinking silyl group at the molecular chain terminus.

An organohalogen or sulfonyl halide compound having two or more initiation sites is not particularly restricted but includes the following compounds, among others.

o-, m- or p-$XCH_2$—$C_6H_4$—$CH_2X$, o-, m- or p-$CH_3C(H)$(X)—$C_6H_4$—$C(H)(X)CH_3$, o-, m- or p-$(CH_3)_2C(X)$—$C_6H_4$—$C(X)(CH_3)_2$
(in the above formulas, $C_6H_4$ stands for a phenylene group; X represents a chlorine, bromine or iodine atom), $RO_2C$—$C(H)(X)$—$(CH_2)_n$—$C(H)(X)$—$CO_2R$, $RO_2C$—$C(CH_3)(X)$—$(CH_2)_n$—$C(CH_3)(X)$—$CO_2R$, $RC(O)$—$C(H)(X)$—$(CH_2)_n$—$C(H)(X)$—$C(O)R$, $RC(O)$—$C(CH_3)(X)$—$(CH_2)_n$—$C(CH_3)(X)$—$C(O)R$
(in the above formulas, R represents an alkyl, aryl, or aralkyl group containing up to 20 carbon atoms, n represents an integer of 0 to 20; X represents a chlorine, bromine or iodine atom), $XCH_2$—$C(O)$—$CH_2X$, $H_3C$—$C(H)(X)$—$C(O)$—$C(H)(X)$—$CH_3$, $(H_3C)_2C(X)$—$C(O)$—$C(X)$$(CH_3)_2$, $C_6H_5C(H)(X)$—$(CH_2)_n$—$C(H)(X)C_6H_5$
(in the above formulas, X represents a chlorine, bromine or iodine atom; n represents an integer of 0 to 20), $XCH_2CO_2$—$(CH_2)_n$—$OCOCH_2X$, $CH_3C(H)(X)CO_2$—$(CH_2)_n$—$OCOC(H)(X)CH_3$, $(CH_3)_2C(X)CO_2$—$(CH_2)_n$—$OCOC(X)(CH_3)_2$
(in the above formulas, n represents an integer of 1 to 20), $XCH_2C(O)C(O)CH_2X$,¯ $CH_3C(H)(X)C(O)C(O)C(H)(X)$$CH_3$, $(CH_3)_2C(X)C(O)C(O)C(X)(CH_3)_2$, o, m- or p-$XCH_2CO_2$—$C_6H_4$—$OCOCH_2X$, o-, m- or p-$CH_3C(H)$$(X)CO_2$—$C_6H_4$—$OCOC(H)(X)CH_3$, o-, m- or p-$(CH_3)_2C$$(X)CO_2$—$C_6H_4$—$OCOC(X)(CH_3)_2$, o-, m- or p-$XSO_2$—$C_6H_4$—$SO_2X$ (in the above formulas, X represents a chlorine, bromine or iodine atom). These compounds can be used each independently or in a combination of two or more thereof.

For the production of a vinyl polymer having a crosslinking silyl group at both molecular chain termini, not only the above-mentioned method using an organohalogen or sulfonyl halide compound having two initiation points as the initiator according to said atom transfer radical polymerization technique but also the method using an organohalogen compound containing a crosslinking silyl group (synthetic method [F]) can be used with advantage.

The above organohalogen having a crosslinking silyl group is not particularly restricted but includes compounds represented by the following general formulas (19) and (20) among others.

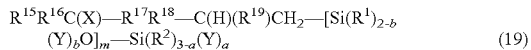

(wherein $R^1$, $R^2$, $\underline{a}$, $\underline{b}$, $\underline{m}$, X and Y are as defined above; $R^{15}$ and $R^{16}$ may be the same or different and each represents a hydrogen atom, an alkyl group containing 1 to 20 carbon atoms, an aryl group containing 6 to 20 carbon atoms or an aralkyl group containing 7 to 20 carbon atoms; $R^{15}$ and $R^{16}$ may be linked to each other at the respective free termini; R represents —C(O)O—, —C(O)—, or an o-, m- or p-phenylene group; $R^{18}$ represents a direct bond or a bivalent organic group of 1 to 10 carbon atoms which may optionally contain one or more ether linkages; $R^{19}$ represents a hydrogen atom, an alkyl group containing 1 to 10 carbon atoms, an aryl group containing 6 to 10 carbon atoms or an aralkyl group containing 7 to 10 carbon atoms.

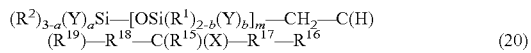

(wherein $R^1$, $R^2$, $R^{15}$, $R^{16}$, $R^{17}$, $R^{18}$, $R^{19}$, $\underline{a}$, $\underline{b}$, $\underline{m}$, X and Y are as defined above)

When the "atom transfer radical polymerization" reaction is carried out using the above-mentioned organohalogen having a crosslinking silyl group as the initiator, there is obtained a vinyl polymer having the crosslinking silyl group at one terminus and the highly reactive carbon-halogen bond at the other terminus. By converting the terminal halogen atom of this vinyl polymer to a crosslinking silyl-containing substituent group, for example by the technique described above, there can be obtained a vinyl polymer having the crosslinking silyl group at both molecular chain termini.

The above vinyl polymer having crosslinking silyl groups at both termini can also be produced by causing the halogen atoms of said vinyl polymer to undergo mutual coupling using a compound having at least two same or different functional groups substitutable for the halogen atoms at said termini.

The above compound having at least two functional groups, same or different, which are substitutable for the halogen atoms at said termini is not particularly restricted but includes polyols, polyamines, polycarboxylic acids, polythiols and salts thereof; alkali metal sulfides; and so forth.

Further, when an organohalogen compound containing an alkenyl group is used as the initiator in said "atom transfer radical polymerization", there is obtained a vinyl polymer having the alkenyl group at one molecular chain terminus and the halogen atom at the other terminus. By converting the terminal halogen atom of this vinyl polymer to an alkenyl group-containing substituent by the technique described hereinbefore, there can be obtained a vinyl polymer having the alkenyl group at both molecular chain termini. By converting these alkenyl groups to crosslinking silyl groups, for example by the technique described hereinbefore, there can be obtained a vinyl polymer having the crosslinking silyl group at both molecular chain termini.

While the vinyl polymer having at least one said crosslinking silyl group at the molecular chain terminus may be obtained by an arbitrary combination of the processes described hereinbefore, the following synthetic processes A and B can be mentioned as typical processes.

Synthetic Process A

This process comprises.

(1) a step of polymerizing a vinyl monomer by an atom transfer radical polymerization technique to synthesize a halogen-terminated vinyl polymer, (2) a step of reacting the halogen-terminated vinyl polymer obtained in the above step (1) with an alkenyl group-containing oxyanion to effect substitution for the halogen and thereby synthesize an alkenyl-terminated vinyl polymer and (3) a step of adding a hydrosilane compound having a crosslinking silyl group represented by the general formula (1) to the terminal alkenyl group of the alkenyl-terminated vinyl polymer obtained in the above step (2) to effect conversion to a substituent containing said crosslinking silyl group.

Synthetic Process B

This process comprises (1) a step of polymerizing a vinyl monomer by said living radical polymerization technique to prepare a vinyl polymer, (2) a step of reacting the polymer further with a compound having at least two sparingly polymerizable (low-polymerizability) alkenyl groups to synthesize an alkenyl-terminated vinyl polymer, and (3) a step of adding a hydrosilane compound having a crosslinking silyl group represented by the general formula (1) to the terminal alkenyl group of the alkenyl-terminated vinyl polymer obtained in the above step (2) to effect conversion to a substituent containing said crosslinking silyl group.

[Photocurable Substance as (B) Component]

The photocurable substance for use as said (B) component used in the first aspect of the invention is a substance which, when exposed to light, undergoes chemical change in molecular structure, hence physical changes such as curing, in a short period of time. While the photocurable substance (B) in the first aspect of the invention may cure on exposure to light, a representative example is a substance which can be cured by allowing it to stand in a sunlit interior environment (near a window) at room temperature for one day. As compounds of this type, many organic monomers, oligomers, resins and compositions containing any of them are known. Thus, unsaturated acrylic compounds, poly(vinyl cinnamate) compounds and azido resins, among others, can be mentioned by way of example.

The unsaturated acrylic compounds mentioned above include monomers having an unsaturated group represented by the following general formula (21), the corresponding oligomers, and mixtures thereof.

wherein $R^6$ is as defined hereinbefore.

More particularly, the unsaturated acrylic compounds include (meth)acrylic esters of low molecular alcohols such as ethylene glycol, glycerol, trimethylolpropane, pentaerythritol, neopentyl alcohol, etc.; (meth)acrylic esters of alcohols obtainable by the modification of bisphenol A, acids such as isocyanuric acid, or said low molecular alcohols with ethylene oxide or propylene oxide; (meth)acrylic esters of polyether polyols each comprising a polyether as its main chain and having a hydroxyl group at its terminus, polymer polyols obtainable by radical polymerization of a vinyl monomer in a polyol having a polyether as its main chain, polyester polyols each comprising a polyester as its main chain and having a hydroxyl group at its terminus, or polyols each having a main chain comprised of a vinyl or (meth)acrylic polymer and a hydroxyl group within said main chain; epoxy acrylateoligomers each obtainable by reacting bisphenol A or a novolac epoxy resin with (meth)acrylic acid; and urethane acrylate oligomers each having a urethane bond and a (meth)acrylate group within the molecular chain as obtainable by the reaction of a polyol, a polyisocyanate and a hydroxyl-containing (meth)acrylate, for instance.

The poly(vinyl cinnamate) compounds are photosensitive resins containing a cinnamoyl group as the photoreactive group and include poly (vinyl alcohol) cinnamate and many derivatives of poly(vinyl cinnamate).

The azido resin is known as photosensitive resin containing an azido group as the photoreactive group and generally includes not only rubber photosensitive liquids supplemented with azide compounds as photosensitive agents but also the resins described in "Photosensitive Resin" (Printing Society Press (Mar. 17, 1972), p. 93 et seq., 106 to 117 et seq.). These can be used each independently or in admixture, or where necessary even with a sensitizer added.

Among the photocurable substances mentioned for the (B) component, unsaturated acrylic compounds are preferred from the standpoint of ease of handling.

The photocurable substance (B) is added preferably in a proportion of 0.01 to 20 weight parts based on 100 weight parts of said vinyl polymer having a crosslinking silyl group (A1). At any addition amount below 0.01 weight part, the effect of addition is small. If the amount of 20 weight parts is exceeded, physical properties tend to be adversely affected. There are cases in which the effect is potentiated when a sensitizer, such as a ketone and a nitro compound, and/or a promoter, such as an amine, is added.

[Optional Components]

In the curable composition according to the first aspect of the invention, a curing catalyst or a curing agent is sometimes required. Moreover, according to the desired physical properties, various auxiliary agents may be formulated.

<Curing Catalyst/Curing Agent>

The crosslinking silyl group-containing polymer crosslinks and cures as it undergoes siloxane bonding in the presence or absence of one of the various known condensation catalysts. As regards the properties of the cured product, a broad spectrum of products ranging from a rubbery product to a resinous product can be liberally produced by designing the molecular weight and backbone structure of the polymer judiciously.

The condensation catalyst which can be used includes various known silanol condensation catalysts, for example tetravalent tin compounds such as dibutyltin dilaurate, dibutyltin diacetate, dibutyltin diethylhexanolate, dibutyltin dioctoate, dibutyltin di(methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate) and dioctyltin di(isooctyl maleate); titanic acid esters such as tetrabutyl titanate and tetrapropyl titanate; organoaluminum compounds such as aluminum trisacetylacetonate, aluminum tris(ethyl acetoacetate) and diisopropoxyaluminum ethyl acetoacetate; chelate compounds such as zirconium tetraacetylacetonate and titanium tetraacectylacetonate; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; low-molecular-weight polyamide resins obtained from an excess polyamine and a polybasic acid; reaction products from an excess polyamine and an epoxy compound; amino-containing silane coupling agents such as γ-aminopropyltrimethoxysilane and N-(β-aminoethyl)-aminopropylmethyldimethoxysilane; and, further, other acidic and basic silanol condensation catalysts.

These catalysts can be used each independently or in a combination of two or more thereof. The formulating amount of the condensation catalyst is preferably about 0.1 to 20 weight parts, more preferably 1 to 10 weight parts, relative to 100 weight parts of the vinyl polymer having at least one crosslinking silyl group (A1) When the formulating amount of the silanol condensation catalyst is below the above range, the curing velocity may be decreased and the curing reaction may not proceed fully. On the other hand, when the formulating amount of the silanol condensation catalyst exceeds the above range, local heating and foaming tend to take place in curing to make it impossible to obtain a satisfactory cured product. Moreover, since the pot life of the composition is too shortened, workability is adversely affected.

In the curable composition according to the first aspect of the invention, a non-silanol group-containing silicon compound of the following general formula (22) maybe formulated for the purpose of enhancing the condensation catalyst activity.

$$R^{49}{}_{a}Si(OR^{50})_{4-a} \tag{22}$$

(wherein $R^{49}$ and $R^{50}$ each independently represents a substituted or unsubstituted hydrocarbon group containing 1 to 20 carbon atoms; a represents any of 0, 1, 2 and 3)

The silicon compound mentioned just above is not particularly restricted but is preferably the compound of the general formula (22) wherein $R^{49}$ is an aryl group containing 6 to 20 carbon atoms, such as, for example, phenyltrimethoxysilane, phenylmethyldimethoxysilane, phenyldimethylmethoxysilane, diphenyldimethoxysilane, diphenyldiethoxysilane or triphenylmethoxysilane, for such compound is highly capable of accelerating the curing reaction of the composition. Particularly, diphenyldimethoxysilane and diphenyldiethoxysilane are most preferred from availability and cost points of view.

The formulating amount of said silicon compound is preferably about 0.01 to 20 weight parts, more preferably 0.1 to 10 weight parts, based on 100 weight parts of the vinylpolymer having at least one crosslinking silyl group (A1). When the formulating amount of said silicon compound is below the above range, the accelerating effect on curing reaction tends to be decreased. On the other hand, when the silicon compound is formulated in excess of the above range, the hardness and tensile strength of the cured product tend to be decreased.

<Adhesion-Imparting Agent>

The composition of the invention may be supplemented with a silane coupling agent and/or an adhesion-imparting agent other than silane coupling agents. As examples of the silane coupling agent, there can be mentioned isocyanato-containing silanes such as y-isocyanatopropyltrimethoxysilane, γ-isocyanatopropyltriethoxysilane, γ-isocyanatopropylmethyl-diethoxysilane, γ-isocyanatopropylmethyldimethoxysilane, etc.; amino-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, etc.; mercapto-containing silanes such as γ-mercaptopropyltrimethoxysilane, γ-mercaptopropyltriethoxysilane, γ-mercaptopropyl-methyldimethoxysilane, γ-mercaptopropylmethyldiethoxysilane, etc.; epoxy-containing silanes such as γ-glycidoxypropyltrimethoxysilane, γ-glycidoxy-propyltriethoxysilane, γ-glycidoxypropylmethyl-dimethoxysilane, β-(3,4-epoxycyclohexyl)ethyl-trimethoxysilane, β-(3,4-epoxycyclohexyl)ethyl-triethoxysilane, etc.; carboxysilanes such as β-carboxyethyltriethoxysilane, β-carboxyethylphenylbis(2-methoxyethoxy)silane, N-β-(carboxymethyl)aminoethyl-γ-aminopropyltrimethoxysilane, etc.; vinyl unsaturated group-containing silanes such as vinyltrimethoxysilane, vinyltriethoxysilane, γ-methacryloyloxypropylmethyldimethoxysilane, γ-acryloyloxypropylmethyltriethoxysilane, etc.; halogen-containing silanes such as γ-chloropropyltrimethoxysilane etc.; and isocyanurate silanes such as tris(trimethoxysilyl)isocyanurate etc., among others. Moreover, modification products of these compounds, such as amino-modified silyl polymers, silylated amino polymers, unsaturated aminosilane complexes, phenylamino-long-chain-alkylsilanes, aminosilylated silicones, silylated polyesters, etc. can also be used.

In practice of this invention, the silane coupling agent is generally used in a proportion of 0.1 to 20 weight parts based on 100 weight parts of the vinyl polymer having a crosslinking silyl group (A1). The preferred proportion is 0.5 to 10 weight parts. As to the effect of the silane coupling agent so added to the curable composition of the invention, when the composition is applied to various adherends, namely inorganic substrates such as glass, aluminum, stainless steel, zinc, copper, mortar, etc. or organic substrates such as poly(vinyl chloride), polyacrylic, polyester, polyethylene, polypropylene, polycarbonate and other resins, remarkable adhesion-improving effects appear both under non-primer and under primer conditions. When used under non-primer conditions, the adhesion-improving effect to various adherends is particularly pronounced.

The specific examples other than silane coupling agents are not particularly restricted but include epoxy resins, phenolic resins, sulfur, alkyl titanates and aromatic polyisocyanates, among others.

The above adhesion-imparting agents may be used each independently or as a mixture of two or more species. Addition of any of these adhesion-imparting agents contributes to the adhesion to various adherends.

<Filler>

In the curable composition of the invention, there may be incorporated various fillers as needed. As such fillers, there can be mentioned various reinforcing fillers such as woodmeal, pulp, cotton chips, asbestos, glass fibers, carbon fibers, mica flakes, walnut shell flour, rice hull flour, graphite, diatomaceous earth, clay, fumed silica, precipitated silica, crystalline silica, fused silica, dolomite, silicic anhydride, hydrous silicic acid and carbon black; fillers such as calcium carbonate, magnesium carbonate, diatomaceous earth, calcined clay, clay, talc, titanium dioxide, bentonite, organic bentonite, ferric oxide, finely divided aluminum, flint powder, zinc oxide, activated zinc white, zinc dust and shirasu balloons; and fibrous fillers such as asbestos fibers, glass fibers and filaments and so forth. Preferred, among these fillers, are precipitated silica, fumed silica, crystalline silica, fused silica, dolomite, carbon black, calcium carbonate, titanium dioxide and talc. For obtaining high-strength cured products using such fillers, there can be used a filler selected mainly from among fumed silica, precipitated silica, silicic anhydride, hydrous silicic acid, carbon black, surface-treated fine calcium carbonate, crystalline silica, fused silica, calcined clay, clay, activated zinc white and so on. When cured products of low strength but high elongation are desired, there can be used a filler selected mainly from among titanium oxide, calcium carbonate, talc, ferric oxide, zinc oxide, shirasu balloons and the like. These fillers may be used singly or two or more of them may be used in admixture. The addition amount of the filler, when used, is not particularly restricted but is preferably 10 to 1000 parts, more preferably 50 to 300 parts, based on 100 parts of the vinyl polymer (A1).

<Plasticizer>

In the curable composition of the invention, there may be incorporated various plasticizers as needed. The plasticizer is not particularly restricted but, according to the physical property or appearance characteristic desired, use may be made of, for example, the following, either singly or in a combination of two or more: phthalic acid esters such as dibutyl phthalate, diheptyl phthalate, di(2-ethylhexyl)phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinolate; polyalkylene glycol esters such as diethylene glycol dibenzoate, triethylene glycol dibenzoate and pentaerythritol esters; phosphoric acid esters such as tricresyl phosphate and tributyl phosphate; trimellitic acid esters; chlorinated paraffins; hydrocarbon oils such as alkyldiphenyls and partially hydrogenated terphenyl; process oils; polyethers such as polyethylene glycol and polypropylene glycol; epoxy plasticizers such as epoxidized soybean oil and benzyl epoxystearate; and polyester plasticizers; among others. The addition of these plasticizers is not always essential, however. It is also possible to incorporate these plasticizers in the stage of polymer production.

<Solid-state modifier>

The curable composition of the invention may be optionally supplemented with a solid-state modifier for controlling the tensile characteristics of the cured product.

The solid-state modifier is not particularly restricted but includes alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyidiisopropenoxysilane, functional group-containing alkoxysilanes such as γ-glycidoxypropylmethyldimethoxysilane, γ-glycidoxy-propyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyl-dimethoxysilane; silicone varnishes; and polysiloxanes; among others. By using such a solid-state modifier, it is possible to increase or decrease the hardness or increase the elongation on the occasion of curing of the composition of the invention. These solid-state modifiers may be used each independently or in a combination of two or more thereof.

<Thixotropic Agent (Antisagging Agent)>

The curable composition of the invention may be supplemented with a thixotropic agent (antisagging agent) for prevention of sagging and improved workability as needed.

The antisagging agent is not particularly restricted but includes polyamide waxes; hydrogenated castor oil derivatives; and metal soaps such as calcium stearate, aluminum stearate and barium stearate, among others. These thixotropic agents (antisagging agents) may be used each independently or in a combination of two or more thereof.

Other Additives

For the purpose of adjusting various physical properties of the curable composition or cured product, the curable composition of the invention may be supplemented with various additives as necessary. As typical additives, there can be mentioned flame retardants, curability modulators, aging inhibitors, radical terminators, ultraviolet absorbers, metal ion deactivator, ozone degradation inhibitors, light stabilizers, phosphorus-type peroxide decomposers, lubricants, pigments, blowing agents, and photocurable resin. These various additives may be used singly or in a combination of two or more species.

Specific examples of those additives are described in the specifications of Japanese Kokoku Publication Hei-4-69659, Japanese Kokoku Publication Hei-7-108928, Japanese Kokai Publication Sho-63-254149 and Japanese Kokai Publication Sho-64-22904.

The curable composition of the present invention can be prepared as a one-component system such that all the components are premixed and sealed and, after application or installation, let the whole be cured in situ by atmospheric moisture or as a two-component system such that a curing agent comprising the curing catalyst, filler, plasticizer, water, etc. and a polymer composition are admixed prior to application.

[Uses]

Though not restricted, the curable composition of this invention finds application in a broad spectrum of uses, for example sealants such as architectural elastic sealants, composite-glass sealants, electric/electronic component materials such as a solar cell back sealant, etc., electrical insulating materials such as conductor/cable insulation sheaths, etc., adhesives, self-adhesives, elastic adhesives, coatings, powder coatings, coating dopes, foams, electric/electronic potting materials, film, gaskets, potting compounds, various molding compounds, rust-preventive, water-proofing sealants for wire-reinforced glass or laminated glass edges (cut edges) and so on.

<<The Second Aspect of the Invention>>

The curable composition according to the second aspect of the present invention is now described in detail.

The curable composition according to the second aspect of the invention comprises (A2) a vinyl polymer having a crosslinking silyl group and (C) an air oxidation-curable substance. The vinyl polymer for use as the component (A2) is identical with the vinyl polymer (A1) so far described.

[Air Oxidation-Curable Substance for (C) Component]

The air oxidation-curable substance for use as the (C) component in the second aspect of the invention is a compound containing an unsaturated group capable of being crosslinked and cured by the atmospheric oxygen. The air oxidation-curable substance (C) for use in this second aspect of the invention is a substance which undergoes curing on contact with air, more specifically a substance having the property to cure by reacting with oxygen in the air. A representative air oxidation-curable substance can be cured, for example by allowing it to stand in an interior environment at room temperature for one day.

The air oxidation-curable substance includes drying oils such as tung oil, linseed oil, etc.; various alkyd resins obtainable by modifying such drying oils, drying oil-modified acrylic polymers, epoxy resins or silicone resins; polymers or copolymers of $C_{5-8}$ dienes such as 1,2-polybutadiene, 1,4-polybutadiene, etc., and various modification products e.g. maleated, boiled oil-modified, etc.) of said polymers or copolymers. Of these substances, tung oil, liquid species of diene polymers (liquid diene polymers) and modification products thereof are particularly preferred.

As said liquid diene polymers, there can be mentioned liquid polymers obtainable by polymerizing or copolymerizing such diene compounds as butadiene, chloroprene, isoprene, 1,3-pentadiene, etc.; NBR, SBR and other polymers obtainable by copolymerizing said diene compounds with a copolymerizable monomer such as acrylonitrile, styrene and the like in the ratio such that a diene monomer is mainly shared and various modification products thereof (maleated, boiled oil-modified, etc.). These polymers can be used each independently or in a combination of two or more thereof. Among these liquid diene compounds, liquid polybutadiene is particularly preferred.

The air oxidation-curable substance may be used each independently or in a combination of two or more thereof. Further, an enhanced effect may at times be obtained when such an air oxidation-curable substance is used in combination with a catalyst promoting an oxidation-curing reaction or a metallic dryer. As examples of said catalyst or metallic dryer, there can be mentioned various metal salts such as cobalt naphthenate, lead naphthenate, zirconium naphthenate, cobalt octanoate, zirconium octanoate, etc. and amine compounds.

The air oxidation-curable substance (C) is added preferably in a proportion of 0.01 to 20 weight parts to 100 weight parts of the vinyl polymer having a crosslinking silyl group (A2). At an addition amount below 0.01 weight parts, the effect of addition is small. Over 20 weight parts, adverse effects on physical properties may be encountered.

The curable composition according to the second aspect of the invention may be supplemented with various optional components similar to those mentioned for the first aspect of the invention.

The curable composition according to the second aspect of the present invention can be prepared as a one-component system such that all the components are premixed and sealed and, after application, let it be cured in situ by atmospheric moisture or as a two-component system such that a curing agent comprising the curing catalyst, filler, plasticizer, water, etc. and a polymer composition are admixed prior to application.

Though not restricted, the curable composition according to the second aspect of the invention finds application in a broad spectrum of uses, for example sealants such as architectural elastic sealants, composite-glass sealants, electric/electronic materials such as a solar cell back sealant, etc., electrical insulating materials such as conductor/cable insulation sheaths, etc., adhesives, self-adhesives, elastic adhesives, coatings, powder coatings, coating dopes, foams, electric/electronic potting materials, film, gaskets, potting compounds, various molding compounds, rust-preventive, water-proofing sealants for wire-reinforced glass or laminated glass edges (cut edges) and so on.

<The Third Aspect of the Invention>

The curable composition according to the third aspect of the invention is now described in detail.

The curable composition according to the third aspect of the invention comprises (A3) a crosslinking functional group-containing vinyl polymer and (D) a high molecular plasticizer.

[The Vinyl Polymer for (A3) Component]

The main chain and method for production of the vinyl polymer (A3) are the same as those described for the vinyl polymer (A1).

<Crosslinking Functional Group>

The crosslinking functional group of the vinyl polymer (A3) is not particularly restricted but is preferably a crosslinking silyl group, an alkenyl group, a hydroxyl group, an amino group, a polymerizable carbon-carbon double bond, or an epoxy group. These crosslinking functional groups can be selectively used according to the intended application/object.

Number of crosslinking functional groups

The crosslinking functional group should exist in the number of at least one on the average per molecule of polymer (A3). When this crosslinking functional groups is less than one per molecule, no sufficiently cured product can be obtained. The average number of crosslinking functional groups per molecule necessary to give a satisfactory cured product is generally 1.1 to 5, preferably 1.2 to 4, more preferably 1.3 to 3.

Position of the Crosslinking Functional Group

When the curable composition according to the third aspect of the invention is required to give a cured product having rubber-like properties in particular, it is preferable that at least one crosslinking functional group is present at the molecular chain terminus, for the molecular mass between crosslinking points, which has considerable bearings on rubber elasticity, can then be large. More preferably, all crosslinking functional groups are located at molecular chain termini.

The technology of producing a vinyl polymer having at least one crosslinking functional group at the molecular chain terminus, particularly such a (meth)acrylic polymer, is described in, Japanese Kokoku Publication Hei-3-14068, Japanese Kokoku Publication Hei-4-55444 and Japanese Kokai Publication Hei-6-211922. However, since these are invariably free radical polymerization processes utilizing said "chain transfer agent technique", the resulting polymer has crosslinking functional groups at molecular chain termini at a fairly high rate but has the drawback that the molecular weight distribution value, represented by Mw/Mn, is as large as 2 or more and, hence, the viscosity of the polymer is high. Therefore, in order to provide a vinyl polymer having a small molecular weight distribution value, hence a low viscosity value, and, yet, a high proportion of crosslinking functional groups at molecular chain termini, the "living radical polymerization technique" mentioned hereinbefore is preferably employed.

These functional groups are explained below. The crosslinking silyl group is preferably the one described for the first aspect of the invention.

Alkenyl Group

The alkenyl group in this invention is not particularly restricted but is preferably one represented by the following general formula (23).

$$H_2C=C(R^{11})— \qquad (23)$$

(wherein $R^{11}$ represents a hydrogen atom or a hydrocarbon group containing 1 to 20 carbon atoms)

Referring to the above general formula (23), $R^{11}$ is a hydrogen atom or a hydrocarbon group containing 1 to 20 carbon atoms such as, for example, the following.

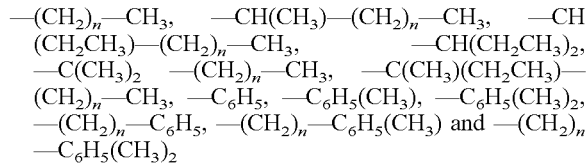

(n is an integer of 0 or more; the total number of carbon atoms in each group is up to 20 at the maximum)

The preferred, among them, is a hydrogen atom.

Furthermore, it is preferable, though not essential, that the alkenyl group of polymer (A3) is not in an activated state due to a carbonyl, alkenyl or aromatic ring conjugated to its carbon-carbon double bond.

The mode of linkage between the alkenyl group and the main chain is not particularly restricted but they are preferably linked to each other through a carbon-carbon bond, an ester linkage, an ester linkage, a carbonate bond, an amido linkage, or a urethane linkage.

Amino Group

The amino group in this invention is not particularly restricted but may for example be a group represented by the formula $$—NR^{12}_2$$

(wherein $R^{12}$ represents a hydrogen atom or a univalent organic group containing 1 to 20 carbon atoms; the two $R^{12}$ groups may be the same or different and may be joined to each other at the respective free termini to form a cyclic structure). It may also be an ammonium salt as represented by the formula:

$$—(NR^{12}_3)^+X^-$$

(wherein $R^{12}$ represents a hydrogen atom or a univalent organic group containing 1 to 20 carbon atoms; the two $R^{12}$ groups may be the same or different and may be joined to each other at the respective free termini to form a cyclic structure; $X^-$ represents a counter anion)

In the above formulas, $R^{12}$ is a hydrogen atom or a univalent organic group containing 1 to 20 carbon atoms. More particularly, it may for example be a hydrogen atom, an alkyl group containing 1 to 20 carbon atoms, an aryl group containing 6 to 20 carbon atoms, or an aralkyl group containing 7 to 20 carbon atoms. The two $R^{12}$ groups may be the same or different. Further, these groups may be joined to each other at the respective free termini to form a cyclic structure.

Polymerizable Carbon-Carbon Double Bond

The group having a polymerizable carbon-carbon double bond is preferably a group of the following general formula (24):

$$—OC(O)C(R^{13})=CH_2 \qquad (24)$$

(wherein $R^{13}$ represents a hydrogen atom or a univalent organic group containing 1 to 20 carbon atoms), more preferably a group of the above formula wherein $R^{13}$ represents a hydrogen atom or a methyl group.

Referring to the above general formula (24), $R^{13}$ is not particularly restricted but includes, among others, the following species:

—H, —CH$_3$, —CH$_2$CH$_3$, —(CH$_2$)$_n$CH$_3$ (n represents an integer of 2 to 19), —C$_6$H$_5$, —CH$_2$OH, and —CN. Preferred is —H or —CH$_3$.

<Method for Introduction of the Crosslinking Functional Group>

The method of introducing a functional group into the vinyl polymer is described below, although this method is not an exclusive choice.

It is to be understood that when a crosslinking silyl group, an alkenyl group or a hydroxyl group is to be introduced by terminal functional group transformation, the processes described hereinbefore can be utilized with advantage.

Epoxy Group

The vinyl polymer having an epoxy group in accordance with this invention can be produced for example by the process comprising the following steps:

(1) a step of polymerizing a vinyl monomer by a living radical polymerization technique to obtain a vinyl polymer and
(2) a step of reacting the polymer with a compound having both an epoxy group and an ethylenically unsaturated group.

An alternative process comprises reacting an allyl alcohol at the terminal stage of atom transfer radical polymerization and, thereafter, effecting an epoxy-cyclization utilizing a hydroxyl group and a halogen group.

Amino Group

A process for producing a vinyl polymer having an amino group at least one terminus of its main chain comprises the following steps:

(1) a step of preparing a vinyl polymer having a halogen group at least one terminus of its main chain to obtain a vinyl polymer and
(2) a step of reacting an amino-containing compound with the polymer to convert the terminal halogen to an amino-containing substituent.

The amino-containing substituent mentioned above is not particularly restricted but may for example be a group of the general formula (25):

—O—R$^{26}$—NR$^{12}$$_2$  (25)

(wherein R$^{26}$ represents a C$_{1-20}$ bivalent organic group optionally containing one or more ether or ester linkages; R$^{12}$ represents a hydrogen atom or a univalent organic group containing 1 to 20 carbon atoms and the two R$^{12}$ groups may be the same or different and may be joined to each other at the respective free termini to form a cyclic structure).

Referring to the above general formula (25), R$^{26}$ is a C$_{1-20}$ bivalent organic group optionally containing one or more ether or ester linkages, such as, for example, an alkylene group containing 1 to 20 carbon atoms, an arylene group containing 6 to 20 carbon atom or an aralkylene group containing 7 to 20 carbon atoms, preferably a group represented by the formula:

—C$_6$H$_4$—R$^{27}$—

(wherein C$_6$H$_4$ stands for a phenylene group; R$^{27}$ represents a direct bond or a bivalent organic group containing 1 to 14 carbon atoms and optionally containing one or more ether or ester linkages) or a group of the formula:

—C(O)—R$^{28}$—

(wherein R$^{28}$ represents a direct bond or a bivalent organic group containing 1 to 19 carbon atoms and optionally containing one or more ether or ester linkages)

An amino group can be introduced into the terminus of a vinyl polymer by converting the terminal halogen of a vinyl polymer. The method for this substitution is not particularly restricted but, from the standpoint of the ease of control, it is preferable to use a nucleophilic substitution reaction using an amino-containing compound as a nucleophilic agent. As such a nucleophilic agent, there can be mentioned a compound having both a hydroxyl group and an amino group as, for example, represented by the general formula (26):

HO—R$^{26}$—NR$^{12}$$_2$  (26)

(wherein R$^{26}$ represents a C$_{1-20}$ bivalent organic group optionally containing one or more ether or ester linkages; R$^{12}$ represents a hydrogen atom or a univalent organic group containing 1 to 20 carbon atoms and the two R$^{12}$ groups may be the same or different and may be joined to each other at the respective free termini to form a cyclic structure).

Referring to the above general formula (26), R$^{26}$ is a C$_{1-20}$ bivalent organic group optionally containing one or more ether or ester linkages and may for example be an alkylene group containing 1 to 20 carbon atoms, an arylene group containing 6 to 20 carbon atoms, or an aralkylene group containing 7 to 20 carbon atoms. The preferred, among such compounds having both a hydroxyl group and an amino group, are aminophenol compounds wherein R$^{26}$ represents

—C$_6$H$_4$—R$^{27}$—

(wherein C$_6$H$_4$ stands for a phenylene group; R$^{27}$ represents a direct bond or a C$_{1-14}$ bivalent organic group optionally containing one or more ether or ester linkages) and amino acid compounds of the formula:

—C(O)—R$^{28}$—

(wherein R$^{28}$ represents a direct bond or a C$_{1-19}$ bivalent organic group optionally containing one or more ether or ester linkages).

As specific such compounds, there can be mentioned ethanolamine; o, m, p-aminophenol; o, m, p-NH$_2$—C$_6$H$_4$—CO$_2$H; glycine, alanine and aminobutanoic acid, among others.

A compound having both an amino group and an oxyanion may also be used as said nucleophilic agent. Such compound is not particularly restricted but includes compounds represented by the general formula (27), among others:

M$^+$O$^-$—R$^{26}$—NR$^{12}$$_2$  (27)

(wherein R$^{26}$ represents a C$_{1-20}$ bivalent organic group optionally containing one or more ether or ester linkages; R$^{12}$ represents a hydrogen atom or a univalent organic group containing 1 to 20 carbon atoms and the two R$^{12}$ groups may be the same or different and may be joined to each other at the respective free termini to form a cyclic structure; M$^+$ represents an alkali metal ion or a quaternary ammonium ion).

Referring to the above general formula (27), M$^+$ represents the counter cation to the oxyanion and is an alkali metal ion or a quaternary ammonium ion. As specific examples of the alkali metal ion, there may be mentioned the lithium ion, sodium ion and potassium ion. Preferred is sodium ion or potassium ion. As the quaternary ammonium ion, there may be mentioned the tetramethylammonium ion, tetraethylammonium ion, trimethylbenzylammonium ion, trimethyldodecylammonium ion, tetrabutylammonium ion and dimethylpiperidinium ion.

Among the above compounds having both an amino group and an oxyanion, salts of aminophenols represented by the general formula (28) and salts of amino acids represented by the general formula (29) are preferred because of the ease of control of the substitution reaction as well as from availability points of view.

$$M^+O^-\text{—}C_6H_4\text{—}R^{27}\text{—}NR^{12}{}_2 \quad (28)$$

$$M^+O^-\text{—}C(O)\text{—}R^{28}\text{—}NR^{12}{}_2 \quad (29)$$

(wherein $C_6H_4$ stands for a phenylene group; $R^2$ represents a direct bond or a $C_{1-14}$ bivalent organic group optionally containing one or more ether or ester linkages; $R^3$ represents a direct bond or a $C_{1-19}$ bivalent organic group optionally containing one or more ether or ester linkages; $R^{12}$ represents a hydrogen atom or a $C_{1-20}$ univalent organic group and the two $R^{12}$ groups may be the same or different and may be jointed to each other at the respective free termini to form a cyclic structure; $M^+$ has the same meaning as defined hereinabove)

The oxyanion-containing compound represented by the general formulas (27) to (29) can each be obtained by reacting a compound of the general formula (26) with a basic compound.

As the basic compound, various compounds can be selectively employed. Thus, for example, sodium methoxide, potassium methoxide, lithium methoxide, sodium ethoxide, potassium ethoxide, lithium ethoxide, sodium tert-butoxide, potassium tert-butoxide, sodium carbonate, potassium carbonate, lithium carbonate, sodium hydrogen carbonate, sodium hydroxide, potassium hydroxide, sodium hydride, potassium hydride, methyllithium, ethyllithium, n-butyllithium, tert-butyllithium, lithium diisopropylamide and lithium hexamethyldisilazide, among others, can be mentioned. The amount of use of said base is not particularly restricted but, based on said precursor, may range from 0.5 to 5 equivalents, preferably 0.8 to 1.2 equivalents.

As the solvent to be used in reacting the above precursor with a basic compound, there may be mentioned hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropyl alcohol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; sulfoxide solvents such as dimethyl sulfoxide; and so on. These may be used singly or two or more of them may be used in admixture.

The oxyanion-containing compound in which $M^+$ is a quaternary ammonium ion can be obtained by preparing a compound having an alkali metal ion for $M^+$ and reacting this compound with a quaternary ammonium halide. As examples of the quaternary ammonium halide, there may be mentioned tetramethylammonium halides, tetraethylammonium halides, trimethylbenzylammonium halides, trimethyldodecylammonium halides and tetrabutylammonium halides.

A variety of solvents can be used for the substitution (conversion) reaction of the terminal halogen of the polymer. As the solvents, there may be mentioned hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropyl alcohol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; and sulfoxide solvents such as dimethyl sulfoxide; among others. These may be used each independently or in a combination of two or more thereof.

The reaction can be carried out in the temperature range of 0 to 150° C. The amount of use of the amino group-containing compound is not particularly restricted but may be 1 to 5 equivalents, preferably 1 to 1.2 equivalents, relative to the terminal halogen of the polymer.

For accelerating the nucleophilic substitution reaction, a basic compound may be added to the reaction mixture. Such a basic compound includes not only the compounds already mentioned herein but also alkylamines such as trimethylamine, triethylamine, tributylamine, etc.; polyamines such as tetramethylethylenediamine, pentamethyldiethylenetriamine, etc.; and pyridine compounds such as pyridine and picoline, among others.

When the amino group of the amino group-containing compound for use in the nucleophilic substitution reaction may affect the nucleophilic substitution reaction, the amino group is preferably protected with a suitable substituent group. The substituent group includes benzyloxycarbonyl, tert-butoxycarbonyl and 9-fluorenylmethoxycarbonyl, among others.

There may also be mentioned a process which comprises replacing the halogen terminus of a vinyl polymer with an azide anion and reducing the same with, for example, LAH.

Polymerizable Carbon-Carbon Double Bond

The technology of introducing a polymerizable carbon-carbon double bond into a vinyl polymer includes but is not limited to the following processes.

① The process which comprises substituting the halogen group of a vinyl polymer with a compound having a radical-polymerizable carbon-carbon double bond. As a specific example, there can be mentioned a process which comprises reacting a vinyl polymer represented by the following general formula (30) with a compound represented by the following formula (31).

$$\text{—}CR^{29}R^{30}X \quad (30)$$

(wherein $R^{29}$ and $R^{30}$ each represents a group bound to the ethylenically unsaturated group of a vinyl monomer; X represents a chlorine, bromine or iodine atom)

$$M^+\text{—}OC(O)C(R^{13})\text{=}CH_2 \quad (31)$$

[wherein $R^{13}$ represents a hydrogen atom or an organic group containing 1 to 20 carbon atoms; $M^+$ represents an alkali metal ion or a quaternary ammonium ion]

② The process which comprises reacting a hydroxyl-containing vinyl polymer with a compound of the following general formula (32).

$$XC(O)C(R^{13})\text{=}CH_2 \quad (32)$$

[wherein $R^{13}$ represents a hydrogen atom or an organic group containing 1 to 20 carbon atoms; X represents a chlorine or bromine atom or a hydroxyl group]

③ The process which comprises reacting a hydroxyl-containing vinyl polymer with a diisocyanate compound and causing the residual isocyanato group to react with a compound of the following general formula (33).

$$HO\text{—}R^{31}\text{—}OC(O)C(R^{13})\text{=}CH_2 \quad (33)$$

[wherein $R^{13}$ represents a hydrogen atom or an organic group containing 1 to 20 carbon atoms; $R^{31}$ represents a bivalent organic group containing 2 to 20 carbon atoms]

The above processes are respectively described in detail below.

The process ① is now described in detail.

(1) The process which comprises reacting a vinyl polymer represented by the following general formula (30) with a compound represented by the following formula (31).

$$—CR^{29}R^{30}X \qquad (30)$$

(wherein $R^{29}$ and $R^{30}$ each represents a group bound to the ethylenically unsaturated group of a vinyl monomer; X represents a chlorine, bromine or iodine atom)

$$M^+\ {}^-OC(O)C(R^{13})\!\!=\!\!CH_2 \qquad (31)$$

[wherein $R^{13}$ represents a hydrogen atom or an organic group containing 1 to 20 carbon atoms; $M^+$ represents an alkali metal ion or a quaternary ammonium ion]

The vinyl polymer having a terminal structure of the general formula (30) can be produced by the above-mentioned technology for polymerizing a vinyl monomer using an organohalogen compound or a sulfonyl halide compound as the initiator and a transition metal complex as the catalyst or the above-mentioned technology for polymerizing a vinyl monomer using a halogen compound as the chain transfer agent, preferably by the former method.

The compound represented by the general formula (31) is not particularly restricted. As specific examples of $R^{13}$, there can be mentioned —H, —$CH_3$, —$CH_2CH_3$, —$(CH_2)_nCH_3$ (n represents an integer of 2 to 19), —$C_6H_5$, —$CH_2OH$, —CN, etc., and preferred, among these, is —H or —$CH_3$.

$M^+$ represents the counter cation to the oxyanion and is an alkali metal ion such as lithium ion, sodium ion and potassium ion and a quaternary ammonium ion. As the quaternary ammonium ion, there may be mentioned the tetramethylammonium ion, tetraethylammonium ion, tetrabenzylammonium ion, trimethyldodecylammonium ion, tetrabutylammonium ion and dimethylpiperidinium ion. Preferred is sodium ion or potassium ion.

The amount of use of the oxyanion of the general formula (31) relative to the halogen group of the general formula (30) is preferably 1 to 5 equivalents, more preferably 1.0 to 1.2 equivalents. The solvent for use in carrying out this reaction is not particularly restricted but, because the reaction is a nucleophilic substitution reaction, is preferably a polar solvent such as, for example, tetrahydrofuran, dioxane, diethyl ether, acetone, dimethyl sulfoxide, dimethylformamide, dimethylacetamide, hexamethylphosphoric triamide, acetonitrile and so on. The reaction temperature is not particularly restricted but generally the reaction is conducted at 0 to 150°, preferably at room temperature to 100° C. for maintaining the polymeric terminal group.

The process ② mentioned above is now described.

② The process which comprises reacting a hydroxyl-containing vinyl polymer with a compound of the general formula (32).

$$XC(O)C(R^{13})\!\!=\!\!CH_2 \qquad (32)$$

[wherein $R^{13}$ represents a hydrogen atom or an organic group containing 1 to 20 carbon atoms; X represents a chlorine or bromine atom or a hydroxyl group]

The compound represented by the general formula (32) is not particularly restricted. As specific examples of $R^{13}$, there can be mentioned —H, —$CH_3$, —$CH_2CH_3$, —$(CH_2)_nCH_3$ (n represents an integer of 2 to 19), —$C_6H_5$, —$CH_2OH$, —CN, etc.; preferred, among these, is —H or —$CH_3$.

A vinyl polymer having a hydroxyl group, preferably at its terminus, can be produced by the above-mentioned technology for polymerizing a vinyl monomer using an organohalogen compound or a sulfonyl halide compound as the initiator and a transition metal complex as the catalyst or the above-mentioned technology for polymerizing a vinyl monomer using a hydroxyl group-containing compound as the chain transfer agent, preferably by the former method. The specific technique which can be used for producing a hydroxyl-containing vinyl polymer is not restricted but includes the following processes in addition to the above-mentioned processes.

(a) The process which comprises subjecting a compound having both a polymerizable alkenyl group and a hydtoxyl group as represented by the following general formula (34) to reaction as a second monomer in synthesizing the vinyl polymer by living radical polymerization:

$$H_2C\!\!=\!\!C(R^{32})\!\!-\!\!R^{33}\!\!-\!\!R^{34}\!\!-\!\!OH \qquad (34)$$

wherein $R^{32}$ represents an organic group containing 1 to 20 carbon atoms, preferably a hydrogen atom or a methyl group, and may be the same or different within the molecule; $R^{33}$ represents —C(O)O— (an ester group) or an o-, m- or p-phenylene group; $R^{34}$ represents a direct bond or a bivalent organic group containing 1 to 20 carbon atoms which may optionally contain one or more ether linkages. The compound in which $R^{33}$ represents an ester group is a (meth)acrylate compound and the compound in which $R^{33}$ represents a phenylene group is a styrenic compound.

The timing of reacting the compound having both a polymerizable alkenyl group and a hydroxyl group per molecule is not particularly restricted but, when the expression of rubber-like properties are expected, the compound is subjected to reaction as a second monomer preferably at the final stage of the polymerization reaction or after completion of the reaction of the predetermined vinyl monomer.

(b) The process which comprises subjecting a compound having a sparingly polymerizable alkenyl group and a hydroxyl group per molecule to reaction as a second monomer at the final stage of the polymerization reaction or after completion of the reaction of the predetermined vinyl monomer in synthesizing the vinyl polymer by living radical polymerization.

Such compound is not particularly restricted but includes, among others, compounds represented by the general formula (35):

$$H_2C\!\!=\!\!C(R^{32})\!\!-\!\!R^{35}\!\!-\!\!OH \qquad (35)$$

wherein $R^{32}$ is as defined above and $R^{35}$ represents a bivalent $C_{1\text{-}20}$ organic group optionally containing one or more ether linkages.

The compound represented by the above general formula (35) is not particularly restricted but alkenyl alcohols such as 10-undecenol, 5-hexenol and allyl alcohol are preferred from availability points of view.

(c) The process disclosed in Japanese Kokai Publication Hei-04-132706, for instance, which comprises terminally introducing a hydroxyl group by hydrolyzing the halogen of a vinyl polymer having at least one carbon-halogen bond, represented by the general formula (30), as obtained by atom transfer radical polymerization or reacting the halogen with a hydroxyl-containing compound.

(d) The process which comprises reacting a vinyl polymer having at least one carbon-halogen bond, represented by the general formula (30), as obtained by atom transfer radical polymerization with a stabilized, hydroxyl-containing carbanion such as the one represented by the general formula (36) to thereby effect substitution for the halogen:

$$M^+C^-(R^{36})(R^{37})—R^{35}—OH \quad (36)$$

wherein $R^{35}$ is as defined above; $R^{36}$ and $R^{37}$ each represents an electron-withdrawing group stabilizing the carbanion $C^-$ or one of them represents such an electron-withdrawing group and the other represents a hydrogen atom, an alkyl group containing 1~10 carbon atoms or a phenyl group. As the electron-withdrawing group $R^{36}$ and/or $R^{37}$, there may be mentioned —$CO_2R$ (ester group) —$C(O)R$ (keto group), —$CON(R_2)$ (amide group), —COSR (thioester group), —CN (nitrile group) and —$NO_2$ (nitro group), among others. The substituent R is an alkyl group containing 1 to 20 carbon atoms, an aryl group containing 6 to 20 carbon atoms or an aralkyl group containing 7 to 20 carbon atoms and preferably is an alkyl group containing 1 to 10 carbon atoms or a phenyl group. Particularly preferred as $R^{36}$ and $R^{37}$ are —$CO_2R$, —C(O) R and —CN.

(e) The process which comprises reacting a vinyl polymer having at least one carbon-halogen bond, represented by the general formula (30), as obtained by atom transfer radical polymerization with an elemental metal, such as zinc, or an organometal compound and then reacting the thus-prepared enolate anion with an aldehyde or ketone.

(f) The process which comprises reacting a vinyl polymer having at least one terminal halogen atom, preferably a halogen represented by the general formula (30), with a hydroxyl-containing oxyanion represented by the general formula (37) shown below or the like or a hydroxyl-containing carboxylate anion represented by the general formula (38) shown below or the like to thereby substitute a hydroxyl-containing substituent for the halogen:

$$HO—R^{35}—O^-M^+ \quad (37)$$

wherein $R^{35}$ and $M^+$ are as defined above;

$$HO—R^{35}—C(O)O^-M^+ \quad (38)$$

wherein $R^{35}$ and $M^+$ are as defined above.

In the practice of the invention, when any halogen is not directly involved in introducing a hydroxyl group, as in the processes (a) and (b), the process (b) is comparatively more preferred since the control is easier. In cases where the hydroxyl group introduction is effected by converting the halogen of a vinyl polymer having at least one carbon-halogen bond, as in the processes (c) to (f), the process (f) is comparatively more preferred since the control is easier.

The process ③ is now described.

③ The process which comprises reacting a hydroxyl-containing vinyl polymer with a diisocyanate compound and causing the residual isocyanato group to react with a compound of the general formula (39).

$$HO—R^{31}—OC(O)C(R^{13})=CH_2 \quad (39)$$

[wherein $R^{13}$ represents a hydrogen atom or an organic group containing 1 to 20 carbon atoms; $R^{31}$ represents a bivalent organic group containing 2 to 20 carbon atoms]

The compound represented by the general formula (39) is not particularly restricted. As specific examples of $R^3$, there can be mentioned —H, —$CH_3$, —$CH_2CH_3$, —$(CH_2)_nCH_3$ (n represents an integer of 2~19), —$C_6H_5$, —$CH_2OH$, —CN, etc.; the preferred, among these, is —H or —$CH_3$. As a specific compound, there can be mentioned 2-hydroxypropyl methacrylate.

The hydroxyl-terminated vinyl polymer is as described above.

The diisocyanate compound for use is not particularly restricted and may be any of the hitherto-known isocyanates, such as toluylene diisocyanate, 4,4'-diphenylmethane diisocyanate, hexamethyl diisocyanate, xylylene diisocyanate, m-xylylene diisocyanate, 1,5-naphthalene diisocyanate, hydrogenated diphenylmethane diisocyanate, hydrogenated toluylene diisocyanate, hydrogenated xylylene diisocyanate, isophorone diisocyanate, and so on. These may be used each independently or two or more of them may be used in combination. Blocked isocyanates may also be used.

As the polyfunctional isocyanate compound (b) for insuring an improved weather resistance, it is preferable to use an aromatic ring-free diisocyanate compound such as hexamethylene diisocyanate and hydrogenated diphenylmethane diisocyanate.

[High Molecular Plasticizer for (D) Component]

The high molecular plasticizer (D) for use in the third aspect of the invention has a number average molecular weight of 500 to 15000. By adding this high molecular plasticizer, not only the viscosity and slump of the curable composition and the mechanical characteristics, such as tensile strength and elongation, of the cured product obtainable from said composition can be liberally controlled but, compared with the use of a low molecular plasticizer not containing a polymer component in the molecule, the initial physical properties can be maintained for an extended time period and the drying properties of the alkyd coat applied to the cured product (i.e. coatability) can be improved. It is to be understood that the high molecular plasticizer in the third aspect of the invention is not a plasticizer having a group of the above general formula (1).

While the number average molecular weight of said high molecular plasticizer is 500 to 15000 as mentioned above, the preferred range is 800 to 10000 and the more preferred range is 1000 to 8000. When the molecular weight is too low, the plasticizer is caused to leach out by heat and rainwater so that the initial physical properties cannot be maintained long and the alkyd coating coatability of the cured product cannot be improved. On the other hand, when the molecular weight is too high, the viscosity is increased to detract from workability.

As examples of said high molecular plasticizer, there can be mentioned vinyl polymers obtainable by polymerizing said vinyl monomers by various techniques; polyester plasticizers obtainable from dibasic acids such as sebacic acid, adipic acid, azelaic acid, phthalic acid, etc. and dihydric alcohols such as ethylene glycol, diethylene glycol, triethylene glycol, propylene glycol, dipropylene glycol, etc.; polyethers such as polyethylene glycol, polypropylene glycol, polytetramethylene glycol, etc. and derivatives obtainable by converting the hydroxyl groups of such polyether polyols to ester, ether or other groups; polystyrenes such as polystyrene, poly (α-methylstyrene), etc.; polybutadiene, polybutene, polyisobutylene, butadiene-acrylonitrile, polychloroprene, and paraffin chloride, among others.

Among these high molecular plasticizers, the preferred are plasticizers compatible with the crosslinking functional group-containing polymer (A3). From the standpoint of compatibility, weather resistance and heat resistance, in particular, vinyl polymers are preferred. The preferred, among said vinyl polymers, are (meth)acrylic polymers, with acrylic polymers being particularly preferred. As the mode of synthesizing such polymers, living radical polymerization is preferred because the method is conducive to a narrow molecular weight distribution and a low viscosity, with the atom transfer radical polymerization technique being particularly preferred.

The molecular weight distribution of the high molecular plasticizer (D) is not particularly restricted but is preferably narrow enough, namely less than 1.8. It is more preferably not more than 1.7, still more preferably not more than 1.6, further more preferably not more than 1.5, particularly not more than 1.4, most preferably not more than 1.3.

The high molecular plasticizers mentioned above may be used each independently or in a combination of two or more thereof. Where necessary, these plasticizers can be used in combination with low molecular plasticizers within the range not adversely affecting the physical properties.

The amount of use of said high molecular plasticizer (D) is 5 to 150 weight parts, preferably 10 to 120 weight parts, more preferably 20 to 100 weight parts, based on 100 weight parts of the vinyl polymer having at least one crosslinking functional group as (A3) component. At an amount below 5 weight parts, the effect expected of a plasticizer is not expressed. If the amount exceeds 150 weight parts, the mechanical strength of the cured product will not be as high as desired.

Depending on the kind of crosslinking functional group, the curable composition according to the third aspect of the invention calls for addition of a curing catalyst and curing agent. Moreover, depending on the desired physical properties, a variety of additives may also be formulated.

<Curing Catalyst/Curing Agent>

In the Case of a Crosslinking Silyl Group

The crosslinking silyl group-containing polymer crosslinks and cures as it undergoes siloxane bonding in the presence or absence of one of the known condensation catalysts. As regards the properties of the cured product, a broad spectrum of products ranging from a rubbery one to a resinous one can be liberally obtained according to the molecular weight and backbone structure of the polymer. As such a condensation catalyst, the catalysts mentioned hereinbefore can be mentioned.

These catalysts can be used each independently or in a combination of two or more thereof. The formulating amount of the condensation catalyst is preferably about 0.1 to 20 weight parts, more preferably 1 to 10 weight parts, relative to 100 weight parts of the vinyl polymer having at least one crosslinking silyl group (A3). When the formulating amount of the silanol condensation catalyst is below the above range, the curing velocity may be decreased so that the curing reaction may not proceed fully. On the other hand, when the formulating amount of the silanol condensation catalyst exceeds the above range, local heating and foaming tend to take place in curing to make it impossible to obtain a satisfactory cured product. Moreover, since the pot life of the composition is shortened, workability is adversely affected.

In the curable composition of the invention, a silanol group-free silicon compound of the following general formula (40) may be formulated for the purpose of enhancing the condensation catalyst activity:

$$R^{49}{}_a Si(OR^{50})_{4-a} \quad (40)$$

(wherein $R^{49}$ and $R^{50}$ each independently represents a substituted or unsubstituted $C_{1-20}$ hydrocarbon group; a represents any of 0, 1, 2 and 3).

The silicon compound mentioned just above is not particularly restricted but is preferably the compound of the general formula (40) wherein $R^{49}$ is an aryl group containing 6 to 20 carbon atoms, such as, for example, phenyltrimethoxysilane, phenylmethyldimethoxysilane, phenyldimethylmethoxysilane, diphenyldimethoxysilane, diphenyldiethoxysilane and triphenylmethoxysilane, for such compound has the accelerating effect on curing reaction of the composition. Particularly, diphenyldimethoxysilane and diphenyldiethoxysilane are most preferred from availability and cost points of view.

The formulating amount of said silicon compound is preferably about 0.01 to 20 weight parts, more preferably 0.1 to 10 weight parts, based on 100 weight parts of the vinyl polymer having at least one crosslinking silyl group (A3). When the formulating amount is below the above range, the accelerating effect on curing reaction tends to be decreased. On the other hand, when the silicon compound is formulated in excess of the above range, the hardness and tensile strength of the cured product tend to be decreased.

In the Case of an Alkenyl Group

For the crosslinking through an alkenyl group, the crosslinking reaction is preferably, but not essentially, effected by hydrosilylation using a hydrosilyl group-containing compound as the curing agent together with a hydrosilylation catalyst.

The hydrosilyl group-containing compound is not particularly restricted inasmuch as it is a hydrosilyl compound capable of curing an alkenyl group-containing polymer through crosslinking and various compounds can be utilized. Thus, for example, there can be employed linear polysiloxanes represented by the general formula (41) or (42);

$$R^{51}{}_3 SiO-[Si(R^{51})_2 O]_a-[Si(H)(R^{52})O]_b-[Si(R^{52})(R^{53})O]_c-SiR^{51}{}_3 \quad (41)$$

$$R^{51}{}_2 SiO-[Si(R^{51})_2 O]_a-[Si(H)(R^{52})O]_b-[Si(R^{52})(R^{53})O]_c-SiR^{51}{}_2 H \quad (42)$$

(In the above formulas, $R^{51}$ and $R^{52}$ each represents an alkyl group containing 1 to 6 carbon atoms or a phenyl group; $R^{53}$ represents an alkyl or aralkyl group containing up to 10 carbon atoms; a represents an integer of $0 \leq a \leq 100$; b represents an integer of $2 \leq b \leq 100$; c represents an integer of $0 \leq c \leq 100$) and cyclic siloxanes represented by the general formula (43)

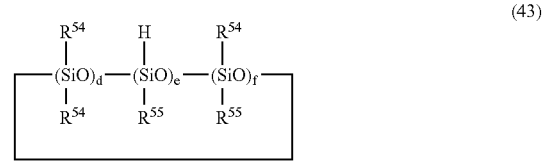

(43)

(wherein $R^{54}$ and $R^{55}$ each represents an alkyl group containing 1 to 6 carbon atoms or a phenyl group; $R^{56}$ represents an alkyl or aralkyl group containing up to 10 carbon atoms; d represents an integer of $0 \leq d \leq 8$; e represents an integer of $2 \leq e \leq 10$; f represents an integer of $0 \leq f \leq 8$; the relation of $3 \leq d+e+f \leq 10$ is satisfied)

These compounds can be used each independently or two or more of them may be used in admixture. Among the above siloxanes, the compounds preferred from the standpoint of compatibility with (meth)acrylic polymers are phenyl-containing linear siloxanes represented by the following general formula (44) or (45) and cyclic siloxanes represented by the general formula (46) or (47).

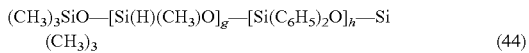  (44)

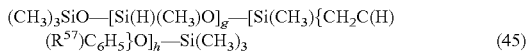  (45)

(In the above formulas, $R^{57}$ represents a hydrogen atom or a methyl group; $g$ represents an integer of $2 \leq g \leq 100$; $h$ represents an integer of $0 \leq h \leq 100$; $C_6H_5$ stands for a phenyl group)

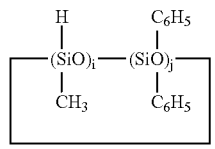  (46)

Also usable as the hydrosilyl group-containing compound is a compound prepared by addition-reacting a hydrosilyl group-containing compound represented by any of the general formulas (41) through (47) with a low molecular compound containing two or more alkenyl groups per molecule in such a manner that part of the hydrosilyl functional group will remain after the reaction. As said compound containing 2 or more alkenyl groups, various compounds can be used. As examples, there can be mentioned hydrocarbon compounds such as 1,4-pentadiene, 1,5-hexadiene, 1,6-heptadiene, 1,7-octadiene, 1,8-nonadiene, 1,9-decadiene, etc.; ether compounds such as 0,0'-diallylbisphenol A, 3,3'-diallylbisphenol A, etc.; ester compounds such as diallyl phthalate, diallyl isophthalate, triallyl trimellitate, tetraallyl pyromellitate, etc.; and carbonate compounds such as diethylene glycol diallyl-carbonate and so on.

The objective compound can be obtained by adding said alkenyl group-containing compound slowly dropwise to an excess of said hydrosilyl group-containing compound represented by any of the general formulas (41) through (47) in the presence of a hydrosilylation catalyst. From the standpoint of availability of the starting compound, ease of removal of the excess siloxane, and compatibility with the (A) component polymer, the following compounds are particularly preferred.

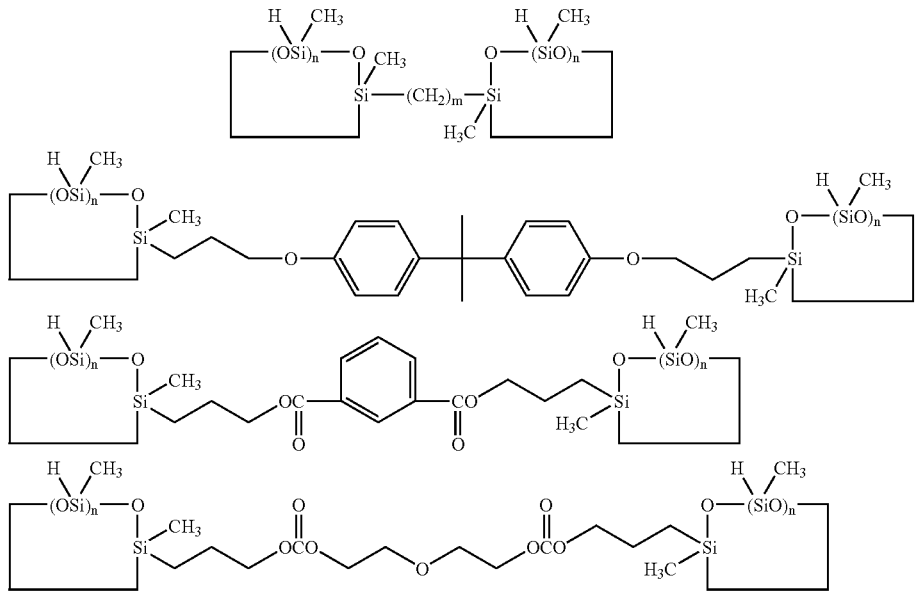

-continued

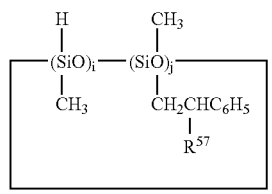  (47)

(In the above formulas, $R^{57}$ represents a hydrogen atom or a methyl group; $i$ represents an integer of $2 \leq i \leq 10$ and $j$ represents an integer of $0 \leq j \leq 8$, with the condition of $3 \leq i+j \leq 10$ satisfied; $C_6H_5$ stands for a phenyl group)

($n$ represents an integer of 2 to 4; $m$ represents an integer of 5 to 10)

The polymer and curing agent can be admixed in an arbitrary ratio but, from curability points of view, the alkenyl-to-hydrosilyl molar ratio is preferably in the range of 5 to 0.2, more preferably 2.5 to 0.4. If the molar ratio exceeds 5, curing will be insufficient to give only a tacky cured product of low strength. If the ratio is smaller than 0.2, many active hydrosilyl groups remain unreacted after curing to cause cracks and voids, failing to provide a cured product of uniform strength.

The curing reaction between the polymer and curing agent proceeds as they are admixed and heated but in order to expedite the reaction, a hydrosilylation catalyst may be added. The hydrosilylation catalyst for such use is not particularly restricted but includes a radical initiator, such as an organic peroxide or an azo compound, and a transition metal catalyst.

The radical initiator is not particularly restricted but includes dialkyl peroxides such as di-tert-butyl peroxide, 2,5-dimethyl-2,5-di(tert-butylperoxy)hexane, 2,5-dimethyl-2,5-di(tert-butylperoxy)-3-hexyne, dicumyl peroxide, tert-butyl-cumyl peroxide and α,α'-bis(tert-butyl-peroxy)isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peresters such as tert-butyl perbenzoate, peroxydicarbonates such as diisopropyl peroxydicarbonate and di-2-ethylhexyl peroxy-dicarbonate, and peroxyketals such as 1,1-di(tert-butylperoxy)cyclohexane and 1,1-di(tert-butylperoxy)-3,3,5-trimethylcyclohexane, among others.

The transition metal catalyst is not particularly restricted but includes elemental platinum, solid platinum dispersed on a matrix such as alumina, silica and carbon black, chloroplatinic acid, complexes of chloroplatinic acid with alcohols, aldehydes, ketones or the like, platinum-olefin complexes and platinum(0)-divinyltetramethyldisiloxane complex, among others. As examples of the catalyst other than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$, $TiCl_4$, etc. These catalysts may be used singly or two or more of them may be used combinedly. The amount of the catalyst is not particularly restricted but recommendably is within the range of $10^{-1}$ to $10^{-8}$ mole, preferably within the range of $10^{-3}$ to $10^{-6}$ mole, per mole of the alkenyl group of the vinyl polymer (A3). When it is less than $10^{-8}$ mole, the curing may not proceed to a sufficient extent. Since the hydrosilylation catalyst is expensive, it is recommendable that this catalyst is not used in an amount exceeding $10^{-1}$ mole.

The curing temperature is not particularly restricted but is generally at 0° C. to 100°., preferably 30° C. to 150° C., more preferably at 80° C. to 150° C.

In the Case of a Hydroxyl Group

The hydroxyl group-containing polymer can be cured uniformly by using a compound having two or more functional groups capable of reacting with the hydroxyl functional group as a curing agent. The curing agent includes polyisocyanates having two or more isocyanato groups in the molecule, methylolatedmelamine and its alkyl ethers oraminoplast resins such as low-condensation products thereof, polycarboxylic acids and halides thereof, among others. In producing a cured product using such a curing agent, a curing catalyst suited to each can be used.

In the Case of an Amino Group

The amino group-containing polymer can be cured uniformly by using a compound having two or more functional groups capable of reacting with the amino function as a curing agent. As examples of the curing agent, there can be mentioned polyisocyanate compounds having two or more isocyanate groups in the molecule, methylolated melamine and its alkyl ethers or aminoplast resins such as low-condensation products thereof, polycarboxylic acids and halides thereof, among others. In producing a cured product using such a curing agent, a curing catalyst suited to each can be used.

In the Case of an Epoxy Group

The curing agent for the epoxy group-containing polymer is not particularly restricted but includes aliphatic amines, alicyclic amines, aromatic amines; acid anhydrides; polyamides; imidazoles; amineimides; urea; melamine and its derivatives; polyamine salts; phenolic resins; polymercaptans, polysulfides; and photo- or UV-curing agents such as aromatic diazonium salts, diallyliodonium salts, triallylsulfonium salts, triallylselenium-salts and so on.

In the case of a polymerizable carbon-carbon double bond

The polymer having a polymerizable carbon-carbon double bond can be crosslinked by polymerizing said polymerizable carbon-carbon double bond. The crosslinking method includes curing by actinic radiation and curing by heat. In the case of an actinic radiation-curable composition, the photopolymerization initiator is preferably a photoradical initiator or a photoanion initiator. In a heat-curable composition, the thermal polymerization initiator is preferably a member selected from the group consisting of azo initiators, peroxides, persulfates and redox initiators.

These crosslinking reactions are now described in detail.

For causing crosslinking of the polymer having a polymerizable carbon-carbon double bond, other polymerizable monomer(s) and/or oligomers and various additives may also be formulated according to the objective. As such polymerizable monomers and/or oligomers, it is preferable to use monomers and/or oligomers having radical-polymerizable groups or monomers and/or oligomers having anion-polymerizable groups. As the radical-polymerizable groups, there can be mentioned an acrylic functional group such as (meth)acryloyl, styryl, acrylonitrile, vinyl ester, N-vinylpyrrolidone, acrylamide, conjugated diene, vinyl ketone, and vinyl chloride groups, among others. Among these, those having a (meth)acryloyl group are preferred. The anion-polymerizable groups include (meth)acryloyl, styryl, acrylonitrile, N-vinylpyrrolidone, acrylamide, conjugated diene, and vinyl ketone groups, among others. Among these, those having an acrylic functional group are preferred.

As examples of such monomers, there can be mentioned (meth)acrylate monomers, cyclic acrylates, N-vinylpyrrolidone, styrenic monomers, acrylonitrile, N-vinylpyrrolidone, acrylamide monomers, conjugated diene monomers and vinyl ketone monomers, among others. The (meth)acrylate monomers include n-butyl(meth)acrylate, 2-ethylhexyl (meth)acrylate, isooctyl(meth)acrylate, isononyl(meth)acrylate, and compounds of the following formulas.

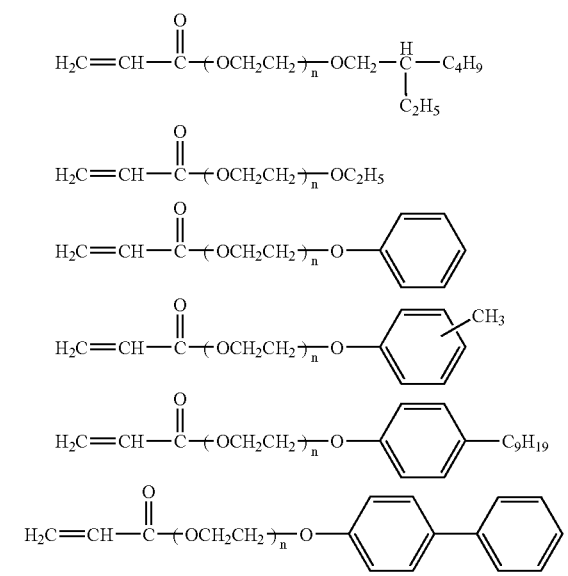

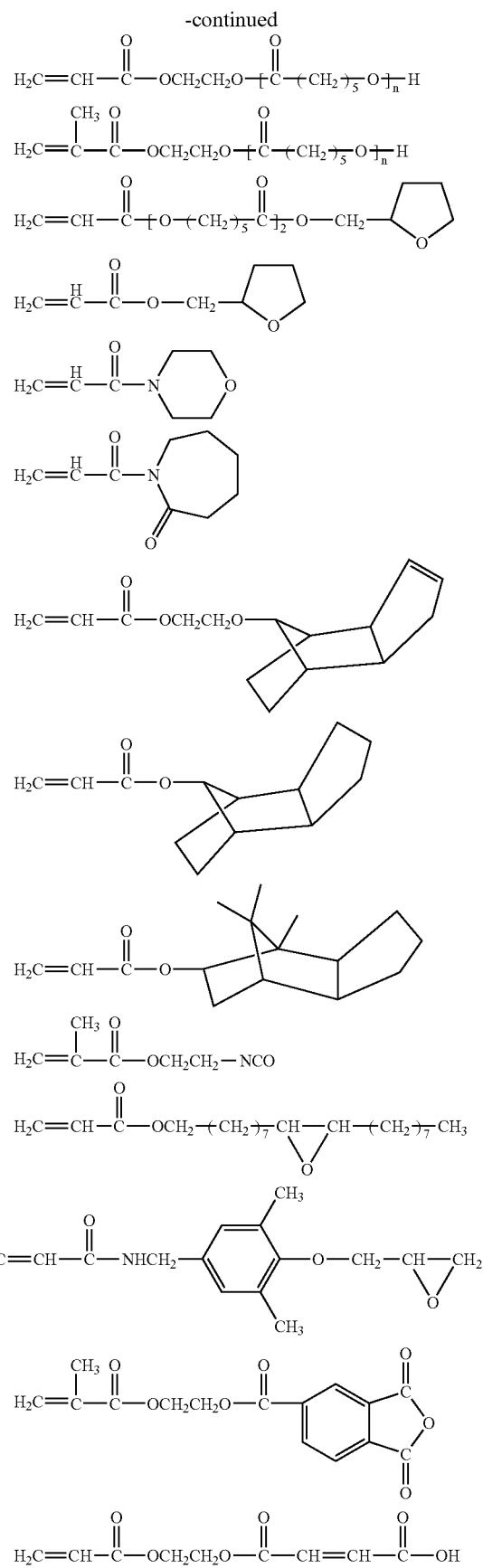
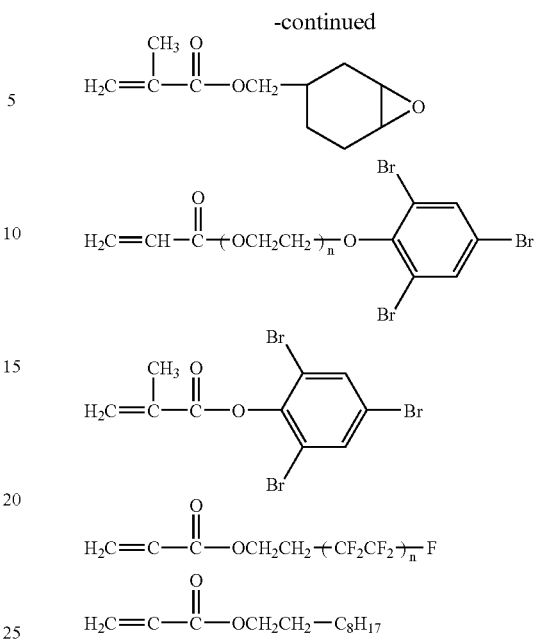

The styrenic monomer includes styrene, α-methylstyrene, etc.; the acrylamide monomer includes acrylamide, N,N-dimethylacrylamide, etc.; the conjugated diene monomer includes butadiene, isoprene, etc.; and the vinyl ketone monomer includes methyl vinyl ketone, among others.

The polyfunctional monomer includes neopentyl glycol polypropoxy diacrylate, trimethylolpropane polyethoxy triacrylate, bisphenol F polyethoxy diacrylate, bisphenol A polyethoxy diacrylate, dipentaerythritol polyhexandlide hexaacrylate, tris(hydroxyethyl)isocyanurate polyhexanolide triacrylate, tricyclodecanedimethylol diacrylate, 2-(2-acryloyloxy-1,1-dimethyl)-5-ethyl-5-acryloyloxymethyl-1,3-dioxane, tetrabromobisphenol A diethoxy diacrylate, 4,4-dimercaptodiphenyl sulfide dimethacrylate, polytetraethylene glycol diacrylate, 1,9-nonanediol diacrylate and ditrimethylolpropane tetraacrylate, among others.

The oligomer includes epoxy acrylate resins such as bisphenol A epoxy acrylate resin, phenol novolac epoxy acrylate resin, cresol novolac epoxy acrylate resin, etc., COOH-modified epoxy acrylate resins, urethane-acrylate resins obtainable by reacting a hydroxyl-containing (meth)acrylate [e.g. hydroxyethyl(meth)acrylate, hydroxypropyl(meth)acrylate, hydroxybutyl(meth)acrylate, or pentaerythritol triacrylate] with the urethane resin obtained from a polyol (e.g. polytetramethylene glycol, ethylene glycol-adipic acid polyester diol, å-caprolactone-modified polyester diols, polypropylene glycol, polyethylene glycol, polycarbonate diols, hydroxy-terminated hydrogenated polyisoprene, hydroxy-terminated polybutadiene, hydroxy-terminated polyisobutylene, etc.) and an organic isocyanate (e.g. tolylene diisocyanate, isophorone diisocyanate, diphenylmethane diisocyanate, hexamethylene diisocyanate, xylylene diisocyanate, etc.), and resins synthesized by introducing (meth)acryloyl groups into said polyols through ester linkages, and polyester acrylate resins.

These monomers and oligomers are selected with reference to the polymerization initiator and curing conditions to be used.

The number average molecular weight of the acrylic functional group-containing monomer and/or oligomer is preferably not larger than 2000 and, from a compatibility point of view, is more preferably not larger than 1000.

The crosslinking of the polymer having a polymerizable carbon-carbon double bond is preferably effected by means of an actinic radiation such as UV light and an electron beam.

For the crosslinking by an actinic radiation, a photopolymerization initiator is preferably formulated.

The photopolymerization initiator that can be used in this invention is not particularly restricted but is preferably a photoradical initiator or a photoanionic initiator, more preferably a photoradical initiator. For example, there can be mentioned acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophehone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl) ketone, benzyl methoxy ketal and 2-chlorothioxanthone. These initiators can be used alone or in combination with other compounds. As specific examples, there can be mentioned combinations with an amine such as diethanolmethylamine, dimethylethanolamine, triethanolamine or the like, said combinations further including an iodonium salt such as diphenyliodonium chloride, and combinations with a pigment, e.g. methylene blue, and an amine.

As the near-infrared photopolymerization initiator, cationic dyes absorbing in the near infrared (IR) region of the spectrum can be used. As such near IR-absorbing cationic dyes, it is preferable to use the near-IR-absorbing cationic dye-borate anion complexes which are excited by photoenergy within the range of 650 to 1500 nm as disclosed in Japanese Kokai Publication Hei-3-111402 and Japanese Kokai Publication Hei-5-194619, among others, and it is still more advantageous to use a boron-type sensitizer in combination.

The addition amount of the photopolymerization initiator need only be just enough to slightly photofunctionalize the system and is not particularly restricted but is preferably 0.001 to 10 weight parts based on 100 weight parts of the polymer component of the composition.

The mode of curing the actinic radiation-curable composition of the invention is not particularly restricted, but depending on the properties of the particular photopolymerization initiator, a high-pressure mercury vapor lamp, a low-pressure mercury vapor lamp, an electron beam irradiation apparatus, a halogen lamp, a light-emitting diode and a semiconductor laser, among others, can be selectively employed as the light source.

The crosslinking of said polymer having a polymerizable carbon-carbon double bond is preferably effected by means of heat.

For crosslinking by actinic radiation, a thermal polymerization initiator is preferably formulated. The thermal polymerization initiator that can be used in this invention is not particularly restricted but includes azo compounds, peroxides, persulfates and redox initiators.

Suitable azo initiators include but are not limited to 2,2'-azobis(4-methoxy-2,4-dimethylvaleronitrile) (VAZO 33), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67), 1,1-azobis(1-cyclohexanecarbonitrile) (VAZO 88) (all available from DuPont Chemical), 2,2'-azobis (2-cyclopropylpropionitrile), and 2,2'-azobis(methyl isobutyrate) (V-601) (available from Wako Pure Chemical Ind.), among others.

Suitable peroxide initiators include but are not limited to benzoyl peroxide, acetyl peroxide, lauroyl peroxide, decanoyl peroxide, dicetyl peroxydicarbonate, di(4-t-butylcyclohexyl)peroxydicarbonate (Perkadox 16S) (available from Akzo Nobel), di(2-ethylhexyl)peroxydicarbonate, t-butyl peroxypivalate (Lupersol 11) (available from Elf Atochem), t-butyl peroxy-2-ethyl hexanoate (Trigonox 21-C50) (available from Akzo Nobel), and dicumyl peroxide.

Suitable persulfate initiators include but are not limited to potassium persulfate, sodium persulfate and ammonium persulfate.

Suitable redox (oxidation-reduction) initiators include but are not limited to combinations of said persulfate initiators with a reducing agent such as sodium hydrogen metasulfite and sodium hydrogen sulfite; organic peroxide-tertiary amine systems, e.g. benzoyl peroxide-dimethylaniline; and organic hydroperoxide-transition metal systems, e.g. cumene hydroperoxide-cobalt naphthenate.

Other initiators include but are not limited to pinacols such as tetraphenyl-1,1,2,2-ethanediol.

Preferred thermal radical initiators can be selected from among azo initiators and peroxide initiators. Still more preferred are 2,2'-azobis(methyl isobutyrate), t-butyl peroxypivalate, di(4-t-butylcyclohexyl) peroxydicarbonate, and a mixture thereof.

The thermal polymerization initiator to be used in the present invention should be added in a catalytically effective amount which is not particularly restricted but is typically about 0.01 to 5 weight parts, preferably about 0.025 to 2 weight parts, based on 100 weight parts of the polymer having an acrylic functional group in at least one terminal position and said other mixture of monomers and oligomers. When an initiator mixture is used, the total amount of initiators in the mixture corresponds to the amount of any such initiator used singly.

The method of curing the heat-curable composition of the invention is not particularly restricted. The curing temperature is dependent on the thermal initiator, polymer (A3) and specific compounds to be added but, for all practical purposes, is preferably in the range of 50° C. to 250° C., more preferably 70° C. to 200° C. The cure time, which depends on the polymerization initiator, monomer; solvent, reaction temperature and other variables, is generally in the range of 1 minute to 10 hours.

In addition, the same adhesion-imparting agent, filler, solid-state modifier, thixotropic agent (antisagging agent), and other additives as mentioned for the first aspect of the invention can be similarly formulated.

The curable composition according to the third aspect of the invention can be prepared as a one-component system such that all the components are premixed and sealed and, after application, let the whole be cured in situ by atmospheric moisture or as a two-component system such that a curing agent comprising the curing catalyst, filler, plasticizer, water, etc. and a polymer composition are admixed prior to application.

The curable composition according to the third aspect of the invention finds application in a broad spectrum of uses, for example sealants such as architectural elastic sealants, composite-glass sealants, electric/electronic materials such as a solar cell back sealant, etc., electrical insulating materials such as conductor/cable insulation sheaths, etc., adhesives, self-adhesives, elastic adhesives, coatings, powder coatings, coating dopes, foams, electric/electronic potting materials, film, gaskets, potting compounds, various molding compounds, rust-preventive, water-proofing sealants for wire-reinforced glass or laminated glass edges (cut edges) and so on.

<<The Fourth Aspect of the Invention>>

The curable composition according to the fourth aspect of the invention is now described.

The curable composition according to the fourth aspect of the invention comprises (A4) a vinyl polymer having a crosslinking silyl group and (E) a reactive plasticizer (generally called "reactive diluent", too).

[The Vinyl Polymer for (A4) Component]

The (A4) component according to the fourth aspect of the invention is a vinyl polymer having not less than 1.1 of crosslinking silyl group represented by the general formula (1) given hereinabove on the average per molecule, which crosslinks and cures by siloxane bonding. The general formula (1) representing the crosslinking silyl group in the (A4) component is identical to the general formula (1) representing the crosslinking silyl group in the (A1) component in the first aspect of the invention.

When the average number of crosslinking silyl groups of the general formula (1) per molecule is less than 1.1, a sufficiently cured product cannot be obtained. The average number, per molecule, of crosslinking silyl groups of the general formula (1) which is necessary to provide a sufficiently cured product is generally 1.1 to 5, preferably 1.2 to 4, more preferably 1.3 to 3.

The monomer constituting the main chain of the polymer is not particularly restricted as far as it is a vinyl monomer, and includes those mentioned for the first aspect of the invention.

From the standpoint of physical properties, the vinyl polymer having not less than 1.1 of the defined crosslinking silyl groups on the average is preferably a (meth)acrylic polymer synthesized by using a (meth)acrylic monomer, among said monomers, in a proportion of not less than 40 weight %. The still more preferred is an acrylic polymer synthesized by using an acrylic monomer, among said various monomers, in a proportion of not less than 30 weight %.

The number average molecular weight of the vinyl polymer having not less than 1.1 of said crosslinking silyl groups on the average is not particularly restricted but is preferably within the range of 500 to 100000. At a molecular weight less than 500, the intrinsic characteristics of a vinyl polymer are hardly manifested and, at above 100000, handling may become difficult in some instances.

The molecular weight distribution, namely the ratio (Mw/Mn) of weight average molecular weight (Mw) to number average molecular weight (Mn), of the vinyl polymer having not less than 1.1 of said crosslinking silyl groups on the average is not particularly restricted. For facilitating handling by controlling the viscosity of the curable composition at a low amount while securing sufficient cured physical properties, however, a narrow molecular weight distribution is preferred. The molecular weight distribution value is preferably less than 1.8, more preferably not more than 1.7, still more preferably not more than 1.6, yet more preferably not more than 1.5, still more preferably not more than 1.4, most preferably not more than 1.3. Most prevalently, the molecular weight distribution is determined by gel permeation chromatography (GPC). The number average molecular weight and so on can be determined on the polystyrene equivalent basis using chloroform or THF as the mobile phase and polystyrene gel columns as columns.

The method of synthesizing a vinyl polymer having not less than 1.1 of said crosslinking silyl groups on the average per molecule is not particularly restricted but includes various methods described hereinabove for the first aspect of the invention. Among them, a synthetic procedure utilizing a living radical polymerization technique is preferred and a procedure utilizing the atom transfer radical polymerization technique is more preferred. As typical production methods, the same processes as said synthetic methods A and B for the (A1) component can be mentioned.

When the curable composition according to the fourth aspect of the invention is required to give a cured product having rubber-like properties in particular, it is preferable that said crosslinking silyl group is present in the number of not less than 1.1 on the average at the molecular chain terminus, for the molecular mass between crosslinking points, which has considerable bearings on rubber elasticity, can then be large. More preferably, all crosslinking silyl groups are located at molecular chain termini.

[The Reactive Plasticizer for (E) Component]

The reactive plasticizer for use as the (E) component in the fourth aspect of the invention, which is predominantly composed of a vinyl polymer having not more than one of crosslinking silyl group represented by the general formula (1) exclusively at one molecular chain terminus on the average per molecule, that is to say a vinyl polymer having said crosslinking silyl group of the general formula (1) at one terminus only and not having said crosslinking silyl group of the general formula (1) at the other terminus. By adding this reactive plasticizer (E), not only the workability with the curable composition in both the formulation stage and the application stage can be improved but also a good flexibility can be imparted to the cured product and the adverse effect of plasticizer migration will be suppressed.

While the number of crosslinking silyl groups in the (E) component in the fourth aspect of the invention is defined as being "not more than one on the average", this definition takes into account the impurity having no crosslinking silyl group. For example, even when the vinyl polymer having one crosslinking silyl group is produced by the method described hereinafter, it is still difficult to avoid by-production of a vinyl polymer not having the crosslinking silyl group. Furthermore, it is difficult to selectively eliminate the fraction not having the crosslinking silyl group from the reactive plasticizer as a polymer (unlike the elimination of low-molecular compounds) Therefore, the number of crosslinking silyl groups in the reactive plasticizer is not more than one on the average. Furthermore, when the (E) component in the fourth aspect of the invention is identified by analysis, the number of crosslinking silyl groups in the reactive plasticizer may sometimes be found only as the average value so that the average value in the present invention is used for the crosslinking silyl group.

The reactive plasticizer (E) in the fourth aspect of the invention has a crosslinking silyl group only at one molecular chain terminus so that, unlike the vinyl polymer (A4), it is substantially incapable of forming a crosslink by itself. However, when cured along with the (A4) component, one molecular chain terminus provided with the crosslinking silyl group reacts with the crosslinking-silyl group of the (A4) component and, as a consequence, the reactive plasticizer (E) is taken up in the cured product. However, since the (E) component has a molecular chain terminus not participating in crosslinking, it functions as a plasticizer. As the (E) component is taken up in the cured product through crosslinking and, hence, is not substantially extracted out into the environment such as water, oil, solvent or air, the aging of physical properties and environmental contamination due to a migration of the plasticizer which tends to occur often with the conventionsl plasticizer are lessened.

The preferred crosslinking silyl group of the reactive plasticizer (E) is the same as the silyl group of the component (A4).

As the vinyl monomer constituting the main chain of said reactive plasticizer (E), any of the vinyl monomers which can be used for said (A1) component can be used and these can be used each independently or in a combination of two or more thereof. However, since the (E) component should be a vinyl polymer having a crosslinking silyl group at only one molecular chain terminus, monomers containing crosslinking silyl groups cannot be used except when a crosslinking silyl group is to be introduced into the molecular chain terminus.

The reactive plasticizer (E) is preferably a meth acrylic polymer obtainable by a synthetic process using a (meth) acrylic monomer, among said various monomers, in a proportion of not less than 40 weight %. Furthermore, said reactive plasticizer is preferably an acrylic polymer obtained by a synthetic process using an acrylic monomer, among said various monomers, in a proportion of not less than 30 weight %.

The reactive plasitcizer (E) mentioned above is preferably a plasticizer which is liquid in the formulation stage or application stage of the curable composition and, moreover, is preferably lower in viscosity than the vinyl polymer having a crosslinking silyl group (A4). Moreover, it preferable that, when these components are admixed, either a homogeneous state or a microscopic phase-separation state be assumed.

The number average molecular weight of said reactive plasticizer (E) is preferably 500 to 15000, more preferably 800 to 1000. The still more preferable molecular weight range is 1000 to 8000. When the molecular weight of (E) is less than 500, the effect expected of a reactive plasticizer is not expressed, When it exceeds 15000, the viscosity lowering effect is not expressed.

The molecular weight distribution of the reactive plasticizer (E) is not particularly restricted but, in terms of viscosity-lowering effect, is preferably narrow enough, i.e. less than 1.8. The distribution value is more preferably not more than 1.7, still more preferably not more than 1.6, more preferably not more than 1.5, particularly not more than 1.4, most preferably not more than 1.3.

The vinyl polymer (E) having not more than one of crosslinking silyl group of the general formula (1) on the average can be produced by various alternative methods. Thus., the following methods [G] to [K], though not limited thereto, can be mentioned.

[G] A method which comprises adding a hydrosilane compound having a crosslinking silyl group to a vinyl polymer having an alkenyl group only at one molecular chain terminus.

This production method [G] is similar to the production method [A] for the (A1) component but different in that a vinyl polymer having an alkenyl group only at one molecular chain terminus is employed. The vinyl polymer having an alkenyl group only at one molecular chain terminus can be prepared by the alternative processes [G-a] to [G-j] to be described hereinafter, although these processes are not exclusive choices.

[H] A method which comprises reacting a vinyl polymer having a hydroxyl group only at one molecular chain terminus with a compound having both a crosslinking silyl group and a functional group capable of reacting with a hydroxyl group, such as an isocyanato group.

The above production method [H] is similar to the production method [B] for the (A1) component but different only in that a vinyl polymer having a hydroxyl group only at one molecular chain terminus is used as the substrate polymer. The vinyl polymer having a hydroxyl group only at one molecular chain terminus can be produced by the processes [H-a] to [H-f] to be described hereinafter, although these processes are not exclusive choices available.

[I] A method for synthesizing a vinyl polymer by a living radical polymerization technique using an initiator having one initiation point, which comprises reacting a compound having both a polymerizable alkenyl group and a crosslinking silyl group in the terminal stage of the polymerization reaction or after completion of the reaction of the predetermined vinyl monomer.

As the compound having both a polymerizable alkenyl group and a crosslinking silyl group for use in the above production method [I], there can be mentioned compounds represented by the above general formula (17). The initiator having one initiation point for use in the living radical polymerization will be described later herein.

[J] A method which comprises subjecting a vinyl monomer to radical polymerization using a crosslinking silyl group-containing chain transfer agent.

The crosslinking silyl group-containing chain transfer agent for use in the above method [J] for synthesis is not particularly restricted as far as it is capable of introducing a crosslinking silyl group into only one molecular chain terminus. Thus, for example, there can be mentioned the crosslinking silyl group-containing mercaptans disclosed in Japanese Kokoku Publication Hei-3-14068, for instance, namely 3-mercaptopropyltrimethoxysilane, 3-mercaptopropyltriethoxysilane, 3-mercaptopropylmethyldimethoxysilane, etc., and the crosslinking silyl group-containing hydrosilanes which are disclosed in Japanese Kokoku Publication Hei-4-55444, for instance. Furthermore, radical initiators having a crosslinking silyl group may also be employed.

[K] A method which comprises reacting a vinyl polymer having a highly reactive carbon-halogen bond at only one molecular chain terminus with a stable, crosslinking silyl group-containing carbanion.

The above production method [K] is similar to the production method [E] for the (A1) component except that a vinyl polymer having a highly reactive carbon-halogen bond at only one molecular chain terminus is used as the polymer. Such a vinyl polymer having a highly reactive carbon-halogen bond at only one molecular chain terminus can be produced by the process [K-a] to be described later herein, among other processes.

The processes [G-a]~[G-j] for producing the vinyl polymer having an alkenyl group at one molecular chain terminus, which is to be used in the above production method [G], is described.

The following processes [G-a] and [G-b] are exemplary processes for directly synthesizing a vinyl polymer having an alkenyl group only at one molecular chain terminus by a living radical polymerization technique using an initiator having one initiation point. The initiator having one initiation point for use in this living radical polymerization will be described later herein.

[G-a] A process for synthesizing a vinyl polymer by a living radical polymerization technique using an initiator having one initiation point, which comprises reacting a compound having both a polymerizable alkenyl group and a sparingly polymerizable alkenyl group in a terminal stage of polymerization reaction or after completion of the reaction of the predetermined vinyl monomer.

As the compound having both a polymerizable alkenyl group and a sparingly polymerizable alkenyl group for use in the above production process [G-a], there can be mentioned compounds represented by the above general formula (7).

[G-b] A process in which, in synthesizing a vinyl polymer by a living radical polymerization technique using an initiator having one initiation point, a compound having at least 2 sparingly polymerizable alkenyl groups is reacted at a terminal stage of polymerization reaction or after completion of the reaction of the predetermined vinyl monomer.

The above compound having at least two sparingly polymerizable alkenyl groups is not particularly restricted but includes 1,5-hexadiene, 1,7-octadiene and 1,9-decadiene, among others.

The following processes [G-c] to [G-f] are exemplary processes for converting the halogen atom of a vinyl polymer having a highly reactive carbon-halogen bond at only one molecular chain terminus to an alkenyl group.

Regarding the method for substituting an alkenyl group for the halogen of a vinyl polymer having a highly reactive carbon-halogen bond at only one molecular chain terminus, processes corresponding to said processes [A-c] to [A-f] for producing the (A1) component can be employed. The corresponding processes [A-c] to [A-f] in which a vinyl polymer having a highly reactive carbon-halogen bond at only one molecular chain terminus are now designated as processes [G-c] to [G-f], respectively. By these processes [G-c] to [G-f], a vinyl polymer having an alkenyl group at only one molecular chain terminus can be obtained. The polymer having not less than 1.1 of highly reactive carbon-halogen bond at only one molecular chain terminus on the average per molecule can be obtained by the process [K-a] to be described later herein, among others, however this is not limited thereto.

The following processes [G-g] to [G-j] are exemplary processes for converting the hydroxyl group of a vinyl polymer having a hydroxyl group at only one molecular chain terminus to an alkenyl group.

The processes for converting the hydroxyl group of a vinyl polymer having a hydroxyl group at only one molecular chain terminus to an alkenyl group may be comparable to said processes [A-g] to [A-j] for producing the [A1] component. With the processes [A-g] to [A-j] in which a vinyl polymer having a hydroxyl group at only one molecular chain terminus is used being designated as processes [G-g] to [G-j], a vinyl polymer having an alkenyl group at only one molecular chain terminus can be obtained by any of the processes [G-g] to [G-j]. The above-mentioned polymer having a hydroxyl group at only one molecular chain terminus can be produced by any of the processes [H-a] to [H-f], among others.

Referring to the synthesis method of said vinyl polymer having an alkenyl group at only one molecular chain terminus, when a halogen is not directly involved in the introduction of an alkenyl group as in the processes [G-a] and [G-b], it is preferable to use the living radical polymerization technique. Between the above processes, the process [G-b] is preferred in view of the comparative ease of control. Among variations of living radical polymerization, atom transfer radical polymerization is preferred.

When an alkenyl group is to be introduced by converting the halogen group of a vinyl polymer having a highly reactive carbon-halogen bond as in the processes [G-c] to [G-f], it is preferable to use a vinyl polymer having a highly reactive carbon-halogen bond at only one molecular chain terminus as obtained by a radical polymerization (atom transfer radical polymerization) reaction using an organohalogen compound having a highly reactive carbon-halogen bond to be described hereinafter or a sulfonyl halide as the initiator and a transition metal complex as the catalyst. The more preferred is the process [G-f] in view of the ease of control.

The processes [H-a] to [H-f] for producing the vinyl polymer having a hydroxyl group at one molecular chain terminus, which is to be used in the above production method [H] and processes [G-g] to [G-j], is described below.

The following processes [H-a] and [H-b] are exemplary processes for directly synthesizing a vinyl polymer having a hydroxyl group at one molecular chain terminus by a living radical polymerization technique using an initiator having one initiation point. The initiator having one initiation point for use in this living radical polymerization technique will be described later herein.

[H-a] A process for synthesizing a vinyl polymer by a living radical polymerization technique using an initiator having one initiation point, which comprises reacting a compound having both a polymerizable alkenyl group and a hydroxyl group in a terminal stage of polymerization reaction or after completion of the reaction of the predetermined vinyl monomer.

As the compound having both a polymerizable alkenyl group and a hydroxyl group for use in the above production process [H-a], there can be mentioned compounds represented by the above general formula (13).

[H-b] A process in which, in synthesizing a vinyl polymer by a living radical polymerization technique using an initiator having one initiation point, an alkenyl alcohol such as 10-undecenol, 5-hexenol or allyl alcohol is reacted at a terminal stage of polymerization reaction or after completion of the reaction of the predetermined monomer.

The following process [H-c] is an exemplary radical polymerization process using a hydroxyl group-containing chain transfer agent or initiator.

[H-c] This process comprises radical-polymerizing said vinyl monomer using a hydroxyl-containing chain transfer agent, such as mercaptoethanol, or a hydroxyl-containing azo initiator.

The following processes [H-d] to [H-f] are exemplary processes for converting the halogen of a vinyl polymer having a highly reactive carbon-halogen bond at only one molecular chain terminus to a hydroxyl group.

The vinyl polymer having a highly reactive carbon-halogen bond at only one molecular chain terminus can be produced by the process [K-a] to be described hereinafter, among others.

[H-d] A process which comprises reacting a vinyl polymer having a highly reactive carbon-halogen bond at only one molecular chain terminus with a hydroxyl group-containing stabilized carbanion such as the one represented by the above general formula (14) to thereby substitute a hydroxyl-containing substituent for said halogen.

[H-e] The process which comprises permitting an elemental metal, such as zinc, or an organometal compound to act on a vinyl polymer having a highly reactive carbon-halogen bond at one molecular chain terminus to prepare an enolate anion and reacting it with an aldehyde or a ketone.

[H-f] A process which comprises reacting a vinyl polymer having a highly reactive carbon-halogen bond at only one molecular chain terminus with a hydroxyl-containing oxyanion, such as the one represented by the above general formula (15), or a hydroxyl-containing carboxylate anion, such as the one represented by the above general formula (16), to substitute a hydroxyl-containing group for the halogen.

Referring to the above technology of converting the halogen of a vinyl polymer having a highly reactive carbon-halogen bond at only one molecular chain terminus to a hydroxyl group, when the halogen is not directly involved in the introduction of a hydroxyl group as in the processes [H-a]

to [H-c], it is preferable to use the living radical polymerization technique. The process [H-b] is preferred in view of the ease of control. Among variations of living radical polymerization, atom transfer radical polymerization is preferred.

When the synthesis method comprises introducing a hydroxyl group by converting the highly reactive carbon-halogen bond as in the processes [H-d] to [H-f], it is preferable to use a vinyl polymer having a highly reactive carbon-halogen bond at only one molecular chain terminus as obtained by a radical polymerization (atom transfer radical polymerization) reaction using an organohalogen or sulfonyl halide compound to be described hereinafter as the initiator and a transition metal complex as the catalyst. The more preferred is the process [H-f] in view of the ease of control.

The process [K-a] for producing a vinyl polymer having a highly reactive carbon-halogen bond at only one molecular chain terminus for use in the above production method [K] and processes [G-c] to [G-f] and [H-d] to [H-f] is now described in detail.

[K-a] This process comprises polymerizing a vinyl monomer by an atom transfer radical polymerization reaction using an initiator having one highly reactive carbon-halogen bond.

The initiator which can be used in the above process [K-a] includes organohalogen compounds having one highly reactive carbon-halogen bond and sulfonyl halide compounds,. such as those represented by the following formulas, among others.

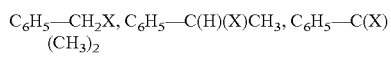

(wherein $C_6H_5$ stands for a phenyl group; X represents a chlorine, bromine or iodine atom)

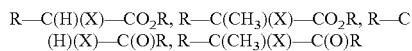

(wherein R represents a hydrogen atom or an alkyl, aryl or aralkyl group containing up to 20 carbon atoms and the plurality of R groups may be the same or different; X represents a chlorine, bromine or iodine atom)

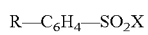

(wherein R represents a hydrogen atom or an alkyl, aryl or aralkyl group containing up to 20 carbon atoms; X represents a chlorine, bromine or iodine atom)

These may be used each independently or two or more of them may be used in a combination of two or more thereof.

The initiator having one initiation point for use in the above living polymerization varies with different modes of polymerization. Thus, in the case of atom transfer radical polymerization, an organohalogen compound having one highly reactive carbon-halogen bond or a sulfonyl halide compound, such as described for [K-a] above, is used as the initiator. In the living radical polymerization technique using a radical capping agent such as a nitroxide or the like or in the living radical polymerization technique utilizing a cobalt-porphyrin complex or the like, a peroxide, such as benzoyl peroxide, or an azo compound, such as azobisisobutyronitrile or azobisisovaleronitrile, can be used as the initiator.

The vinyl polymer having a crosslinking silyl group at only one molecular chain terminus can also be a vinyl polymer having a crosslinking silyl group at one molecular chain terminus and a highly reactive carbon-halogen bond at the other molecular chain terminus as produced by the method using an organohalogen compound having a crosslinking silyl group which corresponds to the method (F) for producing the (A1) component, either as it is or after conversion of said halogen to a group other than a crosslinking silyl group.

Similarly, the vinyl polymer having a crosslinking silyl group at only one molecular chain terminus can also be obtained by preparing a vinyl polymer having an alkenyl group at one molecular chain terminus and a highly reactive carbon-halogen bond at the other terminus by the method using an organohalogen compound having an alkenyl group and converting the alkenyl group to a crosslinking silyl group by the technology described above.

As mentioned hereinbefore, the crosslinking silyl group of the vinyl polymer having a crosslinking silyl group at only one molecular chain terminus as produced via said method (I) or any of processes [G-a], [G-b], [H-a], [H-b], etc. does not necessarily exist at the terminus in a strict sense of the term but may possibly be located only close to the terminus. However, the effect of addition of such a polymer is fundamentally not different from that of a polymer having said group strictly at the terminus. Therefore, such polymers are subsumed in the concept of a vinyl polymer having a crosslinking silyl group of the general formula (1) at only one molecular chain terminus for use as the main component of the reactive plasticizer (E) according to the fourth aspect of the invention.

The vinyl polymer having a crosslinking silyl group at only one molecular chain terminus for the above reactive plasticizer (E) can be prepared by an optional combination of the processes described hereinabove but as typical production technologies, methods corresponding to the methods A and B described for (A1) component can be mentioned.

The addition amount of the reactive plasticizer (E), based on 100 weight parts of the vinyl polymer (A4) having not less than 1.1 of crosslinking silyl groups of the general formula (1) on the average, is 5 to 150 weight parts, preferably 10 to 120 weight parts, more preferably 20 to 100 weight parts. At an addition amount below 5 weight parts, the effect expected of a plasticizer is not expressed. If the amount of 150 weight parts is exceeded, the mechanical strength of the cured product will be insufficient.

The curable composition according to the fourth aspect of the invention may be supplemented with various optional components similar to those mentioned for the first aspect of the invention.

The curable composition according to the fourth aspect of the invention can be prepared as a one-component system such that all the components are premixed and sealed and, after application, let the whole be cured in situ by atmospheric moisture or as a two-component system such that a curing agent comprising the curing catalyst, filler, plasticizer, water, etc. and a polymer composition are admixed prior to application.

The curable composition according to the fourth aspect of the invention can be used in a broad spectrum of applications, for example sealants such as architectural elastic sealants, composite-glass sealants, electric/electronic materials such as a solar cell back sealant, etc., electrical insulating materials such as conductor/cable insulation sheaths, etc., adhesives, self-adhesives, elastic adhesives, coatings, powder coatings, coating dopes, foams, electric/electronic potting materials, film, gaskets, potting compounds, various molding compounds, rust-preventive, and water-proofing sealants for wire-reinforced glass or laminated glass edges (cut edges).

<<The Fifth Aspect of the Invention>>

The curable composition according to the fifth aspect of the invention is now described.

The curable composition according to the fifth aspect of the invention comprises (A5) a vinyl polymer having a crosslinking silyl group and (F) a silanol-containing compound.

[The Vinyl Polymer for (A5) Component]

The (A5) component according to the fifth aspect of the invention is a vinyl polymer having a main chain produced by living radical polymerization and at least one crosslinking silyl group of the general formula (1) on the average per molecule, which, as such, crosslinks and cures by siloxane bonding.

The general formula (1) representing the crosslinking silyl group (A5) is identical to the general formula (1) representing the crosslinking silyl group (A1) in the first aspect of the invention except that $R^1$ and $R^2$ may be the same or different and each represents an alkyl group containing 1 to 20 carbon atoms, an aryl group containing 6 to 20 carbon atoms or an aralkyl group containing 7 to 20 carbon atoms.

The crosslinking silyl group of the general formula (1) should be contained in the number of at least one per polymer molecule. When the number of crosslinking silyl groups per molecule is less than 1 on the average, a sufficiently cured product cannot be obtained. The average number of crosslinking silyl groups of the general formula (1) per molecule which is necessary to provide a sufficiently cured product is generally 1.1 to 5, preferably 1.2 to 4, more preferably 1.3 to 3.

The monomer constituting its main chain is not particularly restricted as far as it is a vinyl monomer, and includes the monomeric compounds mentioned for the first aspect of the invention.

From the standpoint of physical properties, the vinyl polymer having not less than 1.1 of the above crosslinking silyl groups on the average is preferably a (meth)acrylic polymer synthesized by using a (meth)acrylic monomer, among said various monomers, in a proportion of not less than 40 weight %. The still more preferred is an acrylic polymer synthesized by using an acrylic monomer, among said various monomers, in a proportion of not less than 30 weight %.

The number average molecular weight of the vinyl polymer having not less than 1.1 of said crosslinking silyl groups on the average is not particularly restricted but is preferably within the range of 500 to 100000. At a molecular weight less than 500, the intrinsic characteristics of a vinyl polymer are hardly manifested and, at above 100000, handling may become difficult in some instances.

The molecular weight distribution, namely the ratio (Mw/Mn) of weight average molecular weight (Mw) to number average molecular weight (Mn), of the vinyl polymer having not less than 1.1 of said crosslinking silyl groups on the average per molecule is not particularly restricted. For facilitating handling by controlling the viscosity of the curable composition at a sufficiently low amount while securing necessary cured physical properties, however, a narrow molecular weight distribution is preferred. The molecular weight distribution value is preferably less than 1.8, more preferably not more than 1.7, still more preferably not more than 1.6, yet more preferably not more than 1.5, still more preferably not more than 1.4, most preferably not more than 1.3. The molecular weight distribution is most prevalently determined by gel permeation chromatography (GPC). The number average molecular weight and so on can be determined on the polystyrene equivalent basis using chloroform or THF as the mobile phase and polystyrene gel columns as columns.

The vinyl polymer for use as the (A5) component in accordance with the fifth aspect of the invention is prepared by living polymerization. Unlike free radical polymerization or the like, this polymerization technique provides for an accurate control over the introduction of a crosslinking silyl group. Thus, since, as a feature of living polymerization, a crosslinking silyl group can be introduced into the terminus or terminal region of the polymer with quite high probability, not only a reduction in modulus but also an increase in gel fraction can be made feasible. Furthermore, because of the "living" mode of radical polymerization, the molecular weight distribution as a major determinant of viscosity of the polymer can be decreased to effect reductions in viscosity of the polymer and curable composition.

However, there is a limit to the reduction in modulus which can be realized only with the vinyl polymer having a crosslinking silyl group (A5) whose main chain has been synthesized by living polymerization. The fifth aspect of the present invention is characterized in that the vinyl polymer (A5) whose main chain has been synthesized by living polymerization and has a crosslinking silyl group at least one terminus thereof is used in combination with a silanol group-containing compound (F) to be described later herein, whereby the modulus-reducing effect is augmented as compared with the case in which a vinyl polymer synthesized by the conventional free radical polymerization technology is used.

While the living polymerization technology referred to above includes living anionic polymerization, living cationic polymerization and living radical polymerization techniques, among others, any of these techniques can be liberally employed in the fifth aspect of the invention. The method of introducing said crosslinking silyl group into the vinyl polymer is not particularly restricted, either, but various techniques can be employed.

However, from the standpoint of monomer universality and ease of control, the living radical polymerization technique for introducing a crosslinking silyl group directly into the main chain and the technique which comprises synthesizing a vinyl polymer having a given functional group capable of converting to a crosslinking silyl group in one or more reaction steps and converting the given functional group to the crosslinking silyl group are preferred. In particular, an atom transfer radical polymerization is more preferred.

The living radical polymerization technique is advantageous in that despite its also being a method for radical polymerization reaction which is generally considered to be hardly controllable because of the high polymerization velocity and high tendency of termination by radical-radical coupling or the like, a termination reaction does not easily take place, thus giving a polymer with a narrow molecular weight distribution (Mw/Mn=about 1.1 to 1.5), and further in that the molecular weight can be freely controlled by adjusting the monomer-initiator charge ratio.

Since it is thus capable of giving a polymer having a narrow molecular weight distribution and a low viscosity and enables introduction of a monomer having a given functional group in a more or less planned position, the living radical polymerization is a further preferred method for producing said vinyl polymer having the defined functional group.

As the specific technology of producing the (A5) component, there can be mentioned various processes corresponding to those described for the first aspect of the invention, with the exception of the processes using any mode of polymerization other than living polymerization. Typical processes are those corresponding to the above synthetic methods A and B described for the (A1) component.

When rubber-like properties are especially required of a cured product obtainable from the curable composition according to this fifth aspect of the invention, it is preferable that at least one crosslinking silyl group is present at the molecular chain terminus, for the molecular mass between crosslinking points, which has considerable bearings on rubber elasticity, can then be large. More preferred is a polymer having a crosslinking silyl group at both termini of the molecular chain. Still more preferably, all crosslinking silyl groups are present at molecular chain termini.

[The Silanol-Containing Compound for (F) Component]

The "silanol-containing compound" in the context of the fifth aspect of the invention is a compound (I) having one silanol group within the molecule and/or a compound (II) capable of reacting with moisture to give a compound having one silanol group within the molecule. Whichever alone of these compounds can be used or both compounds may be used in combination.

The compound(I) having one silanol group within the molecule, i.e. one of (F) component for use in this invention, is not particularly restricted but includes compounds represented in the following:

compounds which may be represented by the formula $(R'')_3$ SiOH (wherein the R" groups may be the same or different and each represents a substituted or unsubstituted alkyl or aryl group), such as $(CH_3)_3SiOH$, $(CH_3CH_2)_3SiOH$, $(CH_3CH_2CH_2)_3SiOH$, $(n\text{-}Bu)_3SiOH$, $(sec\text{-}Bu)_3SiOH$, $(t\text{-}Bu)_3SiOH$, $(t\text{-}Bu)Si(CH_3)_2OH$, $(C_5H_{11})_3SiOH$, $(C_6H_{13})_3SiOH$, $(C_6H_5)_3SiOH$, $(C_6H_5)_2Si(CH_3)OH$, $(C_6H_5)Si(CH_3)_2OH$, $(C_6H_5)_2Si(C_2H_5)OH$, $C_6H_5Si(C_2H_5)_2OH$, $C_6H_5CH_2Si(C_2H_5)_2OH$, $C_{10}H_7Si(CH_3)_2OH$, (in the above formulas, $C_6H_5$ stands for a phenyl group; $C_{10}H_7$ stands for a naphthyl group);

silanol-containing cyclic polysiloxane compounds, such as

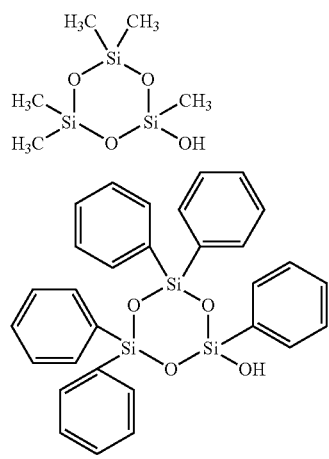

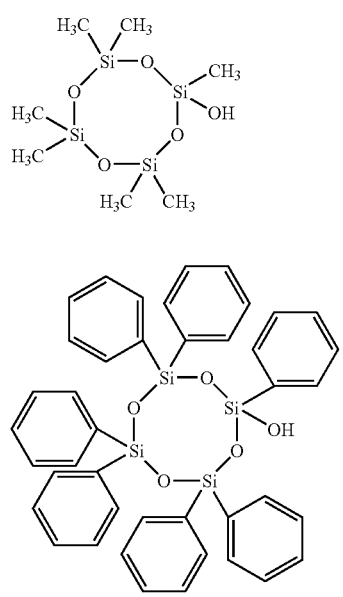

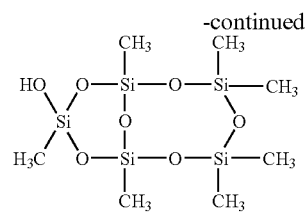

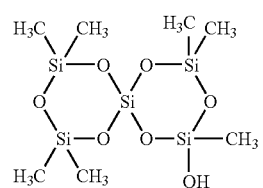

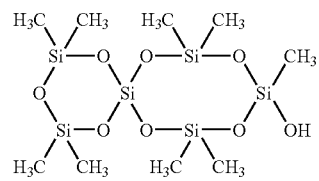

silanol-containing linear polysiloxane compounds, such

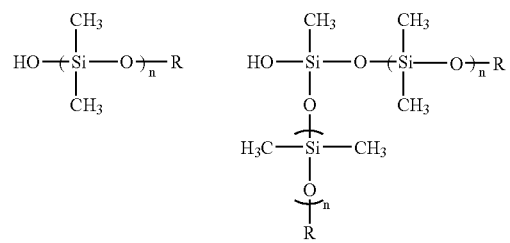

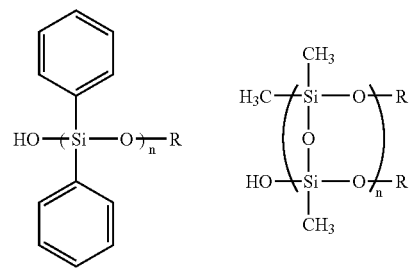

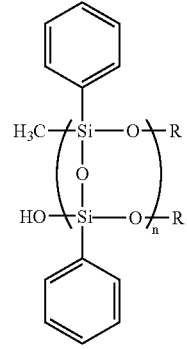

compounds whose main chains are polymers containing silicon and carbon atoms and each having a silanol group at a molecular chain terminus;

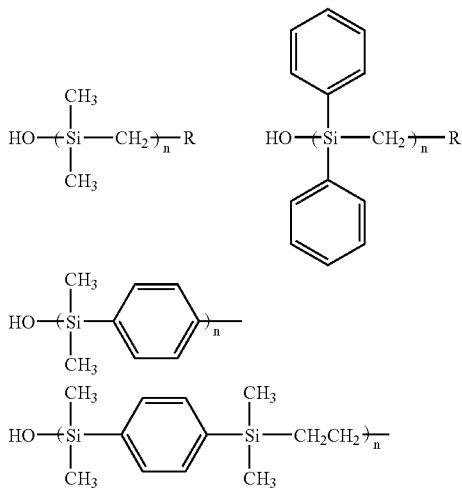

compounds whose main chains are polysilanes each having a silanol group at a molecular chain terminus,

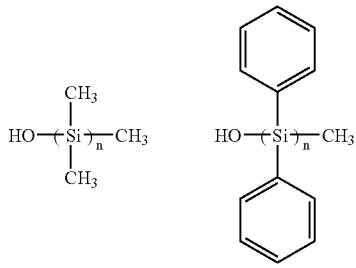

and compounds whose main chains are polymers containing silicon, carbon and oxygen atoms and each having a silanol group at a molecular chain terminus, such as

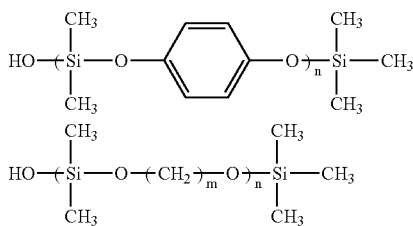

The preferred, among these, are compounds represented by the following general formula (48).

(wherein $R^{26}$ represents a hydrocarbon group containing 1 to 20 carbon atoms and the plurality of $R^{26}$ groups may be the same or different)

The $R^{26}$ group is preferably a methyl, ethyl, vinyl, t-butyl or phenyl group, more preferably a methyl group.

Among these, a compound of low molecular weight, such as $(CH_3)_3SiOH$, is preferred from the standpoint of availability and effect of addition.

The above compound having one silanol group, i.e. compound (I), appears to react with the crosslinking silyl group of the vinyl polymer (A5) or the siloxane bond formed on crosslinking thereof to reduce the number of crosslinks, thus imparting flexibility to the cured product.

The compound (II) capable of reacting with moisture to give a compound having one silanol group therein, the one kind of (F) component, is not particularly restricted but is preferably a compound capable of reacting with moisture to give a silanol-containing compound of the above general formula (48) (as the hydrolysate). Thus, such compound includes but is not limited to the following compounds as well as the compounds of the general formula (49) to be described later herein.

Thus, N,O-bis(trimethylsilyl)acetamide, N-(trimethylsilyl)acetamide, bis(trimethylsilyl)tri-fluoroacetamide, N-methyl-N-trimethylsilyltri-fluoroacetamide, bistrimethylsilylurea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethane sulfonate, trimethylsilyl phenoxide, trimethylsilyl-n-octanol, trimethylsilyl-2-ethylhexanol, tris(trimethylsilyl)glycerol, tris(trimethylsilyl)trimethylolpropane, tris(trimethylsilyl)-pentaerythritol, tetra(trimethylsilyl)pentaerythritol, $(CH_3)_3SiNHSi(CH_3)_3$, $(CH_3)_3SiNSi(CH_3)_2$, and

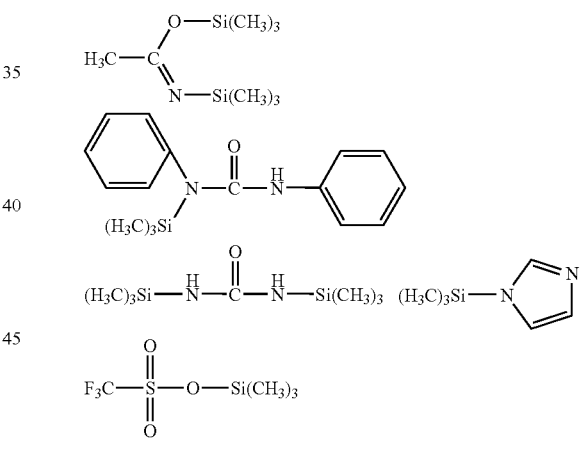

can be used with advantage. From the standpoint of the silanol content of the hydrolysate, $(CH_3)_3SiNHSi(CH_3)_3$ is particularly preferred.

The preferred compound (II) capable of reacting with moisture to give a compound having one silanol group per molecule, said one kind of (F) component, includes not only the above-mentioned compounds but also compounds represented by the following general formula (49).

(wherein $R^{26}$ has the same meaning as defined above; n represents a positive number; $R^{27}$ represents a group derived from an active hydrogen-containing compound by removal of part or the whole of active hydrogen)

$R^{28}$ is preferably a methyl, ethyl, vinyl, t-butyl or phenyl group, more preferably a methyl group.

The $(R^{26})_3Si$ group is preferably a trimethylsilyl group; all the three $R^{26}$ groups are methyl groups. Moreover, $\underline{n}$ is preferably equal to 1 to 5.

The active hydrogen-containing compound from which $R^{27}$ is derived is not particularly restricted but includes alcohols such as methanol, ethanol, n-butanol, i-butanol, t-butanol, n-octanol, 2-ethylhexanol, benzyl alcohol, ethylene glycol, diethylene glycol, polyethylene glycol, propylene glycol, dipropylene glycol, polypropylene glycol, propanediol, tetramethylene glycol, poly(tetramethylene glycol), glycerol, trimethylolpropane, pentaerythritol, etc.; phenols such as phenol, cresol, bisphenol A, hydroquinone, etc.; carboxylic acids such as formic acid, acetic acid, propionic acid, lauric acid, palmitic acid, stearic acid, behenic acid, acrylic acid, methacrylic acid, oleic acid, linoleic acid, linolenic acid, sorbic acid, oxalic acid, malonic acid, succinic acid, adipic acid, maleic acid, benzoic acid, phthalic acid, terephthalic acid, trimellitic acid, etc.; ammonia; amines such as methylamine, dimethylamine, ethylamine, diethylamine, n-butylamine, imidazole, etc.; acid amides such as acetamide, benzamide, etc.; urea compounds such as urea, N,N'-diphenylurea, etc.; and ketones such as acetone, acetylacetone, 2,4-heptadione, etc.; among others.

The compound (II) capable of reacting with moisture to give a compound having one silanol group within the molecule, as represented by the general formula (49), can be obtained, for example by reacting said active hydrogen-containing compound with a compound having both an $(R^{26})_3Si$ group ($R^{26}$ has the same meaning as above) and a halogen or other group capable of reacting with active hydrogen, which is known as a silylating agent, such as trimethylsilyl chloride or dimethyl(t-butyl) chloride.

The compound represented by the general formula (49) includes but is not limited to allyloxytrimethylsilane, N,O-bis(trimethylsilyl)acetamide, N-(trimethylsilyl)acetamide, bis(trimethylsilyl)trifluoroacetamide, N-methyl-N-trimethylsilyltrifluoroacetamide, bistrimethylsilylurea, N-(t-butyldimethylsilyl)N-methyltrifluoroacetamide, (N,N-dimethylamino)trimethylsilane, (N,N-diethyl-amino)trimethylsilane, hexamethyldisilazane, 1,1,3,3-tetramethyldisilazane, N-(trimethylsilyl)imidazole, trimethylsilyltrifluoromethane sulfonate, trimethylsilyl phenoxide, trimethylsilyl-n-octanol, trimethylsilyl-2-ethylhexanol, tris(trimethylsilyl)glycerol, tris(trimethyl-silyl)trimethylolpropane, tris(trimethylsilyl)-pentarythritol and tetra(trimethylsilyl)pentaerythritol. These may be used each independently or in a combination of two or more thereof.

Furthermore, compounds which may be represented by the general formula $((CR^{28}O)_3SiO)(R^{29}O)_s)_tZ$ (wherein $R^{28}$ may be the same or different and each represents a univalent hydrocarbon group, substituted or unsubstituted, or a hydrogen atom; $R^{29}$ represents a bivalent hydrocarbon group containing 1~8 carbon atoms, s and t each represents a positive number such that s is equal to 1~6 and s×t is not less than 5; Z represents a univalent through hexavalent organic group), for example
$CH_3O(CH_2C(CH_3)O)_5Si(CH_3)_3$, $CH_2=CHCH_2(CH_2CH(CH_3)O)_5Si(CH_3)_3$, $(CH_3)_3SiO(CH_2CH(CH_3)O)_5Si(CH_3)_3$, $(CH_3)_3SiO(CH_2CH(CH_3)O)_7Si(CH_3)_3$, etc., can also be used with advantage. These may be used each independently or in a combination of two or more thereof.

Referring to said compound (II) capable of reacting with moisture to give a compound having one silanol group within the molecule, the preferred active hydrogen compounds are phenols, acid amides and alcohols and the more preferred are phenols and alcohols, which have hydroxyl groups, for these compounds do not adversely affect the storage stability, weather resistance and other properties.

The preferred, among the compounds mentioned above, are N,O-bis(trimethylsilyl)acetamide, N-(trimethylsilyl)acetamide, trimethylsilyl phenoxide, trimethylsilyl-n-octanol, trimethylsilyl-2-ethylhexanol, tris(trimethylsilyl)glycerol, tris(trimethylsilyl)trimethylolpropane, tris(trimethylsilyl)pentaerythritol and tetra(trimethylsilyl)pentaerythritol.

The compounds (II) capable of reacting with moisture to give a compound having one silanol group within the molecule reacts with moisture during storage, in curing or after curing to give a compound having one silanol group per molecule. It appears that the compound having one silanol group thus produced reacts with the crosslinking silyl group of the vinyl polymer (A5) or the siloxane bond formed on crosslinking thereof to reduce the number of crosslinks, thus contributing to the flexibility of the cured product.

The addition amount of the silanol-containing compound as the (F) component can be adjusted according to the expected physical properties of the cured product.

The addition amount of the silanol-containing compound (F) may be 0.1 to 50 weight parts, preferably 0.3 to 20 weight parts, more preferably 0.5 to 10 weight parts, based on 100 weight parts of the vinyl polymer (A5). At an amount below 0.1 weight part, the effect of addition of (F) is not expressed. Over 50 weight parts, crosslinking is insufficient and the strength and gel fraction of the cured product are considerably decreased.

The timing of addition of said silanol-containing compound (F) to the vinyl polymer (A5) is not particularly restricted. Thus, the (F) component may be added in the stage of production of the vinyl polymer (A5) or at the preparation of the curable composition.

The curable composition according to the fifth aspect of the invention may be supplemented with various optional components similar to those mentioned for the first aspect of the invention.

The curable composition according to the fifth aspect of the present invention can be provided as a one-component system such that all the components are premixed and sealed and, after application, let the whole be cured in situ by atmospheric moisture or as a two-component system such that a curing agent comprising the curing catalyst, filler, plasticizer, water, etc. and a polymer composition are admixed prior to application.

The curable composition according to the fifth aspect of this invention can be used in a broad spectrum of applications, for example sealants such as architectural elastic sealants, composite-glass sealants, electric/electronic materials such as a solar cell back sealant, etc., electrical insulating materials such as conductor/cable insulation sheaths, adhesives, self-adhesives, elastic adhesives, coatings, powder coatings, coating dopes, foams, electric/electronic potting materials, film, gaskets, potting compounds, various molding compounds, rust-preventive, water-proofing sealants for wire-reinforced glass or laminated glass edges (cut edges) and so on.

BEST MODE FOR CARRYING OUT THE INVENTION

The following examples and comparative examples illustrate the present invention in further detail, it being, however, to be understood that these examples are by no means definitive of the scope of the invention.

In the following examples and comparative examples, all "parts" and "%" are "parts by weight" and "weight %", respectively.

EXAMPLES RELATING TO THE FIRST ASPECT OF THE INVENTION

As referred to in the following examples, the "number average molecular weight" and "molecular weight distribution (ratio of weight average molecular weight to number average molecular weight)" are the values determined by gel permeation chromatography (GPC) based on polystyrene standards. Thus, columns packed with crosslinked polystyrene gels were used as the GPC columns and chloroform was used as the GPC solvent.

Production Example 1

A 10-L separable flask equipped with a reflux-condenser and a stirrer was charged with CuBr (28.0 g, 0.195 mol). After nitrogen gas purging, acetonitrile (559 mL) was added and the mixture was stirred on an oil bath at 70° C. for 15 minutes. Thereafter, butyl acrylate (1.00 kg), diethyl 2,5-dibromoadipate (117 g, 0.325 mol) and pentamethyldiethylenetriamine [hereinafter referred to briefly as triamine] (1.70 mL, 1.41 g, 8.14 mmol) were added and the reaction was started. Under heating at 70° C. with constant stirring, butyl acrylate (4.00 kg) was continuously added dropwise over 175 minutes. In the course of dripping butyl acrylate, triamine (8.50 mL, 7.06 g, 40.7 mol) was further added. At 370 minutes after initiation of the reaction, 1,7-octadiene (1.57 L, 1.17 kg, 7.10 mol) and triamine (20.4 mL, 16.9 g, 97.7 mmol) were added, and the whole mixture was stirred under heating at 70° C. for 220 minutes.

This reaction mixture was diluted with hexane and passed through an activated alumina column, and the volatile matter was distilled off under reduced pressure, whereby an alkenyl group-terminated polymer (polymer [1]) was obtained. This polymer [1] had a number average molecular weight of 21300 and a molecular weight distribution value of 1.3.

A 2-L separable flask equipped with a condenser was charged with polymer [1] (0.73 kg), potassium benzoate (25 g) and N,N-dimethylacetamide (0.7 L) and the mixture was stirred under nitrogen at 70 for 12 hours. The N,N-dimethylacetamide was distilled off under reduced pressure and the residue was diluted with toluene and treated with an activated alumina column to remove the toluene-insoluble matter (KBr and excess potassium benzoate). The volatile fraction of the filtrate was then distilled off under reduced pressure to give polymer [2].

A 2-L round-bottom flask equipped with a condenser was charged with polymer [2] (0.73 kg), aluminum silicate (150 g, product of Kyowa. Chemical, Kyowaad 700 PEL) and toluene (4.0 L) and the mixture was stirred under nitrogen at 100° C. for 5 hours. The aluminum silicate was then filtered off and the toluene in the filtrate was distilled off under reduced pressure to give polymer [3].

A1-L pressure-resisting reaction vessel was charged with polymer [3] (390 g), dimethoxymethylhydrosilane (36.0 mL, 0.292 mol), methyl orthoformate (7.10 mL, 0.065 mol) and platinum(0)-1,1,3,3-tetramethyl-1,3-divinyldisiloxane complex. However, the amount of use of the platinum catalyst was $10^{-2}$ molar equivalents with respect to the alkenyl group of the polymer. This reaction mixture was heated at 100° C. for 400 minutes. The volatile fraction of the mixture was then distilled off under reduced pressure to give a silyl-terminated polymer (polymer [4]). This polymer had a number average molecular weight (GPC method, polystyrene equivalent) of 246000 and a molecular weight distribution value of 1.5. The average number of silyl groups introduced per mole of the polymer was 3.0 as determined by $^1$H NMR analysis.

Production Example 2

A 2-L separable flask equipped with a reflux-condenser and a stirrer was charged with CuBr (22.4 g, 0.156 mol), followed by nitrogen gas purging. Then, acetonitrile (112 mL) was added and the mixture was stirred on an oil bath at 70° C. for 30 minutes. Thereafter, butyl acrylate (0.20 kg), methyl 2-bromopropionate (86.9 g, 0.520 mol) and pentamethyldiethylenetriamine [hereinafter referred to briefly as triamine] (0.19 mL, 0.18 g, 1.04 mmol) were added and the reaction was started. Under heating at 70° C. with constant stirring, butyl acrylate (0.80 kg) was continuously added dropwise over 150 minutes. In the course of dripping butyl acrylate, triamine (1.81 mL, 1.71 g, 9.88 mol) was further added. The whole mixture was stirred under heating at 70° C. for 230 minutes.

This reaction mixture was diluted with toluene and passed through an activated alumina column, and the volatile matter was distilled off under reduced pressure, whereby an alkenyl group-terminated polymer (polymer [5]) was obtained. This polymer [5] had a number average molecular weight of 2600 and a molecular weight distribution value of 1.18.

A 2-L separable flask equipped with a condenser was charged with polymer [5] (0.937 kg), potassium acetate (73.5 g) and N,N-dimethylacetamide (0.8 L) and the mixture was stirred under nitrogen at 70° C. for 5 hours. The N,N-dimethylacetamide was distilled off under reduced pressure and the residue was diluted with toluene and treated with an activated alumina column to remove the toluene-insoluble matter (KBr and excess potassium benzoate). The volatile fraction of the filtrate was then distilled off under reduced pressure to give polymer [6].

Example 1

One-hundred parts of the polymer [4] obtained in Production Example 1, 3 parts of pentaerythritol triacrylate [$(CH_2=CHCOOCH_2)_3CCH_2OH$], 50 parts of polymer [6] as plasticizer, and 100 parts of Calfine 100 (Product of Maruo Calcium) as filler were admixed under stirring. Then, 2 parts of γ-glycidoxypropyltrimethoxysilane and 1 part of Sn (IV) catalyst (dibutyltin diacetylacetonate) were added and stirred and the whole mixture was degassed and molded to give a cured product in the form of a 2 mm (approx.)-thick flat sheet and a cured product in a plano-convex form with a maximum thickness of about 5 mm on a glass sheet. Curing was effected by allowing each product in a sunlit interior environment (near a window) for 2 days and further at 50° C. for 3 days. After curing, the sheet was tested for residual tack (surface tackiness) by the finger touch method and, then, let standing outdoors. The plano-convex cured product was irradiated through the glass, immediately after curing, with a xenon weather-o-meter (product of Suga Testing Instruments, Model SX120, illuminance 180 W, black panel temperature 63° C., rainfall time 18 min. during a total irradiation time of 2 hrs) for 500 hours. The sample was then subjected to a manual peel test. The results are shown in Table 1.

Example 2

Except that trimethylolpropane triacrylate [$(CH_2=CHCOOCH_2)_3CCH_2CH_3$] was used in lieu of the pentaerythritol triacrylate used in Example 1, the procedure of Example 1 was otherwise repeated faithfully to fabricate cured products. The evaluations were also performed as in Example 1. The results are shown in Table 1.

Comparative Example 1

Except that the pentaerythritol triacrylate used in Example 1 was omitted, cured products were fabricated and evaluated in otherwise the same manner as in Example 1. The results are shown in Table 1.

TABLE 1

Cured surface condition when photocurable substance (B) is used

|  | Example 1 | Example 2 | Compar. Ex. 1 |
|---|---|---|---|
| Photocurable substance | Pentaerythritol triacrylate | Trimethylol-propane triacrylate | — |
| Residual tack | ○ | ○ | Δ |
| Manual peel test |  |  |  |
| (Initial) | ○ | ○ | ○ |
| (After 500 hrs) | ○ | ○ | Δ |

In Table 1,
Residual tack:
Not tacky ←> ○ > Δ > X → Tacky
Manual peel test:
Cohesive failure (CF) ←○ > Δ > X → Adhesion failure (AF)

EXAMPLES RELATING TO THE SECOND ASPECT OF THE INVENTION

Production Example 3

A 10-L separable flask equipped with a reflux-condenser. and a stirrer was charged with CuBr (42.0 g, 0.293 mol), followed by nitrogen gas purging. Then, acetonitrile (559 mL) was added and the mixture was stirred on an oil bath at 70° C. for 45 minutes. Thereafter, butyl acrylate (1.00 kg), diethyl 2,5-dibromoadipate (176 g, 0.488 mol) and pentamethyldiethylenetriamine [hereinafter referred to briefly as triamine] (2.00 mL, 1.66 g, 9.58 mmol) were added and the reaction was started. Under heating at 70° C. with constant stirring, butyl acrylate (4.00 kg) was continuously added dropwise over 190 minutes. In the course of dripping butylacrylate, triamine (6.00 mL, 4.98 g, 28.8 mol) was further added. At 310 minutes after initiation of the reaction, 1,7-octadiene (1.44 L, 1.07 kg, 9.75 mol) and triamine (20.5 mL, 17.0 g, 98.1 mmol) were added, and the whole mixture was stirred under heating at 70° C. for 210 minutes.

This reaction mixture was diluted with hexane and passed through an activated alumina column, and the volatile matter was distilled off under reduced pressure, whereby an alkenyl group-terminated polymer (polymer [7]) was obtained. This polymer [7] had a number average molecular weight of 14000 and a molecular weight distribution value of 1.3.

A 10-L separable flask equipped with a condenser was charged with polymer [7] (2.7 kg), potassium benzoate (142 g) and N,N-dimethylacetamide (2.7 L) and the mixture was stirred under nitrogen at 70° C. for 25 hours. The N,N-dimethylacetamide was distilled off under reduced pressure and the residue was diluted with toluene and treated with an activated alumina column to remove the toluene-insoluble matter (KBr and excess potassium benzoate). The volatile fraction of the filtrate was then distilled off under reduced pressure to give polymer [8].

A 2-L round-bottom flask equipped with a condenser was charged with polymer [8] (2.7 kg), aluminum silicate (540 g, product of Kyowa Chemical, Kyowaad 700 PEL) and toluene (2.7 L) and the mixture was stirred under nitrogen at 100° C. for 5 hours. The aluminum silicate was then filtered off and the toluene in the filtrate was distilled off under reduced pressure to give polymer [9].

A1-L pressure-resisting reaction vessel was charged with polymer [9] (409 g), dimethoxymethylhydrosilane (27.0 mL, 0.22 mol), methyl orthoformate (8.0 mL, 0.07 mmol) and platinum(0)-1,1,3,3-tetramethyl-1,3-divinyldisiloxane complex. The amount of use of the platinum catalyst was $10^{-3}$ molar equivalents with respect to the alkenyl group of the polymer. This reaction mixture was heated at 100° C. for 1 hour. The volatile fraction of the mixture was then distilled off under reduced pressure to give a silyl-terminated polymer (polymer [10]). This polymer had a number average molecular weight (GPC method, polystyrene equivalent) of 13900 and a molecular weight distribution value of 1.4. The average number of silyl groups introduced per mole of the polymer was 1.5 as determined by $^1$H NMR analysis.

Example 3

One-hundred parts of the polymer [10] obtained in Production Example 3 and 3 parts of tung oil were admixed, followed by addition of 1 part of Sn (IV) catalyst (dibutyltin diacetylacetonate) with stirring, and the whole mixture was degassed under reduced pressure and molded to give a cured product in the form of a 2 mm-thick flat sheet. On the following day, the sheet was tested for residual tack by the finger touch method. Furthermore, the cured product was left standing outdoors for one month and the degree of surface fouling was examined. The results are shown in Table 2.

Example 4

Except that tung oil was used in a proportion of 5 parts in lieu of 3 parts, a cured product was fabricated and evaluated in the same manner as in Example 3. The results are shown in Table 2.

Comparative Example 2

Except that the tung oil used in Example 3 was omitted from the formulation, a cured product was fabricated and evaluated in otherwise the same manner as in Example 3. The results are shown in Table 2.

TABLE 2

Cured surface condition when air oxidation-curable substance (C) is used

|  | Example 3 | Example 4 | Comparative Example 2 |
|---|---|---|---|
| Tung oil (part) | 3 | 5 | 0 |
| Residual tack |  |  | Δ |
| Fouling, after one month |  |  | ○ |

In Table 2,
Residual tack:
Not tacky ←> ○ > Δ > X → Tacky
Fouling:
Clean ←> ○ > Δ > X → Smudgy (much adherent matter)

Example 5

A cured product was fabricated in the same manner as in Example 3, except that curing was effected by allowing the sample to stand in an interior environment for 2 days and further at 50° C. for 3 days. From the cured product in the form of a sheet, a No. 2 (⅓) dumbbell testpiece was punched out and subjected to tensile testing with Shimadzu Corporation's autograph (measuring conditions: 23° C., 200 mm/min). The results are shown in Table 3.

Example 6

A cured product similar to the one according to Example 4 was fabricated using the same curing conditions as in Example 5 and evaluated in the same manner as in Example 5. The results are shown in Table 3.

Comparative Example 3

A cured product similar to the one according to Comparative Example 2 was fabricated using the same curing conditions as in Example 5 and evaluated in the same manner as in Example 5. The results are shown in Table 3.

TABLE 3

Tensile characteristics when air oxidation-curable substance (C) is used

|  | M50 (MPa) | M100 (MPa) | Tmax (MPa) | Eb (%) |
|---|---|---|---|---|
| Example 5 | 0.081 | 0.15 | 0.21 | 140 |
| Example 6 | 0.082 | 0.15 | 0.15 | 110 |
| Compar. Ex. 3 | 0.081 | 0.15 | 0.17 | 120 |

Example 7

Specimens of the cured sheet prepared in Example 3 were coated with various alkyd coatings and left standing indoors. After a predetermined period of time, the coated surface was touched with a finger to assess the degree of curing. The results are shown in Table 4.

Example 8

The cured sheet obtained in Example 4 was evaluated as in Example 7. The results are shown in Table 4.

Comparative Example 4

The cured sheet obtained in Comparative Example 2 was evaluated as in Example 7. The results are shown in Table 4.

TABLE 4

Alkyd coating coatability when air oxidation-curable substance (C) is used.

| Coating | Example 7 | Example 8 | Comparative Example 4 |
|---|---|---|---|
| Schakelverf | ○/○ | ○/○ | ○/○ |
| Rubbol AZ | ○Δ/○ | ○Δ/○ | Δ/○Δ |
| Sigmasolid semigloss | ○Δ/○ | ○Δ/○ | Δ/○Δ |

Table 4 shows the evaluation after 1 day/the evaluation after 7 days.
○: Completely cured
Δ: Tacky
X: Uncured
The alkyd coatings used are:
Schakelverf: Product of Sigma
Rubbol AZ: Product of Akzo
Sigmasolid semigloss: Product of Sigma

EXAMPLES RELATING TO THE THIRD ASPECT OF THE INVENTION

Production Example 4

A 10-L separable flask equipped with a reflux-condenser and a stirrer was charged with CuBr (42.0 g, 0.293 mol), followed by nitrogen gas purging. Then, acetonitrile (559 mL) was added and the mixture was stirred on an oil bath at 70° C. for 45 minutes. Thereafter, butyl acrylate (1.00 kg), diethyl 2,5-dibromoadipate (176 g, 0.488 mol) and pentamethyldiethylenetriamine [hereinafter referred to briefly as triamine] (4.00 mL, 3.32 g, 19.2 mmol) were added and the reaction was started. Under heating at 70° C. with constant stirring, butyl acrylate (4.00 kg) was continuously added dropwise over 190 minutes. In the course of dripping butyl acrylate, triamine (4.00 mL, 3.32 g, 0.0192 mol) was further added. At 310 minutes after initiation of the reaction, 1,7-octadiene (1.44 L, 1.07 kg, 9.75 mol) and triamine (20.5 mL, 17.0 g, 98.1 mol) were added, and the whole mixture was stirred under heating at 70° C. for 210 minutes.

This reaction mixture was diluted with hexane and passed through an activated alumina column, and the volatile matter was distilled off under reduced pressure, whereby an alkenyl group-terminated polymer (polymer [11]) was obtained. This polymer [11] had a number average molecular weight of 14000 and a molecular weight distribution value of 1.3.

A 10-L separable flask equipped with a condenser was charged with polymer [11] (2.7 kg), potassium benzoate (142 g) and N,N-dimethylacetamide (2.7 L) and the mixture was stirred under nitrogen at 70 for 25 hours. The N,N-dimethylacetamide was distilled off under reduced pressure and the residue was diluted with toluene and treated with an activated alumina column to remove the toluene-insoluble matter (KBr and excess potassium benzoate). The volatile fraction of the filtrate was then distilled off under reduced pressure to give polymer [12].

A 2-L round-bottom flask equipped with a condenser was charged with polymer [12] (2.7 kg), aluminum silicate (540 g, product of Kyowa Chemical, Kyowaad 700 PEL) and toluene (2.7 L) and the mixture was stirred under nitrogen at 100° C. for 5 hours. The aluminum silicate was then filtered off and the toluene in the filtrate was distilled off under reduced pressure to give polymer [13].

A 1-L pressure-resisting reaction vessel was charged with polymer [13] (760 g), dimethoxymethylhydrosilane (46.3 mL, 0.38 mol), methyl orthoformate (13.7 mL, 0.13 mmol) and platinum(0)-1,1,3,3-tetramethyl-1,3-divinyldisiloxane complex. The amount of use of the platinum catalyst was $10^{-3}$ molar equivalents with respect to the alkenyl group of the polymer. This reaction mixture was heated at 100° C. for 1 hour. The volatile fraction of the mixture was then distilled off under reduced pressure to give a silyl-terminated polymer (polymer [14]). This polymer had a number average molecular weight (GPC method, polystyrene equivalent) of 15000 and a molecular weight distribution value of 1.4. The average number of silyl groups introduced per mole of the polymer was 2.0 as determined by $^1$H NMR analysis.

Production Example 5

A 2-L separable flask equipped with a reflux-condenser and a stirrer was charged with CuBr (22.4 g, 0.156 mol), followed by nitrogen gas purging. Then, acetonitrile (112 mL) was added and the mixture was stirred on an oil bath at 70° C. for 30 minutes. Thereafter, butyl acrylate (0.20 kg), methyl 2-bromopropionate (86.9 g, 0.520 mol) and pentamethyldiethylenetriamine [hereinafter referred to briefly as triamine] (0.19 mL, 0.18 g, 1.04 mmol) were added and the reaction was started. Under heating at 70° C. with constant stirring, butyl acrylate (0.80 kg) was continuously added dropwise over 150 minutes. In the course of dripping butyl acrylate, triamine (1.81 mL, 1.71 g, 9.88 mmol) was further added. The whole mixture was stirred under heating at 70° C. for 230 minutes.

This reaction mixture was diluted with toluene and passed through an activated alumina column, and the volatile matter was distilled off under reduced pressure, whereby an alkenyl group-terminated polymer (polymer [15]) was obtained. This polymer [15] had a number average molecular weight of 2600 and a molecular weight distribution value of 1.18.

A 2-L separable flask equipped with a condenser was charged with polymer [15] (0.937 kg), potassium acetate (73.5 g) and N,N-dimethylacetamide (0.8 L) and the mixture was stirred under nitrogen at 70° C. for 5 hours. The N,N-dimethylacetamide was distilled off under reduced pressure and the residue was diluted with toluene and treated with an activated alumina column to remove the toluene-insoluble matter (KBr and excess potassium benzoate). The volatile fraction of the filtrate was then distilled off under reduced pressure to give polymer [16].

Example 9

One-hundred parts of the polymer [14] obtained in Production Example 4 and 50 parts of one of various high molecular plasticizers were admixed, followed by addition of 1 part of Sn (IV) catalyst (dibutyltin diacetylacetonate) with stirring, and the whole mixture was degassed under reduced pressure and molded to give a cured product in the form of a 2 mm-thick flat sheet. Curing was effected by allowing the sample to stand in an interior environment for 2 days and further at 50° C. for 3 days. From the cured product in the form of a sheet, a No. 2 (⅓) dumbbell testpiece was punched out and subjected to tensile testing with Shimadzu Corporation is autograph (measuring conditions: 23° C., 200 mm/min) Viscosity measurements were carried out using a Type Eviscosimeter (EHD3° cone 28 φ used) at 23° C. The results are shown in Table 5.

Comparative Example 5

Using various low molecular plasticizers in lieu of the high molecular plasticizers used in Example 9, cured products were fabricated and subjected to tensile testing in otherwise the same manner as in Example 9. Viscosity measurements were also carried out in the same manner as in Example 9. The results are shown in Table 5.

In Table 5, the polyadipate polymer plasticizer is the product of Asahi Electric Works, Ltd., the polybutene plasticizer is the product of Idemitsu Petrochemical Co., Ltd. and the alkylbenzene plasticizer is the product of Nippon Petrochemicals Co., Ltd.

TABLE 5

The viscosity and initial tensile properties of the composition when the high molecular plasticizer (D) is used

| | Plasticizer | | Molecular weight of plasticizer | Viscosity (Pa · s) | M50 | Tmax | Eb (%) |
|---|---|---|---|---|---|---|---|
| Ex. 9 | Acrylic | Polymer [16] | 2600 | 37 | 0.05 | 0.14 | 180 |
| | Polyadipate | PN-280 | 3100 | 31 | 0.07 | 0.15 | 100 |
| | | PN-606 | 2700 | 28 | 0.08 | 0.20 | 130 |
| | | PN-260 | 2800 | 25 | 0.07 | 0.14 | 100 |
| | | PN-170 | 1800 | 16 | 0.06 | 0.14 | 120 |
| Compar. Ex. 5 | Phthalate | DOP | 390 | 6 | 0.05 | 0.07 | 70 |
| | | DOTP | 394 | 6 | 0.05 | 0.07 | 70 |
| | Adipate | DOA | 370 | 3 | 0.05 | 0.07 | 70 |
| | | DINA | 398 | 18 | 0.05 | 0.07 | 70 |
| | Trimellitate | TOTM | 546 | 10 | 0.06 | 0.11 | 100 |
| | Sebacate | DOS | 426 | 3 | 0.06 | 0.07 | 70 |
| | Polybutene | Polybutene 35H | 720 | 44 | 0.07 | 0.14 | 100 |
| | Alkylbenzene | Alkene 100P | 330 | 9 | 0.04 | 0.07 | 90 |
| | | Alkene 200P | 325 | 7 | 0.05 | 0.15 | 140 |
| | Phosphate | Tricresyl phosphate | 368 | 8 | 0.07 | 0.08 | 60 |
| | Reference (blank) | | — | 58 | 0.16 | 0.26 | 90 |

Example 10

Some specimens of the cured sheet prepared in Example 9 (dumbbell specimens) were set and kept stationary in a dryer at 150° C. After a predetermined time, the specimens were taken out and subjected to tensile testing in the same manner as in Example 9. The results are shown in Table 6.

Comparative Example 6

Some specimens of the cured sheet prepared in Comparative Example 5 (dumbbell specimens) were set and kept stationary in a dryer at 150° C. as in Example 10. After a predetermined time, the specimens were taken out and subjected to tensile testing in the same manner as in Example 10. The results are shown in Table 6.

TABLE 6

Effect of high molecular plasticizer (D) on heat resistance (tensile properties)

| | Plasticizer | | Initial | After 1 W | After 4 W |
|---|---|---|---|---|---|
| Ex. 10 | Polymer [16] | M50 (MPa) | 0.05 | 0.06 | 0.04 |
| | | Tb (MPa) | 0.14 | 0.24 | 0.20 |
| | | Eb (%) | 180 | 230 | 230 |
| | PN-280 | M50 (MPa) | 0.07 | 0.10 | 0.19 |
| | | Tb (MPa) | 0.15 | 0.20 | 0.34 |
| | | Eb (%) | 100 | 100 | 90 |
| Compar. Ex. 6 | DOP | M50 (MPa) | 0.05 | 0.13 | 0.19 |
| | | Tb (MPa) | 0.07 | 0.22 | 0.38 |
| | | Eb (%) | 70 | 90 | 90 |
| | DINA | M50 (MPa) | 0.05 | 0.13 | 0.17 |
| | | Tb (MPa) | 0.07 | 0.29 | 0.36 |
| | | Eb (%) | 70 | 110 | 100 |
| | TOTM | M50 (MPa) | 0.06 | 0.05 | 0.09 |
| | | Tb (MPa) | 0.11 | 0.12 | 0.15 |
| | | Eb (%) | 100 | 120 | 90 |
| | Polybutene 35H | M50 (MPa) | 0.07 | 0.08 | 0.13 |
| | | Tb (MPa) | 0.14 | 0.22 | 0.26 |
| | | Eb (%) | 100 | 120 | 100 |
| | Alkene 100P | M50 (MPa) | 0.04 | 0.15 | 0.21 |
| | | Tb (MPa) | 0.07 | 0.28 | 0.38 |
| | | Eb (%) | 90 | 100 | 90 |
| | Alkene 200P | M50 (MPa) | 0.05 | 0.12 | 0.18 |
| | | Tb (MPa) | 0.15 | 0.28 | 0.37 |
| | | Eb (%) | 140 | 130 | 100 |
| Ref. | Blank | M50 (MPa) | 0.16 | 0.15 | 0.18 |
| | | Tb (MPa) | 0.26 | 0.29 | 0.41 |
| | | Eb (%) | 90 | 100 | 110 |

Example 11

Some specimens of the cured sheet prepared in Example 9 (dumbbell specimens) were set in a sunshine weather-o-meter (product of Suga Testing Instruments, Model WEL-SUN-DC, black panel temperature 63° C., rainfall time 18 min./irradiation time 2 hrs). After a predetermined time period, the specimens were taken out and subjected to tensile testing in the same manner as in Example 9. The results are shown in Table 7.

Comparative Example 7

Some specimens of the cured sheet prepared in Comparative Example 5 (dumbbell specimens) were set in a sunshine weather-o-meter (product of Suga Testing Instruments, Model WEL-SUN-DC, black panel temperature 63° C., rainfall time 18 min./irradiation time 2 hrs). After a predetermined time period, the specimens were taken out and subjected to tensile testing in the same manner as in Example 11. The results are shown in Table 7.

TABLE 7

Effect of high molecular plasticizer (D) on weather resistance (tensile properties)

| | Plasticizer | | Initial | After 500 h |
|---|---|---|---|---|
| Ex. 11 | Polymer [16] | M50 (MPa) | 0.05 | 0.05 |
| | | Tb (MPa) | 0.14 | 0.15 |
| | | Eb (%) | 180 | 170 |
| | PN-280 | M50 (MPa) | 0.07 | 0.08 |
| | | Tb (MPa) | 0.15 | 0.15 |
| | | Eb (%) | 100 | 90 |
| Compar. Ex. 7 | DOP | M50 (MPa) | 0.05 | 0.07 |
| | | Tb (MPa) | 0.07 | 0.08 |
| | | Eb (%) | 70 | 60 |
| | DINA | M50 (MPa) | 0.05 | — |
| | | Tb (MPa) | 0.07 | 0.05 |
| | | Eb (%) | 70 | 40 |
| | TOTM | M50 (MPa) | 0.06 | — |
| | | Tb (MPa) | 0.11 | 0.04 |
| | | Eb (%) | 100 | 30 |
| | Polybutene 35H | M50 (MPa) | 0.07 | 0.08 |
| | | Tb (MPa) | 0.14 | 0.14 |
| | | Eb (%) | 100 | 80 |
| | Alkene 100P | M50 (MPa) | 0.04 | 0.06 |
| | | Tb (MPa) | 0.07 | 0.09 |
| | | Eb (%) | 90 | 80 |
| | Alkene 200P | M50 (MPa) | 0.05 | — |
| | | Tb (MPa) | 0.15 | 0.05 |
| | | Eb (%) | 140 | 20 |
| Ref. | Blank | M50 (MPa) | 0.16 | 0.16 |
| | | Tb (MPa) | 0.26 | 0.27 |
| | | Eb (%) | 90 | 90 |

Example 12

Some specimens of the cured sheet prepared in Example 9 (dumbbell specimens) were coated with various alkyd coatings and left standing indoors. After a predetermined period of time, the coated surface was touched with a finger to assess the degree of curing. The results are shown in FIG. 8.

Comparative Example 8

Some specimens of the cured sheet prepared in Comparative Example 5 (dumbbell specimens) were coated with various alkyd coatings and left standing indoors. After a predetermined period of time, the coated surface was touched with a finger to assess the degree of curing in the same manner as in Example 12. The results are shown in FIG. 8.

TABLE 8

Effect of high molecular plasticizer (D) on alkyd coating coatability

| | Ex. 12 | | Compar. Ex. 8 | |
|---|---|---|---|---|
| | Plasticizer | | | |
| Coating | Polymer [16] | PN-280 | Polybutene 35H | DOP | DOA |
| Schakelverf | ○/○ | ○/○ | ○/○ | X/X | X/Δ |
| Rubbol AZ | Δ/○Δ | Δ/Δ | X/Δ | X/X | X/Δ |
| Sigmasolid semigloss | Δ/○Δ | Δ/Δ | ○Δ/○ | X/X | X/X |

Table 8 shows the evaluation after 1 day/the evaluation after 7 days.
○: Completely cured
Δ: Tacky
X: Uncured
The alkyd coatings used are:
Schakelverf: Product of Sigma
Rubbol AZ: Product of Akzo
Sigmasolid semigloss: Product of Sigma

EXAMPLES RELATING TO THE FOURTH
ASPECT OF THE INVENTION

Production Example 6

A 10-L separable flask equipped with a reflux-condenser and a stirrer was charged with CuBr (42.0 g, 0.293 mol). After nitrogen gas purging, acetonitrile (559 mL) was added and the mixture was stirred on an oil bath at 70° C. for 45 minutes. Thereafter, butyl acrylate (1.00 kg), diethyl 2,5-dibromoadipate (176 g, 0.488 mol) and pentamethyldiethylenetriamine [hereinafter referred to briefly as triamine] (2.00 mL, 1.66 g, 9.58 mmol) were added and the reaction was started. Under heating at 70° C. with constant stirring, butyl acrylate (4.00 kg) was continuously added dropwise over 190 minutes. In the course of dripping butyl acrylate, triamine (6.00 mL, 4.98 g, 288 mmol) was further added. At 310 minutes after initiation of the reaction, 1,7-octadiene (1.44 L, 1.07 kg, 9.75 mol) and triamine (20.5 mL, 17.0 g, 98.1 mmol) were added, and the whole mixture was stirred under heating at 70° C. for 210 minutes.

This reaction mixture was diluted with hexane and passed through an activated alumina column, and the volatile matter was distilled off under reduced pressure, whereby an alkenyl group-terminated polymer (polymer [17]) was obtained. This polymer [17] had a number average molecular weight of 14000 and a molecular weight distribution value of 1.3.

A 10-L separable flask equipped with a condenser was charged with polymer [17] (2.7 kg), potassium benzoate (142 g) and N,N-dimethylacetamide (2.7 L) and the mixture was stirred under nitrogen at 70° C. for 25 hours. The N,N-dimethylacetamide was distilled off under reduced pressure and the residue was diluted with toluene and treated with an activated alumina column to remove the toluene-insoluble matter (KBr and excess potassium benzoate). The volatile fraction of the filtrate was then distilled off under reduced pressure to give polymer [18].

A 2-L round-bottom flask equipped with a condenser was charged with polymer [18] (2.7 kg), aluminum silicate (540 g, product of Kyowa Chemical, Kyowaad 700 PEL) and toluene (2.7 L) and the mixture was stirred under nitrogen at 100° C. for 5 hours. The aluminum silicate was then filtered off and the toluene in the filtrate was distilled off under reduced pressure to give polymer [19].

A 1-L pressure-resisting reaction vessel was charged with polymer [19] (409 g), dimethoxymethylhydrosilane (27.0 mL, 0.22 mol), methyl orthoformate (8.0 mL, 0.07 mmol) and platinum(0)-1,1,3,3-tetramethyl-1,3-divinyldisiloxane complex. The amount of use of the platinum catalyst was $10^{-3}$ molar equivalents with respect to the alkenyl group of the polymer. This reaction mixture was heated at 100° C. for 1 hour. The volatile fraction of the mixture was then distilled off under reduced pressure to give a silyl-terminated polymer (polymer [20]). This polymer had a number average molecular weight (GPC method, polystyrene equivalent) of 13900 and a molecular weight distribution value of 1.4. The average number of silyl groups introduced per mole of the polymer was 1.5 as determined by $^1$H NMR analysis.

Production Example 7

Example of Synthesis of a Br Group-Terminated poly(butyl acrylate)

A 2-L separable flask equipped with a reflux-condenser and a stirrer was charged with CuBr (5.54 g, 38.6 mmol). After nitrogen gas purging, acetonitrile (73.8 mL) was added and the mixture was stirred on an oil bath at 70° C. for 30 minutes. Thereafter, butyl acrylate (132 g), methyl 2-bromopropionate (14.4 mL, 0.129 mol) and pentamethyldiethylenetriamine (4.69 mL, 0.022 mol) were added and the reaction was started. Under heating at 70° C. with constant stirring, butyl acrylate (528 g) was continuously added dropwise over 90 minutes and the whole mixture was stirred under heating for 80 minutes.

This reaction mixture was diluted with toluene and passed through an activated alumina column, and the volatile matter was distilled off under reduced pressure, whereby a poly (butyl acrylate) having a Br group at one molecular chain terminus (polymer [21]) was obtained. This polymer [21] had a number average molecular weight of 5800 and a molecular weight distribution value of 1.14.

Production Example 8

Example of Synthesis of a poly(butyl acrylate) Having an Alkenyl Group at One Molecular Chain Terminus A 500-mL flask equipped with a condenser was charged with the polymer [21] (150 g) obtained in Production Example 2, potassium pentenoate (8.29 g) and N,N-dimethylacetamide (150 mL) and the mixture was stirred at 70° C. for 6 hours. The N,N-dimethylacetamide was then distilled off and the residue was diluted with toluene and treated with an activated alumina column. The toluene was then distilled off to give a polymer.

A reaction vessel was charged with the above polymer (20 g), aluminum silicate (4.0 g, product of Kyowa Chemical, Kyowaad 700 PEL) and toluene (20 mL) and the mixture was stirred under nitrogen at 100° C. for 1 hour. The aluminum silicate was then filtered off and the filtrate was concentrated to give a poly(butyl acrylate) having an alkenyl group at one molecular chain terminus (polymer [22]). This polymer had a number average molecular weight of 5800 and a molecular weight distribution value of 1.13. The viscosity was 11 Pa·s (Type E viscosimeter, 23° C.)

Production Example 9

Example of Synthesis of a poly(butyl acrylate) Having a silyl Group at One Molecular Chain Terminus A 30-mL pressure-resisting reaction vessel was charged with the polymer [22] (9.4 g) obtained in Production Example 7, dimethoxymethylhydrosilane (0.58 mL, 4.7 mmol), methyl orthoformate (0.17 mL, 1.6 mmol) and platinum(0)-1,1,3,3-tetramethyl-1,3-divinyldisiloxane complex. The amount of use of the platinum catalyst was $10^{-4}$ molar equivalents with respect to the alkenyl group of the polymer. This reaction mixture was heated at 100° C. for 1 hour. Then, dimethoxymethylhydrosilane (0.58 mL, 4.7 mmol) and platinum(0)-1,1,3,3-tetramethyl-1,3-divinyldisiloxane complex ($2\times10^{-4}$ molar equivalents with respect to the alkenyl group of the polymer) were further added and the whole mixture was heated at 100° C. for 1 hour. This reaction mixture was concentrated to give a poly(butyl acrylate) having a silyl group at one molecular chain terminus (polymer [23]). This polymer had a number average molecular weight of 6100 and a molecular weight distribution value of 1.18. The average number of silyl groups introduced per mole of the polymer was 1.0. The viscosity was 13 Pa·s (Type E viscosimeter, 23° C.).

Example 13

One-hundred parts of the polymer [20] obtained in Production Example 6 and 50 parts of polymer [23] as a reactive plasticizer were admixed, followed by addition of 1 part of Sn (IV) catalyst (dibutyltin diacetylacetonate) with stirring, and the whole mixture was degassed under reduced pressure and molded to give a cured product in the form of a 2 mm-thick flat sheet. Curing was effected by allowing the sample to stand in an interior environment for 1 day and further at 50° C. for one day. Then, the gel fraction was determined. The viscosity of a mixture of 100 parts of polymer [20] and 50 parts of polymer [23] was also measured (Type E viscosimeter, 23° C.). The results are shown in Table 9.

Comparative Example 9

Except that a nonreactive plasticizer having no silyl group (polymer [22]) was used in lieu of the reactive plasticizer (polymer [23]) used in Example 13, a cured product was fabricated and evaluated in the same manner as in Example 13. The viscosity of a mixture of 100 parts of polymer [20] and 50 parts of polymer [22] was also measured [Type E viscosimeter, 23° C.]. The results are shown in Table 9.

Reference Example 1

Except that the reactive plasticizer (polymer [23]) used in Example 13 was omitted from the formulation, a cured product was fabricated and evaluated in the same manner as in Example 13. The viscosity of polymer [20] alone was also measured [Type E viscosimeter, 23° C.]. The results are shown in Table 9.

TABLE 9

Gel fraction and composition viscosity of cured product when reactive plasticizer (E) is used

| | Gel fraction (%) | Viscosity (Pa·s) |
|---|---|---|
| Ex. 13 | 70 | 44 |
| Compar. Ex. 9 | 50 | 42 |
| Ref. Ex. 1 | 80 | 67 |

Example 14

A cured product was fabricated in the same manner as in Example 13, except that curing was effected by allowing the sample to stand in an interior environment for 2 days and further at 50° C. for 3 days. From the cured product in the form of a sheet, a No. 2 (⅓) dumbbell testpiece was punched out and subjected to tensile testing with Shimadzu Corporation's autograph (measuring conditions: 23° C., 200 mm/min). The results are shown in Table 10.

Comparative Example 10

A cured product was fabricated in the same manner as in Comparative Example 9, except that curing was effected in the same manner as in Example 14 and the cured product was subjected to tensile testing as in Example 14. The results are shown in Table 10.

TABLE 10

Tensile characteristics of the cured product when reactive plasticizer (E) is used

| | M50 (MPa) | M100 (MPa) | Tmax (MPa) | Eb (%) |
|---|---|---|---|---|
| Ex. 14 | 0.017 | 0.031 | 0.108 | 280 |
| Compar. Ex. 9 | 0.038 | 0.071 | 0.103 | 150 |

EXAMPLES RELATING TO THE FIFTH ASPECT OF THE INVENTION

Production Example 10

A 10-L separable flask equipped with a reflux-condenser and a stirrer was charged with CuBr (28.0 g, 0.195 mol). After nitrogen gas purging, acetonitrile (559 mL) was added and the mixture was stirred on an oil bath at 70° for 15 minutes. Thereafter, butyl acrylate (1.00 kg), diethyl 2,5-dibromoadipate (117 g, 0.325 mol) and pentamethyldiethylenetriamine [hereinafter referred to briefly as triamine] (1.70 mL, 1.41 g, 8.14 mmol) were added and the reaction was started. Under heating at 70° C. with constant stirring, butyl acrylate (4.00 kg) was continuously added dropwise over 175 minutes. In the course of dripping butyl acrylate, triamine (8.50 mL, 7.06 g, 40.7 mmol) was further added. At 370 minutes after initiation of the reaction, 1,7-octadiene (1.57 L, 1.17 kg, 7.10 mol) and triamine (20.4 mL, 16.9 g, 97.7 mmol) were added, and the whole mixture was stirred under heating at 70° C. for 220 minutes.

This reaction mixture was diluted with hexane and passed through an activated alumina column, and the volatile matter was distilled off under reduced pressure, whereby an alkenyl group-terminated polymer (polymer [24]) was obtained. This polymer [24] had a number average molecular weight of 21300 and a molecular weight distribution value of 1.3.

A 2-L separable flask equipped with a condenser was charged with polymer [24] (0.73 kg), potassium benzoate (25 g) and N,N-dimethylacetamide (0.7 L) and the mixture was stirred under nitrogen at 70° C. for 12 hours. The N,N-dimethylacetamide was then distilled off under reduced pressure and the residue was diluted with toluene and treated with an activated alumina column to remove the toluene-insoluble matter (KBr and excess potassium benzoate). The volatile fraction of the filtrate was then distilled off under reduced pressure to give polymer [25].

A 2-L round-bottom flask equipped with a condenser was charged with polymer [25] (0.73 kg), aluminum silicate (150 g, product of Kyowa Chemical, Kyowaad 700 PEL) and toluene (4.0 L) and the mixture was stirred under nitrogen at 100° C. for 5 hours. The aluminum silicate was then filtered off and the toluene in the filtrate was distilled off under reduced pressure to give polymer [26].

A 1-L pressure-resisting reaction vessel was charged with polymer [26] (390 g), dimethoxymethylhydrosilane (36.0 mL, 0.292 mol), methyl orthoformate (7.10 mL, 0.065 mol) and platinum(0)-1,1,3,3-tetramethyl-1,3-divinyldisiloxane complex. The amount of use of the platinum catalyst was $10^{-2}$ molar equivalents with respect to the alkenyl group of the polymer. This reaction mixture was heated at 100° C. for 400 minutes. The volatile fraction of the mixture was then distilled off under reduced pressure to give a silyl-terminated polymer (polymer [27]). This polymer had a number average molecular weight (GPC method, polystyrene equivalent) of 246000 and a molecular weight distribution value of 1.5. The average number of silyl groups introduced per mole of the polymer was 3.0 as determined by $^1$H NMR analysis.

Production Example 11

A 1-L pressure-resisting reaction vessel was charged with the polymer [26] (300 g) obtained in Production Example 10, dimethoxymethylhydrosilane (18.0 mL, 0.146 mol), methyl orthoformate (4.97 mL, 0.045 mol) and platinum(0)-1,1,3,3-tetramethyl-1,3-divinyldisiloxane complex. The amount of use of the platinum catalyst was $10^{-2}$ molar equivalents with respect to the alkenyl group of the polymer. This reaction mixture was heated at 100° C. for 250 minutes. The volatile fraction of the mixture was then distilled off under reduced pressure to give a silyl-terminated polymer (polymer [28]). This polymer had a number average molecular weight (GPC method, polystyrene equivalent) of 246000 and a molecular weight distribution value of 1.5. The average number of silyl groups introduced per mole of the polymer was 1.2 as determined by $^1$H NMR analysis.

Example 15

One-hundred parts of the polymer [27] obtained in Production Example 10 was mixed with 1 part of silanol-containing compound $(CH_3)_3SiOC_6H_5$, followed by addition of 4 parts of a mixture of Sn (II) catalyst (stannous dioctanoate) and laurylamine (mixing ratio=3:1). After stirring and vacuum degassing, a 2 mm-thick cured sheet was fabricated. Curing was effected by allowing the sample to stand in an interior environment for 2 days and further at 50° C. for 3 days. From the cured product in the form of a sheet, a No. 2 (⅓) dumbbell testpiece was punched out and subjected to tensile testing with Shimadzu Corporation's autograph (measuring conditions: 23° C., 200 mm/min). The results are shown in Table 11.

Example 16

Except that 1 part of $(CH_3)_3SiO[CH_2CH(CH_3)O]_7SiMe_3$ was used in lieu of 1 part of the silanol-containing compound $(CH_3)_3SiOC_6H_5$ used in Example 15, a cured product was prepared and subjected to tensile testing in the same manner as in Example 15. The results are shown in Table 11.

Example 17

Except that 1 part of $C_{12}H_{25}OSiMe_3$ was used in lieu of 1 part of the silanol-containing compound $(CH_3)_3SiOC_6H_5$ used in Example 15, a cured product was prepared and subjected to tensile testing in the same manner as in Example 15. The results are shown in Table 11.

Example 18

Except that 1 part of $C_4H_9OSiMe_3$ was used in lieu of 1 part of the silanol-containing compound $(CH_3)_3SiOC_6H_5$ used in Example. 15, a cured product was prepared and subjected to tensile testing in the same manner as in Example 15. The results are shown in Table 11.

Comparative Example 11

Except that the silanol-containing compound used in Example 15 was omitted, a cured product was prepared and subjected to tensile testing in the same manner as in Example 15. The results are shown in Table 11.

Comparative Example 12

Except that the polymer [28] obtained in Production Example 11 was employed, a cured product was fabricated and subjected to tensile testing in the same manner as in Comparative Example 11. The results are shown in Table 11.

In all the above examples and comparative examples, the surface condition of the cured product was examined by finger touch and the surface tackiness (residual tack) was evaluated. The results are shown in Table 11.

TABLE 11

Tensile characteristics and surface condition of the cured product when silanol-containing compound (F) is used

| | Addition amount (in parts) | M50 (MPa) | M100 (MPa) | Tmax (MPa) | Eb (%) | Residual tack |
|---|---|---|---|---|---|---|
| Ex. 15 | 1.0 | 0.043 | 0.074 | 0.23 | 280 | ○ |
| Ex. 16 | 1.0 | 0.035 | 0.058 | 0.16 | 260 | ○ |
| Ex. 17 | 1.0 | 0.058 | 0.10 | 0.29 | 260 | ○ |
| Ex. 18 | 1.0 | 0.065 | 0.11 | 0.29 | 230 | ○ |
| Compar. Ex. 11 | 0 | 0.11 | 0.20 | 0.32 | 150 | ○ |
| Compar. Ex. 12 | 0 | 0.056 | 0.092 | 0.13 | 140 | X |

In Table 1, Residual tack:
Not tacky ← ○ > Δ > X → Tacky

INDUSTRIAL APPLICABILITY

The curable composition according to the first aspect of the present invention, as constituted as above, reduces the surface tackiness (residual tack) of a cured product obtainable by using a vinyl polymer having a crosslinking silyl group as the curable component.

The curable composition according to the second aspect of the invention, the constitution of which has been described above, provides for a reduced surface tackiness (residual tack), hence a reduced propensity to pick up dust, and an improved alkyd-coating coatability of a cured product obtainable by using a vinyl polymer having a crosslinking silyl group as the curable component with satisfactory mechanical properties being well sustained.

The curable composition according to the third aspect of the invention, also described above, imparts long-term heat resistance and weathering resistance to a cured product obtainable with a vinyl polymer having a crosslinking functional group and facilitates coating of the cured product with an alkyd coating.

The curable composition according to the fourth aspect of the invention, the constitution of which has been described above, not only contributes to improved workability due to reductions in viscosity in formulation and application stages but also imparts flexibility to the cured product and minimizes adverse influences due to plasticizer migration.

The curable composition according to the fifth aspect of the invention, also described above, is of low viscosity and, yet, gives a flexible cured product having a high gel fraction, a reduced surface tack, a low modulus, and a high elongation.

The invention claimed is:

1. A curable composition comprising the following two components:
   (A1) a vinyl polymer which has a main chain produced by living radical polymerization techniqiue, and has at least one crosslinking silyl group of the general formula (1) on the average per molecule:

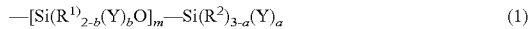
   $$-[Si(R^1)_{2-b}(Y)_bO]_m-Si(R^2)_{3-a}(Y)_a \quad (1)$$

wherein $R^1$ and $R^2$ may be the same or different and each represents an alkyl group containing 1 to 20 carbon atoms, an aryl group containing 6 to 20 carbon atoms, an aralkyl group containing 7 to 20 carbon atoms, or a triorganosiloxy group of the formula $(R')_3SiO-$, where R' represents a univalent hydrocarbon group containing 1 to 20 carbon atoms and the plurality of R' groups may be the same or different, and when two or more $R^1$ or $R^2$ groups are present, the plurality of groups may be the same or different; Y represents a hydroxyl group or a hydrolyzable group and, when two or more Y groups are present, they may be the same or different; a represents an integer of 0, 1, 2 or 3; b represents an integer of 0, 1 or 2; m is an integer of 0 to 19; with the condition that the relation of $a+mb \geqq 1$ is satisfied and
   (B) a photocurable substance.

2. The curable composition according to claim 1, wherein the vinyl polymer (A1) has a molecular weight distribution value of less than 1.8.

3. The curable composition according to claim 1, wherein the vinyl polymer (A1) is a (meth) acrylic polymer.

4. The curable composition according to claim 3 wherein the vinyl polymer (A1) is an acrylic polymer.

5. The curable composition according to claim 1 wherein the vinyl polymer (A1) has a main chain produced by atom transfer radical polymerization technique.

6. The curable composition according to claim 1 wherein the vinyl polymer (A1) has at least one crosslinking silyl group of the general formula (1) at the molecular chain terminus on the average per molecule.

7. The curable composition according to claim 1 wherein the vinyl polymer (A1) is obtainable by a process comprising:
   (1) a step of polymerizing a vinyl monomer by an atom transfer radical polymerization technique to synthesize a halogen-terminated vinyl polymer,
   (2) a step of reacting the halogen-terminated vinyl polymer obtained in said step (1) with an alkenyl group-containing oxyanion to effect substitution for the halogen and thereby synthesize an alkenyl-terminated vinyl polymer, and
   (3) a step of adding a hydrosilane compound having a crosslinking silyl group represented by the general formula (1) to the terminal alkenyl group of the alkenyl-terminated vinyl polymer obtained in said step (2) to convert the terminal alkenyl group to a substituent containing said crosslinking silyl group.

8. The curable composition according to claim 1 wherein the vinyl polymer (A1) is obtainable by a process comprising
   (1) a step of polymerizing a vinyl monomer by a living radical polymerization technique to prepare a vinyl polymer,
   (2) a step of reacting the polymer further with a compound having at least two sparingly polymerizable alkenyl groups to synthesize an alkenyl-terminated vinyl polymer, and
   (3) a step of adding a hydrosilane compound having a crosslinking silyl group represented by the general formula (1) to the terminal alkenyl group of the alkenyl-terminated vinyl polymer obtained in said step (2) to convert the terminal alkenyl group to a substituent containing said crosslinking silyl group.

9. The curable composition according to claim 1 wherein the photocurable substance (B) is an unsaturated acrylic compound.

* * * * *

UNITED STATES PATENT AND TRADEMARK OFFICE
CERTIFICATE OF CORRECTION

| | |
|---|---|
| PATENT NO. | : 7,388,038 B2 |
| APPLICATION NO. | : 11/377268 |
| DATED | : June 17, 2008 |
| INVENTOR(S) | : Masayuki Fujita et al. |

It is certified that error appears in the above-identified patent and that said Letters Patent is hereby corrected as shown below:

On the title page, item (75), the second Inventors address reads "Settsu", it should read -- Kobe --.

In the Claims:

In Claim 1, column 83, line 5, "living radical polymerization techniqiue and has at least", should read -- living radical polymerization technique and has at least --;

column 83, line 8, in the formula, "—[Si(R$^{1)}$$_{2-b}$(Y)$_b$O]$_m$—Si(R$^2$)$_{3-\alpha}$(Y)$_a$", should read -- —[Si(R$^1$)$_{2-b}$(Y)$_b$O]$_m$—Si(R$^2$)$_{3-\alpha}$(Y)$_\alpha$ --;

column 83, line 19, "groups are present, they may be the same or different; a" should read -- groups are present, they may be the same or different; a --;

column 83, line 20, "represents an integer of 1, 1, 2 or 3; b represents and integer of" should read -- represents an integer of 1, 1, 2 or 3; b represents an integer of --;

UNITED STATES PATENT AND TRADEMARK OFFICE
CERTIFICATE OF CORRECTION

PATENT NO. : 7,388,038 B2
APPLICATION NO. : 11/377268
DATED : June 17, 2008
INVENTOR(S) : Masayuki Fujita et al.

It is certified that error appears in the above-identified patent and that said Letters Patent is hereby corrected as shown below:

column 83, line 21, "0, 1 or 2; $\underline{m}$ is an integer of 0 to 19; with the condition that the" should read -- 0, 1 or 2; m is an integer of 0 to 19; with the condition that the --.

Signed and Sealed this

Twenty-first Day of October, 2008

JON W. DUDAS
*Director of the United States Patent and Trademark Office*